United States Patent
Ghosh et al.

(10) Patent No.: US 12,288,375 B2
(45) Date of Patent: Apr. 29, 2025

(54) ACQUISITION OF OPTICAL CHARACTERISTICS

(71) Applicant: Lumirithmic Limited, Winchester (GB)

(72) Inventors: Abhijeet Ghosh, Orpington (GB); Gaurav Chawla, Shenfield (GB); Yiming Lin, London (GB); Jayanth Kannan, Colchester (GB); Ekin Ozturk, London (GB)

(73) Assignee: Lumirithmic Limited, Winchester (GB)

( * ) Notice: Subject to any disclaimer, the term of this patent is extended or adjusted under 35 U.S.C. 154(b) by 599 days.

(21) Appl. No.: 17/504,070

(22) Filed: Oct. 18, 2021

(65) Prior Publication Data
US 2023/0022108 A1  Jan. 26, 2023

(30) Foreign Application Priority Data

Jul. 26, 2021  (GB) ...................................... 2110738

(51) Int. Cl.
*G06V 10/60*  (2022.01)
*G06T 7/55*  (2017.01)
(Continued)

(52) U.S. Cl.
CPC ............... *G06V 10/60* (2022.01); *G06T 7/55* (2017.01); *G06T 15/04* (2013.01); *G06T 15/506* (2013.01);
(Continued)

(58) Field of Classification Search
CPC ........ G06V 10/60; G06V 10/141; G06T 7/55; G06T 15/04; G06T 15/506;
(Continued)

(56) References Cited

U.S. PATENT DOCUMENTS 10,573,004 B2 *  2/2020  Husheer ................. G06T 19/20
2009/0226049 A1 *  9/2009  Debevec ................. G06T 15/50
                                                                382/118
(Continued)

FOREIGN PATENT DOCUMENTS

WO       2009097618 A1     8/2009

OTHER PUBLICATIONS

Kampouris et al., Diffuse-specular separation using binary spherical gradient illumination; SR '18: Proceedings of the Eurographics Symposium on Rendering: Experimental Ideas & Implementations, Jul. 2018, 10 pages. (Year: 2018).*

(Continued)

*Primary Examiner* — Nancy Bitar
*Assistant Examiner* — Dustin Bilodeau
(74) *Attorney, Agent, or Firm* — Ryan Dean; Umberg Zipser LLP

(57) ABSTRACT

An apparatus is described which includes two or more colour displays arranged to provide piece-wise continuous illumination of a volume, and one or more cameras arranged to image the volume. The apparatus is configured to control the colour displays and the cameras to illuminate the volume with each of two or more illumination conditions. The apparatus is also configured to obtain two or more sets of images, which include sufficient information for calculation of a reflectance map and a photometric normal map of an object or subject positioned within the volume. Each set of images is obtained during illumination of the volume with one or more corresponding illumination conditions. When viewed from the volume, the apparatus only provides direct illumination of the volume from angles within a zone of a hemisphere, which is less than a hemisphere.

21 Claims, 24 Drawing Sheets

(51) Int. Cl.
G06T 15/04 (2011.01)
G06T 15/50 (2011.01)
G06V 10/141 (2022.01)

(52) U.S. Cl.
CPC .. G06V 10/141 (2022.01); *G06T 2207/10048* (2013.01)

(58) Field of Classification Search
CPC . G06T 2207/10048; G06T 2207/10028; G06T 7/586
See application file for complete search history.

(56) References Cited

U.S. PATENT DOCUMENTS

| | | | |
|---|---|---|---|
| 2012/0268571 | A1 | 10/2012 | Debevec et al. |
| 2017/0019928 | A1 | 1/2017 | Viraraghavan |
| 2017/0124715 | A1 | 5/2017 | Tin |
| 2020/0020149 | A1* | 1/2020 | Moltaji ............... G06T 11/001 |
| 2020/0082572 | A1* | 3/2020 | Beeler ................. G06T 15/506 |
| 2021/0005015 | A1 | 1/2021 | Ghosh et al. |

OTHER PUBLICATIONS

Gunawardane et al., "Capturing relightable images using computer monitors," Computer Vision and Pattern Recognition Workshops (CVPRW), 2012 IEEE Computer Science Conference, Jun. 16, 2012, pp. 14-21. (Year: 2012).*
Gunawardane et al., "Capturing relightable images using computer monitors," Computer Vision and Pattern Recognition Workshops (CVPRW), 2012 IEEE Computer Science Conference, Jun. 16, 2012, pp. 14-21.
PCT International Search Report and Written Opinion, International Application No. PCT/GB2022/051944, Dec. 21, 2022, International Filing Date Jul. 25, 2022; 19 pages.
PCT International Search Report and Written Opinion, International Application No. PCT/GB2022/051945, Dec. 23, 2022, International Filing Date, Jul. 25, 2022, 21 pages.
PCT Invitation to Pay Additional Fees/Annex to Form PCT/ISA/206 Communication Relating to the Results of the Partial International Search, Nov. 2, 2022, International Application No. PCT/GB2022/051819, International Filing Date Jul. 13, 2022, 20 pages.
Vlasic et al., "Dynamic Shape Capture using Multi-View Photometric Stereo," ACM Transactions on Graphics, vol. 28, No. 5, Article 174, Published Dec. 2009, 12 pages.
"Project Starline: Feel like you're there, together" Google Research, https://blog.google/technology/research/project-starline/, May 2021, 5 pages.
Aittala et al., "Practical SVBRDF Capture in the Frequency Domain," ACM Trans. on Graphics (Proc. SIGGRAPH) 32, 4 (2013), 12 pages.

Beeler et al., "High-Quality Single-Shot Capture of Facial Geometry," ACM Transactions on Graphics (TOG) 29, 3 (2010), 9 pages.
Debevec et al, "A lighting reproduction approach to live-action compositing," ACM Trans. Graph. 21, 3, pp. 547-556, Jul. 2002, 10 pages.
Debevec et al., "Acquiring the reflectance field of a human face," Proceedings of the 27th annual conference on computer graphics and interactive techniques (SIGGRAPH), 2000, 12 pages.
Ghosh et al., "Estimating Specular Roughness and Anisotropy from Second Order Spherical Gradient Illumination," Computer Graphics Forum (Proc. EGSR), 28(4), Jun. 2009, pp. 1161-1170, 10 pages.
Ghosh et al., "Multiview face capture using polarized spherical gradient illumination," ACM Transactions on Graphics (TOG) 30, 6, (2011), 10 pages.
Gotardo et al., "Practical Dynamic Facial Appearance Modeling and Acquisition," ACM Transactions on Graphics (TOG) 37, 6 (2018), 13 pages.
Kampouris et al., "Diffuse-specular separation using binary spherical gradient illumination," SR '18: Proceedings of the Eurographics Symposium on Rendering: Experimental Ideas & Implementations, Jul. 2018, 10 pages.
Kang et al., "Learning Efficient Illumination Multiplexing for Joint Capture of Reflectance and Shape," ACM Trans. Graph. 38, 6, Article 165 (Nov. 2019), 12 pages.
Lamond et al., "Image-based Separation of Diffuse and Specular Reflections using Environmental Structured Illumination," IEEE International Conference on Computational Photography (ICCP) 2009, 8 pages.
Ma et al., "Rapid acquisition of specular and diffuse normal maps from polarized spherical gradient illumination," EGSR'07: Proceedings of the 18th Eurographics Conference on Rendering Techniques, pp. 183-194, Jun. 2007, 12 pages.
Riviere et al., "Single-shot high-quality facial geometry and skin appearance capture," ACM Trans. Graph. 39, 4, Article 81 (Jul. 2020), 12 pages.
Schwartz et al., "DOME II: A Parallelized BTF Acquisition System," Eurographics Workshop on Material Appearance Modeling (2013), 7 pages.
Sengupta et al., "A Light Stage on Every Desk," arXiv:2105.08051, May 2021, 25 pages.
Tunwattanapong et al., "Acquiring Reflectance and Shape from Continuous Spherical Harmonic Illumination," ACM Transactions on Graphics (Proc. SIGGRAPH), 32(4), 2013, 12 pages.
Woodham, R. J., "Photometric Method for Determining Surface Orientation from Multiple Images," Optical Engineering 19(1)139-144 (1980), 6 pages.
Li et al: "A SVBRDF Modeling Pipeline using Pixel Clustering", arxiv.org, Cornell University Library, 201 OLIN Library Cornell University Ithaca, NY 14853, Dec. 1, 2019; 11 pgs.
PCT International Search Report and Written Opinion, International Application No. PCT/GB2022/051819, Feb. 21, 2023, 34 pages.
United Kingdom Intellectual Property Office, Search Report Under Section 17, Application No. GB2115727.6, Apr. 14, 2022, 5 pages.

* cited by examiner

Fig. 15A                    Fig. 15B

ACQUISITION OF OPTICAL CHARACTERISTICS

CROSS-REFERENCE TO RELATED APPLICATIONS

This application claims priority to and the benefit of United Kingdom Patent Application No. GB2110738.8 filed in the United Kingdom Patent Office on Jul. 26, 2021, the entire contents of which are incorporated herein by reference.

FIELD

This specification concerns methods of acquiring optical characteristics, apparatuses for use in acquiring optical characteristics, and applications of said methods and apparatuses.

BACKGROUND

High quality 3D acquisition of a subject's face or an object/material including 3D shape and appearance has received a lot of attention in computer graphics for realistic rendering applications ranging from film visual effects and games, product design/visualization/advertising, and AV/VR applications.

Expensive, highly specialized lightstage setups for facial capture have been described, see for example "Acquiring the reflectance field of a human face", Paul Debevec, Tim Hawkins, Chris Tchou, Haarm-Pieter Duiker, Westley Sarokin, and Mark Sagar, Proceedings of the 27th annual conference on Computer graphics and interactive techniques (SIGGRAPH), 2000 (hereinafter "Debevec2000"). See also "Rapid acquisition of specular and diffuse normal maps from polarized spherical gradient illumination", Wan-Chun Ma, Tim Hawkins, Pieter Peers, Charles-Felix Chabert, Malte Weiss, Paul Debevec, EGSR'07: Proceedings of the 18th Eurographics conference on Rendering Techniques, Pages 183-194, June 2007 (hereinafter "Ma2007"). See also "Multiview face capture using polarized spherical gradient illumination", Abhijeet Ghosh, Graham Fyffe, Borom Tunwattanapong, Jay Busch, Xueming Yu, and Paul Debevec, ACM Transactions on Graphics (TOG) 30, 6, (2011) (hereinafter "Ghosh2011"). See also "Diffuse-specular separation using binary spherical gradient illumination", Christos Kampouris, Stefanos Zafeiriou, Abhijeet Ghosh, SR '18: Proceedings of the Eurographics Symposium on Rendering: Experimental Ideas & Implementations, July 2018 (hereinafter "Kampouris2018"). Such lightstage setups may achieve the highest quality and flexibility of rendering/relighting.

Mid-range passive multiview capture setups have been described. "High-Quality Single-Shot Capture of Facial Geometry" Thabo Beeler, Bernd Bickel, Paul Beardsley, Bob Sumner, and Markus Gross, 2010, ACM Transactions on Graphics (TOG) 29, 3 (2010) (hereinafter "Beeler2010") only achieved high quality facial geometry capture (along with an evenly lit texture). More recently, in "Practical Dynamic Facial Appearance Modeling and Acquisition" Paulo Gotardo, Jérémy Riviere, Derek Bradley, Abhijeet Ghosh, and Thabo Beeler, 2018, ACM Transactions on Graphics (TOG) 37, 6 (2018) (hereinafter "Gotardo 2018") or "Single-shot high-quality facial geometry and skin appearance capture", Jérémy Riviere, Paulo Gotardo, Derek Bradley, Abhijeet Ghosh, and Thabo Beeler, 2020. ACM Trans. Graph. 39, 4, Article 81 (July 2020) (hereinafter "Riviere2020"), some reflectance properties are also estimated, albeit with reduced quality compared to a lightstage system.

Similarly, for material capture purposes, high-quality measurements have been achieved for bidirectional texture functions (BTFs) using specialized dome setups, see "DOME II: A Parallelized BTF Acquisition System", Christopher Schwartz, Ralf Sarlette, Michael Weinmann and Reinhard Klein, Eurographics Workshop on Material Appearance Modeling (2013) (hereinafter "DOME"). Such arrangements are similar to a lightstage, albeit recording only an upper hemisphere of sample reflectance.

For object capture, specialized setups have been constructed. For example, to rotate a semi-circular light arc, creating continuous spherical illumination around an object for shape and reflectance capture, see "Acquiring Reflectance and Shape from Continuous Spherical Harmonic Illumination", Borom Tunwattanapong, Graham Fyffe, Paul Graham, Jay Busch, Xueming Yu, Abhijeet Ghosh, Paul Debevec, ACM Transactions on Graphics (Proc. SIGGRAPH), 32(4), 2013, (hereinafter "Tunwattanapong2013"). Another approach uses a specialized cube of controllable LEDs to illuminate an object with surrounding illumination, see "Learning Efficient Illumination Multiplexing for Joint Capture of Reflectance and Shape", Kaizhang Kang, Cihui Xie, Chengan He, Mingqi Yi, Minyi Gu, Zimin Chen, Kun Zhou, and Hongzhi Wu, ACM Trans. Graph. 38, 6, Article 165 (November 2019) (hereinafter "Kang2019").

Most of the above techniques that acquire high quality appearance properties require specialized hardware/setup and/or a specific calibrated installation, combined with operation in a laboratory or studio, and hence are neither portable nor practical for many applications. On the other hand, passive multiview capture setups are more practical but fail to capture high-quality reflectance properties required for a realistic 3D rendering.

Another technique which has been described is the use of a single desktop display as an illumination source for planar material reflectance capture, see "Estimating Specular Roughness and Anisotropy from Second Order Spherical Gradient Illumination", Abhijeet Ghosh, Tongbo Chen, Pieter Peers, Cyrus A. Wilson, Paul Debevec, Computer Graphics Forum (Proc. EGSR), 28(4), June 2009, pp. 1161-1170, (hereinafter "Ghosh2009"). See also "Practical SVBRDF Capture in the Frequency Domain", Miika Aittala, Tim Weyrich, and Jaakko Lehtinen, ACM Trans. on Graphics (Proc. SIGGRAPH) 32, 4 (2013), (hereinafter "Aittala2013"). However, such methods do not apply to facial or object capture due to an assumption of a planar sample. It has also been proposed to use a desktop display to provide information of a facial reflectance field with limited angular coverage of illumination and from a single camera viewpoint for image-based relighting a facial video during a video conference (e.g. to better illuminate the face in the video), see "A Light Stage on Every Desk", Soumyadip Sengupta, Brian Curless, Ira Kemelmacher-Shlizerman, Steve Seitz, arXiv:2105.08051, May 2021 (hereinafter "Sengupta2021"). These methods employ a display device, however, they do not employ multiview acquisition for 3D capture, or provide substantial angular coverage of illumination over a hemisphere, rendering them unsuitable for appearance acquisition of convex 3D objects or a face, and so forth.

For example, although targeting face relighting, Sengupta2021 focuses only on 2D image-based relighting for video conferencing application. This process has a lower quality bar compared to 3D capture for realistic rendering, and the approach described cannot provide substantial angular coverage of illumination from non-frontal directions (e.g., top, sides, or backlighting) due to the usage of a single display device and a single camera. The method of also does not explicitly estimate diffuse and specular reflectance properties or provide any 3D shape estimate. Another problem with setups that use a single display and camera is that the camera is always placed off-centred, to the side or above the display, so as to not occlude the display. This results in asymmetrical coverage of incident illumination on an object or subject (with respect to the camera viewpoint), which is not ideal and prevents capture of high quality reflectance information for non-planar 3D objects or a face. For example, the facial relighting of Sengupta2021 has the asymmetry of illumination inherent in their setup and cannot achieve lighting effects from above a face since this is not captured by the setup described.

Google® has announced Project Starline, which presents a 3D teleconferencing system that couples 3D scanning of a remote participant using a depth sensor at one end and 3D display of the participant at another location using a lightfield display, see "Project Starline: Feel like you're there, together" Google Research, https://blog.google/technology/research/project-starline/, May 2021 (hereinafter "Starline2021").

SUMMARY

According to a first aspect of the invention, there is provided an apparatus including two or more colour displays arranged to provide piece-wise continuous illumination of a volume. The apparatus also includes one or more cameras. Each camera is arranged to image the volume. The apparatus is configured to control the two or more colour displays and the one or more cameras to illuminate the volume with each of two or more illumination conditions. The apparatus is also configured to obtain two or more sets of images. Each set of images is obtained during illumination of the volume with one or more corresponding illumination conditions. The two or more sets of images so include sufficient information for calculation of a reflectance map and a photometric normal map of an object or subject positioned within the volume. When viewed from the volume, the apparatus only provides direct illumination of the volume from angles within a zone of a hemisphere. The zone is less than a hemisphere and corresponds to a first range of latitudinal angles and a second range of longitudinal angles. Each of the first and second ranges is no more than $17\pi/18$.

An illumination condition may be distinguished from other illumination conditions by colour (or spectrum) and/or by a distribution of light intensity as a function of angle relative to the volume.

A colour display emits light according to an illumination pattern. An illumination pattern may be regarded as analogous to a radiation pattern of a directional radio frequency antenna. Two or more colour displays may be considered to be arranged so as to provide piece-wise continuous illumination of a volume if that volume corresponds to a common intersection (volume intersection) of the illumination patterns of all of the two or more colour displays.

When viewed from the volume, no part of any colour display may extend to an angle outside of the zone. The apparatus does not include any light sources which directly illuminate the volume from angles outside of the zone. Direct illumination refers to light emitted from a light source which reaches the volume without first reflecting from a surface. Light sources may include colour displays, area light sources (e.g. large area organic light emitting diodes, OLEDs, or fluorescent tubes), point light sources (e.g. light emitting diodes, LEDs), or any other device capable of emitting visible light, Infra-red light and/or ultraviolet light. Colour displays may take any suitable form, including but not limited to liquid crystal displays (LCD), LED displays, OLED displays, plasma displays, or any type of emissive display. Any or all of the two or more colour displays may take the form of curved, flexible and/or foldable colour displays. Any or all of the two or more colour displays may take the form of lightfield (holographic) displays.

The hemisphere may be defined relative to latitude-longitude spherical parameterisation $(\alpha, \beta)$ in which the latitudinal angle $\alpha$ corresponds to an angle above/below an equatorial plane, ranging from $-\pi/2 \leq \alpha \leq \pi/2$, and in which the longitudinal angle $\beta$ corresponds to an angle relative to a notional front direction ($\beta=0$), ranging from $-\pi \leq \beta \leq \pi$. In this coordinate system, the hemisphere is bounded by $-\pi/2 \leq \alpha \leq \pi/2$ and $-\pi/2 < \beta < \pi/2$. In this coordinate system, the maximum and minimum latitudinal angles of the zone within the hemisphere may be $\alpha_{max} < \pi/2$ and $\alpha_{min} > -\pi/2$ respectively, such that the first range is $\Delta\alpha = \alpha_{max} - \alpha_{min}$. The first range may satisfy $\pi/18 \leq \Delta\alpha \leq 17\pi/18$. In this coordinate system the maximum and minimum longitudinal angles of the zone may be $\beta_{max} < \pi/2$ and $\beta_{min} > -\pi/2$ respectively, such that the second range is $\Delta\beta = \beta_{max} - \beta_{min}$. The second range $\Delta\beta$ may satisfy $\pi/18 \leq \Delta\beta \leq 17\pi/18$. The magnitudes of the first $\Delta\alpha$ and second $\Delta\beta$ ranges may be the same. The magnitudes of the first $\Delta\alpha$ and second $\Delta\beta$ ranges may differ, i.e. $\Delta\alpha > \Delta\beta$ or $\Delta\alpha < \Delta\beta$. The magnitude of a difference $|\Delta\alpha > \Delta\beta|$ between the ranges $\Delta\alpha$, $\Delta\beta$ may be greater than or equal to $\pi/18$ (10 degrees).

The origin of the latitude-longitude spherical parameterisation $(\alpha, \beta)$ may be within the volume. The origin of the latitude-longitude spherical parameterisation $(\alpha, \beta)$ may coincide with the centroid of the volume. The apparatus does not cause any direct illumination to be incident on the volume from angles outside the zone, i.e. from angles $\alpha > \alpha_{max}$ or $\alpha < \alpha_{min}$, and/or $\beta > \beta_{max}$ or $\beta < \beta_{min}$.

Radial distance of the two or more colour displays from the origin need not be equal. In other words, whilst the direct illumination provided by light sources of the apparatus, including the two or more colour displays, corresponds to angles within the zone, the two or more colour displays (and any other light sources) are not required to be arranged/disposed to coincide with a portion of a spherical surface (although this is one possible implementation).

The first range $\Delta\alpha$ may be less than or equal to $8\pi/9$ (160 degrees), less than or equal to $7\pi/9$ (140 degrees), less than or equal to $2\pi/3$ (120 degrees), less than or equal to $5\pi/9$ (100 degrees), less than or equal to $\pi/2$ (90 degrees), less than or equal to $4\pi/9$ (80 degrees), or less than or equal to $\pi/3$ (60 degrees). The second range $\Delta\beta$ may be less than or equal to $8\pi/9$ (160 degrees), less than or equal to $7\pi/9$ (140 degrees), less than or equal to $2\pi/3$ (120 degrees), less than or equal to $5\pi/9$ (100 degrees), less than or equal to $\pi/2$ (90 degrees), less than or equal to $4\pi/9$ (80 degrees), or less than or equal to $\pi/3$ (60 degrees).

The zone may be bounded by curves corresponding to constant latitudinal angle $\beta$ and/or constant longitudinal angle $\alpha$. However, the zone may in general be bounded by any closed curve which may be parameterised in latitudinal angle $\beta$ and longitudinal angle $\alpha$.

The two or more sets of images may include sufficient information for calculation of a reflectance map and a photometric normal map if it is possible to determine at least one reflectance map and at least one photometric normal map for an object/subject within the volume, without requirement for further inputs. Each reflectance map may be calculated from the viewpoint of one of the cameras. Each photometric normal map may be calculated from the viewpoint of one of the cameras.

Each set of images of the two or more sets of images may correspond to a different illumination condition, or to a different combination of illumination conditions (sometimes termed "spectrally multiplexed"), to each other set of images.

When the apparatus includes two or more cameras, the apparatus may be configured to synchronise the start and/or end of exposure periods for all cameras used to obtain images belonging to a given set of images. In this way, variations in orientation and/or motion of a living subject may be minimised between images forming part of the same set.

The one or more cameras may include two or more cameras. The two or more cameras may be spaced apart to image the volume from different angles, such that the two or more sets of images obtained corresponding to the illumination conditions comprise sufficient information for calculation of dense correspondence between the viewpoints of the two or more cameras. The calculated dense correspondence may be usable to calculate stereo-based 3D geometry of the object or subject positioned within the volume. The 3D geometry may be calculated using stereoscopic techniques. The 3D geometry may also be referred to as a mesh, a depthmap and/or a geometric normal map. The calculated dense correspondence may be usable for image-based viewpoint interpolation for virtual camera view synthesis.

The two or more cameras may be spaced apart to image the volume from different angles, such that the two or more sets of images obtained corresponding to the illumination conditions include sufficient information for calculation of a 3D geometry of the object or subject positioned within the volume.

The two or more cameras may include at least a first camera and a second camera. The sets of images may include at least one set including an image from the first camera and an image from the second camera under the same illumination condition(s). Each set of images may include at least one image from the first camera for each illumination condition and at least one image from the second camera for each illumination condition.

Each set of images is obtained concurrently with (i.e. during) application of a specific corresponding illumination condition, or a specific combination of (spectrally multiplexed) illumination conditions. Each set of images may include at least one image obtained using each of the two or more cameras. Alternatively, each set of images may include at least one image obtained using each of a subset (e.g. two or more members) of the two or more cameras. When a subset of cameras is used, preferably the same subset of cameras may be used to obtain all of the sets of images. However, it is possible to change the membership of the subset when the illumination condition(s) are changed (for example to switch to infra-red (IR) cameras for IR illumination conditions).

The one or more cameras may include two or more cameras. The apparatus may also include a polariser applied to at least one of the two or more cameras. The polariser may have a known relationship with respect to the illumination emitted by the two or more colour displays, such that the two or more sets of images include sufficient information to enable separation of the reflectance map and/or the photometric normal map into diffuse and specular components.

The two or more colour displays may all emit light having the same polarisation. When the two or more colour displays emit linearly polarised light, the polariser may be oriented perpendicular (or "crossed") with respect to the light emitted by the two or more colour displays. Alternatively, when the two or more colour displays emit linearly polarised light, the polariser may be oriented parallel with respect to the light emitted by the two or more colour displays. When the two or more colour displays emit circularly polarised light, the polariser may be oriented with the same or opposite chirality (or "sense") as the light emitted by the two or more colour displays.

The two or more colour displays may emit unpolarised light. When the two or more colour displays emit unpolarised light, the polariser on the camera may be linear or circular. This combination may provide information for diffuse-specular separation, because the camera with the polariser applied may observe half the intensity of diffuse reflectance compared to a camera without a polariser, while observing a similar intensity of specular reflectance.

The two or more colour displays may include at least first and second colour displays. The one or more cameras may include at least a first camera. The first and second colour displays may be arranged substantially symmetrically about a plane including an optical axis of the first camera.

A plane may include the optical axis of the first camera if that plane is both parallel to and coincident with the optical axis. Substantially symmetric may include symmetric (or as symmetric as is possible in practice). Substantially symmetric may mean that a shortest distance between the plane comprising the optical axis and a parallel plane coincident with a mid-point between the first and second colour displays is less than 10% of the shortest distance between the first and second colour displays (measured through the mid-point).

The two or more illumination conditions may include three or more illumination conditions including at least first and second spectrally resolvable illumination conditions. The apparatus may be configured to illuminate the volume with the first and second spectrally resolvable illumination conditions concurrently. One set of images of the two or more sets of images may take the form of a first set of spectrally multiplexed images corresponding to the superposed first and second spectrally resolvable illumination conditions.

Illuminating the volume with the first and second spectrally resolvable illumination conditions concurrently may also be referred to as "simultaneously". Concurrently applying the first and second spectrally resolvable illumination conditions may also be referred to as "spectrally multiplexing" the first and second spectrally resolvable illumination conditions.

The apparatus may be configured to process the first set of spectrally multiplexed images to calculate respective sets of images corresponding to the first and second spectrally resolvable illumination conditions.

Illumination conditions may be spectrally resolvable if the first spectrally resolvable so illumination condition corresponds to a subset of colour channels of the one or more cameras and the second spectrally resolvable illumination condition corresponds to one or more of the remaining colour channels of the one or more cameras. For example, a first spectrally resolvable illumination condition may be applied using red (R) light and a second spectrally resolvable illumination condition may be applied using green (G)

light. The two spectrally resolvable illumination conditions may be detected by separate colour channels of an RGB camera. Three or more illumination conditions may be spectrally multiplexed for concurrent imaging using the one or more cameras. For example, different illumination conditions may be applied corresponding to each of the red (R), green (G) and blue (B) channels of an RGB camera.

Alternatively, spectrally resolvable illumination conditions, for example the first and second spectrally resolvable illumination conditions, need not be applied concurrently. Spectrally resolvable illumination conditions may instead be applied at different times, for example according to a sequence.

The two or more colour displays may be configured to output first, second and third colour channels which are spectrally resolvable by the one or more cameras. The two or more illumination conditions may include a third spectrally resolvable illumination condition corresponding to a first binary pattern along a first direction, emitted using only the first colour channel. The two or more illumination conditions may include a fourth spectrally resolvable illumination condition corresponding to a complement of the first binary pattern, emitted using only the first colour channel. The two or more illumination conditions may include a fifth spectrally resolvable illumination condition corresponding to the first binary pattern, emitted using only the second colour channel. The two or more illumination conditions may include a sixth spectrally resolvable illumination condition corresponding to the complement of the first binary pattern, emitted using only the second colour channel. The two or more illumination conditions may include a seventh spectrally resolvable illumination condition corresponding to a second binary pattern along a second direction which is different to the first direction, emitted using only the third colour channel. The two or more illumination conditions may include an eighth spectrally resolvable illumination condition corresponding to a complement of the second binary pattern, emitted using only the third colour channel. The apparatus may be configured to illuminate the volume with the third, sixth and seventh spectrally resolvable illumination conditions concurrently, and to obtain a corresponding second set of spectrally multiplexed images. The apparatus may be configured to illuminate the volume with the fourth, fifth and eighth spectrally resolvable illumination conditions concurrently, and to obtain a corresponding third set of spectrally multiplexed images.

The first, second and third colour channels may correspond to red, green and blue. The first and second directions may be substantially perpendicular. Substantially perpendicular may correspond to $\pi/2 \pm \pi/18$ (90±10 degrees). The first and second directions may correspond respectively to latitude and longitude.

Summing an image of the second set of spectrally multiplexed images with a corresponding image of the third set of spectrally multiplexed images may generate an output image corresponding to uniform illumination of the volume using white light.

The second and third sets of spectrally multiplexed images may include sufficient information for calculation of a reflectance map and a photometric normal map of the object or subject positioned within the volume. The two or more sets of illumination conditions may consist of the third to eighth spectrally resolvable illumination conditions. The two or more sets of images may consist of the second and third sets of spectrally multiplexed images.

The apparatus may also include one or more additional light sources arranged to provide illumination of the volume. Each additional light source may be configured to provide direct illumination of the volume only from angles within the zone. The apparatus may be configured to control the two or more colour displays and the one or more additional light sources. At least one of the illumination conditions may include, or consist of, light emitted by an additional light source.

The additional light sources may include one or more area light sources. Area light sources may include, or take the form of, monochrome displays, large area OLEDs, fluorescent bulbs, an LED/OLED panel, and so forth. Herein, an LED/OLED panel may be considered distinct from an LED/OLED colour display in that the latter is suitable for conventional display of RGB (or other colour encoded) images, whereas an LED/OLED panel is not, whether due to insufficient colour channels, insufficient resolution and so forth. Hence, an LED/OLED panel is not well suited for image display, however, the size and spacing of individual LEDs/OLEDs is such that the LED/OLED panel overall appears as an area source when viewed from the volume, as opposed to each individual LED/OLED appearing as a point source discussed hereinafter. The one or more area light sources may be arranged to provide piece-wise continuous illumination of the volume, either alone or in combination with the two or more displays.

The additional light sources may include one or more point light sources. A point light source may include, or take the form of, a LED, an OLED, a termination of an optical fibre, a camera flash associated with at least one of the one or more cameras, and so forth. A point light source may include, or take the form of, a projector such as an LCD projector, an OLED projector and so forth. A projector may output uniform illumination. A projector may output a structured (patterned) illumination condition.

A point light source may be regarded as a light source which, when viewed from within the volume (for example from the origin of the latitude-longitude parameterisation), subtends a very small solid angle compared to the smallest solid angle subtended by one of the colour displays from the same position. For example, when viewed from within the volume, a point light source may subtend a solid angle of no more than 5 degrees arc. When viewed from within the volume, a point light source may subtend a solid angle of no more than 0.1 times the smallest solid angle subtended by one of the colour displays.

The number and angular density of the one of more point light sources may be insufficient to approximate continuous illumination at the volume. For example, the minimum angle between any pair of point light sources emitting the same spectrum of light, when viewed from the volume or the centroid of the volume, should be at least 20 degrees. The minimum angle between a pair of point light sources emitting different spectra is not limited beyond physical practicality.

The two or more illumination conditions may include three or more illumination conditions including at least ninth and tenth spectrally resolvable illumination conditions. The ninth spectrally resolvable illumination condition may consist of light provided by the two or more colour displays. The tenth spectrally resolvable illumination condition may consist of light provided by all of the one or more additional light sources, or by a subset of the one or more additional light sources. The apparatus may be configured to illuminate the volume with the ninth and tenth spectrally resolvable illumination conditions concurrently. One set of images of the two or more sets of images may take the form of a fourth set of spectrally multiplexed images corresponding to a superposition of the ninth and tenth spectrally resolvable illumination conditions.

The apparatus may be configured to process the fourth set of spectrally multiplexed images to calculate respective sets of images corresponding to the ninth and tenth spectrally resolvable illumination conditions. The ninth spectrally resolvable illumination condition may be the same as the first and/or second spectrally resolvable illumination conditions.

Alternatively, spectrally resolvable illumination conditions provided by the displays and the additional light sources, for example the ninth and tenth spectrally resolvable illumination conditions, need not be provided concurrently, and may instead be provided at different times, for example according to a sequence.

The one or more additional light sources may include at least one white light source. The one or more area light sources may include at least one white light source. The one or more point light sources may include at least one white light source. A white light source may be a white LED or OLED. A white light source may be a broadband light source. The one or more additional light sources may include two or more white light sources having different colour temperatures. A white light source may have a colour temperature between 2,200 K and 7,000 K (inclusive of the end-points). A white light source may have a colour temperature selected from the group consisting of 2,700 K, 3,000 K, 4,000 K, 5,400 K, 5,600 K, 6,000 K and 6,500 K.

The one or more additional light sources may include at least one coloured light source configured to emit light which is spectrally distinct from light emitted by the two or more colour displays. The one or more area light sources may include at least one coloured light source. The one or more point light sources may include at least one coloured light source. A coloured light source may emit light having a complementary spectrum not achievable by the two or more colour displays. For example, if the two or more colour displays take the form of conventional red-green-blue (RGB) displays, then one or more additional light sources (area sources and/or point sources) may take the form of coloured light sources emitting colours which are distinct from the RGB light of the colour displays such as, for example, royal blue, lime green, amber, and so forth. A coloured light source may take the form of a white light source combined with a colour filter.

The one or more additional light sources may include at least one light source which emits at non-visible wavelengths. The one or more area light sources may include at least one light source which emits at non-visible wavelengths. The one or more point light sources may include at least one light source which emits at non-visible wavelengths. Non-visible wavelength may include infra-red (IR) light sources. Non-visible wavelength may include ultraviolet light sources. Non-visible wavelengths may correspond to wavelengths less than 380 nm or more than 700 nm.

The additional light sources may include one or more point light sources. At least one of the illumination conditions may consist of light provided by some, or all, of the one or more point light sources. At least one other illumination condition may consist of light provided by some, or all, of the two or more colour displays. The two or more sets of images may further include sufficient information for calculation of a specular roughness map of the object or subject positioned within the volume.

The apparatus may include one or more portable computing devices. Each portable computing device may include one or more digital electronic processors, memory, and a colour display. Each portable computing device may also include a front camera oriented in a same direction as the colour display and/or a rear camera oriented in an opposite direction to the colour display. Each device may provide a colour display of the two or more colour displays and/or a camera of the one or more cameras.

The one or more portable computing devices may include, or take the form of, tablet computers, smart phones, laptops, and/or other devices having analogous functionalities. Each of the two or more colour displays may be provided by a respective portable computing device. The portable computing devices may be arranged to provide piece-wise continuous illumination by detachably securing each portable computing devices to a respective mounting bracket. Each mounting bracket may be supported by a respective frame. Two or more mounting brackets may be supported on a common frame. All of the mounting brackets may be supported on a common frame. Each portable computing device may be oriented and/or orientable with the respective colour display in a landscape orientation or a portrait orientation.

All of the portable computing devices may be communicatively coupled to one another to enable coordination and synchronisation of applying illumination conditions and acquiring sets of images. All of the portable computing devices may be communicatively coupled to a coordinating data processing device, which may be one of the portable computing devices.

Flash LEDs of the front and/or rear camera(s) of at least one of the portable electronic devices may provide additional point light sources for the apparatus.

The apparatus may also include one or more depth sensors directed at the volume. The apparatus may be configured to control the one or more depth sensors to measure a 3D geometry of an object or subject positioned within the volume. Some or all of the one or more depth sensors may take the form of stand-alone depth sensors. Some or all of the one or more depth sensors may be integrated in respective portable computing devices.

Each depth sensor may include one or more sets of infra-red, IR, emitters, and one or more IR cameras. The apparatus may be further configured to control the one or more sets of IR emitters and the one or more IR cameras directly and independently. For example, rather than simply triggering a depth sensor to perform pre-programmed functions and output a 3D geometry, the apparatus may be configured to control illumination of each set of IR emitters, and to obtain image(s) from the IR camera(s) directly. If a depth sensor is inbuilt as part of a portable computing device, then the portable computing device may be loaded with additional drivers to enable direct and independent control of the one or more sets of IR emitters and the one or more IR cameras.

The two or more illumination conditions may include at least a visible illumination condition and an IR illumination condition. The visible illumination condition may be provided by at least one of the two or more colour displays and/or one or more additional light sources. The IR illumination condition may be provided by sets of IR emitters of at least one of the one or more depth sensors. The two or more sets of images may include a set of one or more visible images corresponding to the visible illumination condition using the one or more cameras. The apparatus may be further configured to obtain, using the one or more IR cameras, a set of one or more IR images corresponding to the IR illumination condition.

The IR illumination condition may not include illumination of any IR emitters which output structured light, and may be provided only by IR emitters providing unstructured (or "flood") illumination.

The visible illumination condition and the IR illumination condition may be applied concurrently. Alternatively, the visible illumination condition and the IR illumination condition may be applied separately.

The two or more illumination conditions may include at least a second visible illumination condition which is provided by at least one of the two or more colour displays and/or one or more additional light sources. The apparatus may be further configured to obtain, using the one or more IR cameras, a second set of one or more IR images corresponding to the second visible illumination condition. The second set of one or more IR images may image fluorescence of the object or subject excited by the second visible illumination condition.

The two or more illumination conditions may include at least one partial spherical illumination condition having an origin within the volume. A partial spherical illumination condition refers to a spherical illumination condition which is truncated by the periphery of the zone.

A partial spherical illumination condition may be an illumination condition in which pixel intensities of the colour displays providing said illumination condition are controlled so as to simulate emission from the surface of a sphere. The intensities of one or more additional light sources may be similarly controlled.

For example, a partial spherical illumination condition defined in latitude-longitude spherical parameterisation ($\alpha$, $\beta$) may correspond to an angular intensity distribution $S(\alpha, \beta)$, about an origin within the volume (where $\alpha$, $\beta$ are limited to within the zone as explained hereinbefore). In some examples the spherical illumination condition $S(\alpha, \beta)$ may be constant, i.e. a uniform illumination condition. The spherical illumination condition $S(\alpha, \beta)$ may be simulated (or in alternative language "approximated") using two or more displays by adjusting the pixel intensity values to reference values $S_0(\alpha, \beta)$ corresponding to a reference radius $r_0$. For a pixel at coordinate $(r_p, \alpha_p, \beta_p)$ (in which $r_p$ is the distance of the pixel from the origin), the intensity may be adjusted by a factor $(r_p)^2/(r_0)^2$. For example, the illumination intensity function for the pixel at coordinate $(r_p, \alpha_p, \beta_p)$ may be expressed as:

$$S(r_p, \alpha_p, \beta_p) = \frac{r_p^2}{r_0^2} S_0(\alpha_p, \beta_p)$$

Since the reference radius is only needed to normalise relative intensities across the two or more colour displays, the reference radius $r_0$ need not correspond to a physical coordinate $(r_p, \alpha_p, \beta_p)$ of any pixel of the two or more displays. However, for simplicity the reference radius $r_0$ may be taken as corresponding to the coordinate $(r_p, \alpha_p, \beta_p)$ of a reference pixel of one of the two or more colour displays.

If the two of more displays are provided by displays of respective portable computing devices, then internal sensors such as accelerometers built into the portable computing devices may be used to track relative positions and/or orientations of the two or more displays. Tracking relative positions and orientations may assist in calibrating the physical pixel coordinates $(r_p, \alpha_p, \beta_p)$ for the two or more colour displays of the apparatus. For example, a calibration may be started with a portable computing device providing one of the two of more displays positioned parallel to, and abutting, a planar calibration object located within the intended volume. The portable computing device may then be moved and mounted to a bracket whilst the inbuilt accelerometer(s) track orientation and position.

Alternatively, if the two or more colour displays are provided by displays of respective portable computing devices, then when present, built in front-facing (or "selfie") cameras may be harnessed for calibration of the physical pixel coordinates $(r_p, \alpha_p, \beta_p)$. For example, a test object bearing a number of registration indicia may be placed within the volume and imaged using the front-facing cameras of at least each portable computing device providing a colour display. The relative orientations and distances of the front-facing cameras from one another and the test object may be calculated, and furthermore each portable computing device has a known (or at least measureable) geometric relationship between its display and its front-facing camera (when present).

The origin of the spherical illumination condition within the volume may be pre-calibrated. The origin of the spherical illumination condition within the volume may be controllable by the apparatus.

In implementations in which the apparatus is configured to enable calculating a 3D geometry of the object or subject, the apparatus may be configured to calculate and apply corrections to the spherical illumination condition to account for a position and/or orientation of the object or subject. The apparatus may be configured to calculate a 3D geometry of the object or subject. The apparatus may be configured to transmit the sets of images to a data processing device, and to receive processed data from the data processing device which includes a 3D geometry of the object or subject.

The apparatus may be configured to calculate or estimate a geometric centroid of the object or subject (or at least the portion thereof within the volume) based on the 3D geometry calculated for the object or subject (or obtained using one or more depth sensors). The apparatus may be configured to adjust the origin of the spherical illumination condition to coincide with the geometric centroid of the object/subject. The apparatus may be configured to calculate or estimate an orientation of the object or subject based on the 3D geometry of the object or subject (whether obtained by calculation or from one or more depth sensors). The apparatus may be configured to rotate the angular coordinate system ($\alpha$, $\beta$) for an illumination condition $S(\text{---}, \beta)$ to a rotated coordinate system ($\alpha'$, $\beta'$) in which the "front" reference direction $\alpha'=0$, $\beta'=0$ coincides with the orientation of the object or subject.

The two or more illumination conditions may include at least one parabolic illumination condition having a focus within the volume. The two or more illumination conditions may include at least one ellipsoidal illumination condition having a focus within the volume. Parabolic and/or ellipsoidal illumination conditions may be intensity modulated in the same way as spherical illumination conditions.

The two or more illumination conditions may include at least one uniform illumination condition. The two or more illumination conditions may include, or take the form of, basis illumination conditions and/or their respective complements, selected from the group consisting of uniform illumination, horizontally and vertically aligned binary patterns, 2D Haar wavelet patterns, phase shifted sinusoidal patterns, hemispherical harmonics, zonal basis functions, steerable radial basis functions, 2D Gaussians, Spherical Gaussians and localised piece-wise constant bases. A localised piece-wise constant basis may take the form of sets of line of bands oriented along a pair of directions. For example, a localised piece-wise constant basis may take the form of a set of lines or bands corresponding to planes of latitude (relative to the volume 13) and a set of lines or bands corresponding to planes of longitude (relative to the volume 13).

Some or all of the basis illumination conditions may be intensity modulated across the area of the two or more colour displays to account for the form factor of the displays. In other words, to account for varying distances between the volume and pixels on different parts of the colour display (see also the discussion of pixel coordinates and intensity adjustments hereinbefore).

Phase shifted sinusoidal patterns may have phase shifts along latitudinal and longitudinal directions $\alpha$, $\beta$ of a latitude-longitude spherical parameterisation ($\alpha$, $\beta$). Phase shifted sinusoidal patterns may have phase shifts along spherical directions $\theta$, $\varphi$ of a spherical polar coordinate system ($\theta$, $\varphi$).

A localised piece-wise constant basis may corresponding to an illumination condition in which only a small section of a colour display of the two or more colour displays is switched-on at a time.

The illumination conditions may belong to a single type of basis illumination condition. The illumination conditions may include a mixture of two or more types of basis illumination condition. Basis functions in the abstract mathematical sense may span negative to positive numbers, utilisation of such basis functions to provide a basis illumination condition requires mapping the range [−1, 1] to a range [0, 1] which is suitable to output using illumination intensity.

In some examples, intensity values of an illumination condition may be additionally modulated by pixel coordinates as described hereinbefore, in addition to a basis function. Combinations of two or more basis functions may be spectrally multiplexed for concurrent illumination.

Basis functions in the form of binary patterns may include:

$$B_1 = \begin{cases} 1 \text{ if } \alpha > 0 \\ 0 \text{ otherwise} \end{cases}$$

$$B_2 = \begin{cases} 1 \text{ if } \beta > 0 \\ 0 \text{ otherwise} \end{cases}$$

$$B_3 = \begin{cases} 1 \text{ if } \alpha > 0 \text{ AND } \beta > 0 \\ 1 \text{ if } \alpha < 0 \text{ AND } \beta < 0 \\ 0 \text{ otherwise} \end{cases}$$

and may also include the respective complements $B_1^*$, $B_2^*$ and $B_3^*$. A value of 1 may correspond to full intensity. Binary patterns may be rotated about the direction $\alpha=\beta=0$.

Sinusoidal patterns may include:

$$S_\alpha = \sin\left(\frac{\alpha}{C}\right)$$

$$S_\beta = \sin\left(\frac{\beta}{D}\right)$$

and phase shifted versions thereof, in which C and D are constants determining the respective spatial frequencies of the patterns $S_\alpha$ and $S_\beta$. Sinusoidal patterns may be rotated about the direction $\alpha=\beta=0$.

Further sinusoidal patterns may additionally or alternatively be defined in terms of a spherical polar coordinate system ($\theta$, $\varphi$) with polar angle $\theta$ and azimuthal angle $\varphi$. The polar direction $\theta=0$ may be substantially aligned (e.g. 10 degrees/$\pi$/18) with the direction $\alpha=\beta=0$ in latitude/longitude coordinates:

$$S_P = \sin\left(\frac{\varphi}{E}\right)$$

and phase shifted versions thereof, in which E is a constant determining the spatial frequencies of the pattern $S_P$.

The apparatus may be configured to use at least one of the two or more displays to display a 3D rendering based on a calculated reflectance map and a photometric normal map determined based on the two or more sets of images.

The apparatus may be configured to use two or more colour displays to display the 3D rendering. Each colour display used may display the 3D rendering from a different angle. The apparatus may be configured to cause each colour display to present a view of the 3D rendering from an orientation corresponding to the angle of that colour so display relative to the volume.

The apparatus may be configured to use at least one of the two or more displays to display a calculated reflectance map and/or a photometric normal map determined based on the two or more sets of images. A reflectance map or photometric normal may be displayed using an appropriate 2D parameterization.

The apparatus may be configured to apply the two or more illumination conditions in a repeating sequence. The refresh periods of each of the two or more colour displays may be synchronised. The apparatus may be configured to obtain the two or more sets of images in the form of video data. The exposure periods of the one or more cameras may be synchronised with one another and with the refresh periods of the two or more colour displays. Video data may be obtained at a frame rate of greater than or equal to 24 frames-per-second (FPS), greater than or equal to 30 FPS, greater than or equal to 60 FPS or greater than or equal to 120 FPS.

The refresh periods of a pair of colour displays may be regarded as synchronised if they are refreshing at the same rate, and if each starts and ends refreshing at substantially the same time. The exposure periods of a pair of cameras may be regarded as synchronised if they start and end an exposure (for a CCD camera) or scan (for a CMOS camera) at the substantially the same time. The exposure period of a camera obtaining a frame of video data may be regarded as synchronised with the refresh period of a colour display if the exposure period is an integer multiple (one or more) of the refresh period, and if the exposure period starts at substantially the same time as a refresh period. Substantially the same time may mean within a period corresponding to the frame rate of the video data. Substantially the same time may mean within 4 ms.

The two or more sets of images may correspond to a subset of video data. For example, frames of video data during which an illumination condition output by a colour display is switched to a different illumination condition.

Any additional light sources, whether area light sources or point light sources, may be synchronised in the same way as the two or more colour displays. Any sets of IR emitters may be synchronised in the same way as the two or more colour displays.

At least one of the two or more displays may take the form of a light-field display. Additionally or alternatively, at least one of the one or more cameras may take the form of a light-field camera. All of the two of more displays may take the form of light-field displays.

The apparatus may be configured to calculate the reflectance map and the photometric normal map of the object or subject.

The apparatus may be configured to calculate two or more reflectance maps of the object or subject. The apparatus may be configured to calculate two or more photometric normal maps of the object or subject. For example, different reflectance maps/photometric normal maps may be calculated from the same inputs using different algorithms. In implementations configured to use three or more illumination conditions, different reflectance maps/photometric normal maps may be calculated using different combinations of inputs.

The apparatus may be configured to calculate a separation of any or all calculated reflectance maps into diffuse and specular components. The apparatus may be configured to calculate a separation of any or all calculated photometric normal maps into diffuse and specular components. The apparatus may be configured to calculate one or more 3D geometries of the object or subject. The apparatus may be configured to calculate one or more specular roughness maps of the object or subject. The apparatus may be configured to generate the 3D rendering.

The apparatus may include a data processing device, for example a desktop or laptop personal computer.

When the apparatus includes two or more portable computing devices, calculations to generate one or more reflectance maps, photometric normal maps, and/or 3D geometries may be either centralised for execution by a single portable computing device or distributed across two or more portable computing devices. When the apparatus includes two or more portable computing devices, calculations to separate one or more reflectance maps/photometric normal into diffuse and specular components, may be either centralised for execution by a single portable computing device or distributed across two or more portable computing devices.

Calculation of the photometric normal map may be based on singular value decomposition. Photometric normals may additionally or alternatively be calculated directly. Photometric normals calculated based on singular value decomposition may be rotated based on directly calculated photometric normals.

Each colour display may be configured as a local or nearfield light source for illumination of the volume. At least part of each colour display may be within 1 m (metre) of the volume. At least part of each colour display may be within 50 cm (centimetres) of the volume.

Each area light source may be configured as a local or nearfield light source for illumination of the volume. At least part of each area light source may be within 1 m (metre) of the volume. At least part of each area light source may be within 50 cm (centimetres) of the volume.

Each point light source may be configured as a distant, directional or farfield light source for illumination of the volume. Each point light source may also provide local, or nearfield illumination of an object within the volume, in dependence upon a distance to the volume and the size of an object illuminated within the volume.

A system may include the apparatus according to the first aspect, and a data processing device communicatively coupled to the apparatus. The apparatus may be configured to transmit the two or more sets of images to the data processing device. The data processing device may be configured to calculate the reflectance map and the photometric normal map of the object or subject based on the two or more sets of images.

The data processing device may be further configured to transmit the calculated reflectance map and photometric normal map of the object or subject to the apparatus. The data processing device may be local to the apparatus (for example within the same room or and the same building) or remote from the apparatus (for example in a different building, city and/or country). The data processing device may be communicatively coupled to the apparatus via a direct wired and/or wireless link. The data processing device may be communicatively coupled to the apparatus via a network including wired and/or wireless links (for example a local area network, the internet and so forth).

The data processing device may be configured to calculate two or more reflectance maps of the object or subject. The data processing device may be configured to calculate two or more photometric normal maps of the object or subject. For example, different reflectance maps/photometric normal maps may be calculated from the same inputs using different algorithms. In implementations configured to use three or more illumination conditions, different reflectance maps/photometric normal maps may be calculated using different combinations of inputs.

The data processing device may be configured to calculate a separation of any or all calculated reflectance maps into diffuse and specular components. The data processing device may be configured to calculate a separation of any or all calculated photometric normal maps into diffuse and specular components. The data processing device may be configured to calculate one or more 3D geometries of the object or subject. The data processing device may be configured to calculate one or more specular roughness maps of the object or subject. The data processing device may be configured to generate the 3D rendering. Any or all of the outputs of calculations by the data processing device may be transmitted to the apparatus.

Calculation of the photometric normal map may be based on singular value decomposition. Photometric normals may additionally or alternatively be calculated directly. Photometric normals calculated based on singular value decomposition may be rotated based on directly calculated photometric normals.

A backlit system may include the apparatus according to the first aspect, and a backlighting arrangement configured to continuously illuminate the volume from the opposite direction to the zone. The backlit system may be configured to control the backlighting arrangement to illuminate the volume whilst the apparatus provides no illumination, and to obtain a reference image corresponding to each camera of the apparatus.

In the same way as the system, the backlit system may include the data processing device configured to calculate the reflectance map and the photometric normal map of the object or subject based on the two or more sets of images.

The reference images may be used to calculate one or more of silhouettes (also referred to as a "matte maps") and/or translucency maps of an object or subject positioned in the volume.

It should be noted that the backlighting arrangement cannot simply approximate continuous illumination. For example, a typical light-stage arrangement with closely spaced lights such as LED's is not suitable for backlighting. Examples of a backlighting arrangement include a diffusively reflective screen illuminated by a light source, a display large enough to extend beyond the volume from the perspective of at least one camera of the apparatus, or a large area OLED. In other words, if the backlighting arrangement is provided by more than two light sources, then these must be so closely spaced as to be irresolvable by any of the cameras of the apparatus.

A telepresence system may include a first arrangement which is an apparatus according the first aspect, or a system incorporating said apparatus. The telepresence system may also include a second arrangement communicatively coupled to the first arrangement, and including one or more colour displays and one or more cameras. The colour displays of the second arrangement may be configured to display an object or subject imaged using the first arrangement.

The colour displays of the first arrangement may also display an object or subject imaged using the second arrangement.

The telepresence system may be configured such that at least one display of the second arrangement displays video data obtained using a corresponding camera of the first arrangement. The telepresence system may be configured such that at least one display of the first arrangement displays video data obtained using a corresponding camera of the second arrangement.

The second arrangement may be configured to display, using at least one colour display, a 3D rendering based on a calculated reflectance map and a photometric normal map determined based on the two or more sets of images obtained using the first arrangement. The second arrangement may include two or more colour displays, and may be configured such that each colour display presents the 3D rendering from a different angle. The first arrangement may be configured to display a 3D rendering obtained from the second arrangement in an analogous way.

The first arrangement may include one or more depth sensors, and the second arrangement may be configured to rotate a 3D rendering and/or apply perspective shift effects to frames of video data output by respective colour displays. The second arrangement may include one or more depth sensors, and the first arrangement may be configured to rotate a 3D rendering and/or apply perspective shift effects to frames of video data output by respective colour displays.

The second arrangement may also be an apparatus according to the first aspect. The second arrangement may be configured to be substantially the same as the apparatus of the first aspect, except that the two or more colour displays and the one or more cameras may be reversed to point away from the volume. Such a "reversed" apparatus may include features corresponding to any feature of the apparatus according to the first aspect.

The second arrangement may be configured to use the one or more cameras and/or one or more light sensors included in the second arrangement to obtain a sampling of environment illumination conditions at a location of the second arrangement. The second arrangement may be configured to re-light the object or subject imaged using the first arrangement based on the sampling of environment illumination conditions at the location of the second arrangement.

Environment illumination conditions may be directionally and/or time varying. Re-lighting the object or subject may include changing light conditions applied to a 3D rendering obtained from the first arrangement. Re-lighting the object or subject may include processing frames of video data obtained from the first arrangement.

The first and second arrangements may be reciprocally configured such that the first arrangement may re-light an object or subject imaged using the second arrangement in the same way.

The second arrangement may be configured to use the one or more cameras and/or one or more light sensors included in in the second arrangement to obtain a sampling of environment illumination conditions at a location of the second arrangement. The first arrangement may be configured use its respective two or more colour displays to illuminate an imaged object or subject using an illumination condition based on the sampling of environment illumination conditions at the location of the second arrangement.

The illumination condition may approximate the sampling of environment illumination conditions, such that an object or subject imaged using the first arrangement is illuminated as though they were at the location of the second arrangement.

The first and second arrangements may be reciprocally configured such that the second arrangement may illuminate an object or subject using an illumination condition based on the sampling of environment illumination conditions at the location of the first arrangement.

The apparatus according to the first aspect, or a system incorporating said apparatus, may be configured to implement the methods according to any one of the eleventh to sixteenth aspects, whether individually or in any combination.

According to a second aspect of the invention, there is provided a method including use of the apparatus according to the first aspect, or of a system incorporating said apparatus, to obtain one or more reflectance maps and one or more photometric normal maps of an object or subject.

The method may include features corresponding to any feature of the apparatus according to the first aspect, or of a system incorporating said apparatus. Definitions applicable to the apparatus according to the first aspect, or of a system incorporating said apparatus, are equally applicable to the method according to the second aspect.

According to a third aspect of the invention, there is provided apparatus including two or more colour displays arranged to provide piece-wise continuous illumination of a volume. The apparatus also includes one or more cameras. Each camera is arranged to image the volume. The apparatus is configured to control the two or more colour displays and the one or more cameras: to illuminate the volume using a first illumination condition, wherein in the first illumination condition pixel intensities of each the two or more colour displays are controlled to approximate a uniform spherical illumination from the angles covered by the two or more colour displays, and to obtain a first set of images. The first set of images includes sufficient information for calculation of an albedo map of an object or subject positioned within the volume. When viewed from the volume, the apparatus only provides direct illumination of the volume from angles within a zone of a hemisphere. The zone is less than a hemisphere and corresponds to a first range of latitudinal angles and a second range of longitudinal angles. Each of the first and second ranges is no more than $17\pi/18$.

The apparatus according to the third aspect may include features corresponding to any features of the apparatus according to the first aspect, or a system incorporating the apparatus according to the first aspect. Definitions applicable to the apparatus according to the first aspect, or a system incorporating the apparatus according to the first aspect, are equally applicable to the apparatus according to the third aspect and/or systems incorporating the apparatus according to the third aspect.

Uniform spherical illumination means spatially uniform as described in relation to the apparatus of the first aspect. The uniform spherical illumination may have any desired spectrum. For example, the uniform spherical illumination may be white, mono-coloured, or multi-coloured. In addition to the first illumination condition, the apparatus may also illuminate the volume using one or more further illumination conditions, each of which may correspond to white, mono-coloured, or multi-coloured uniform spherical illumination. The apparatus may obtain a further set of images corresponding to each further illumination condition.

The apparatus may be configured to calculate the albedo map. When one or more further illumination conditions are applied, the apparatus may be configured to calculate the albedo map based on the first set of images and to calculate further albedo maps based on each further set of images. The apparatus may be configured to calculate the albedo map based on the first set of images and one or more further sets of images.

A telepresence system may include the apparatus according to the third aspect in an analogous way to the telepresence system including the apparatus according to the first aspect.

According to a fourth aspect of the invention there is provided a method including use of the apparatus according to the third aspect of the invention to obtain an albedo map so of an object or subject.

The method according to the fourth aspect may include features corresponding to any features of the apparatus according to the first aspect, or a system incorporating the apparatus according to the first aspect. Definitions applicable to the apparatus according to the first aspect, or a system incorporating the apparatus according to the first aspect, are equally applicable to the method according to the fourth aspect.

According to a fifth aspect of the invention, there is provided apparatus including one or more colour displays arranged to provide piece-wise continuous illumination of a volume. The apparatus also includes one or more point light sources arranged to provide illumination of the volume. The apparatus also includes one or more cameras. Each camera is arranged to image the volume. The apparatus is configured to control the one or more colour displays, the one or more point light sources, and the one or more cameras to illuminate the volume with a first illumination condition in which none of the one or more point light sources are illuminated, and to obtain a first set of one or more images. The apparatus is also configured to control the one or more colour displays, the one or more point light sources, and the one or more cameras to illuminate the volume with a second illumination condition in which only the one or more point light sources are illuminated, and to obtain a second set of one or more images. The first and second sets of images include sufficient information for calculation of a specular roughness map of an object or subject positioned within the volume.

The apparatus according to the fifth aspect may include features corresponding to any features of the apparatus according to the first aspect, or a system incorporating the apparatus according to the first aspect. Definitions applicable to the apparatus according to the first aspect, or a system incorporating the apparatus according to the first aspect, are equally applicable to the apparatus according to the fifth aspect and/or systems incorporating the apparatus according to the fifth aspect.

A telepresence system may include the apparatus according to the fifth aspect in an analogous way to the telepresence system including the apparatus according to the first aspect.

According to a sixth aspect of the invention, there is provided a method including use of the apparatus according to the fifth aspect of the invention to obtain a specular roughness map of an object or subject.

The method according to the sixth aspect may include features corresponding to any features of the apparatus according to the first aspect, or a system incorporating the apparatus according to the first aspect. Definitions applicable to the apparatus according to the first aspect, or a system incorporating the apparatus according to the first aspect, are equally applicable to the method of the sixth aspect.

According to a seventh aspect of the invention, there is provided apparatus including one or more colour displays arranged to provide piece-wise continuous illumination of a volume. The apparatus also includes one or more visible light cameras. Each camera is arranged to image the volume. The apparatus also includes one or more depth sensors directed at the volume. Each depth sensor includes one or more sets of infra-red, IR, emitters arranged to illuminate the volume and one or more IR cameras. The apparatus is configured to control the one or more colour displays, the one or more cameras and the one or more depth sensors to illuminate the volume using a first illumination condition provided by the one or more colour displays, and to obtain a first set of one or more images using the one or more visible light cameras. The apparatus is also configured to control the one or more colour displays, the one or more cameras and the one or more depth sensors to illuminate the volume with a second illumination condition corresponding to flood illumination by the IR emitters of the one or more depth sensors, and to obtain a second set of one or more images using the IR cameras of the one or more depth sensors. The apparatus is further configured to calculate a mapping between the first set of images and the second set of images.

The apparatus according to the seventh aspect may include features corresponding to any features of the apparatus according to the first aspect, or a system incorporating the apparatus according to the first aspect. Definitions applicable to the apparatus according to the first aspect, or a system incorporating the apparatus according to the first aspect, are equally applicable to the apparatus according to the seventh aspect and/or systems incorporating the apparatus according to the seventh aspect.

A telepresence system may include the apparatus according to the seventh aspect in an analogous way to the telepresence system including the apparatus according to the first aspect.

According to an eighth aspect of the invention, there is provided a method including use of the apparatus according to the seventh aspect of the invention to obtain a first set of images using one or more visible light cameras, a second set of images using IR cameras of one or more depth sensors, and a mapping between the first and second sets of images.

The method according to the eighth aspect may include features corresponding to any features of the apparatus according to the first aspect, or a system incorporating the apparatus according to the first aspect. Definitions applicable to the apparatus according to the first aspect, or a system incorporating the apparatus according to the first aspect, are equally applicable to the method according to the eighth aspect.

According to a ninth aspect of the invention there is provided a frame including a plurality of mounting brackets. Each mounting bracket is configured to receive a device comprising a colour display and/or a camera. The frame supports each mounting bracket at a relative position and orientation such that a combination of the frame with devices mounted to at least two of the mounting brackets will result in an arrangement of two or more colour displays, and one or more cameras, suitable for implementing an apparatus according to any one of the first, third, fifth and/or seventh aspects.

The frame may include features corresponding to any features of an apparatus according to the first, third, fifth and/or seventh aspects, or systems incorporating an apparatus according to the first, third, fifth and/or seventh aspects. Definitions applicable to the apparatus and/or systems according to first aspect are equally applicable to the frame and/or systems including the frame. A telepresence system may include the frame.

According to a tenth aspect of the invention, there is provided a kit including one or more frames. Each frame includes one or more mounting brackets configured to receive a device comprising a colour display and/or a camera.

The kit may also include the devices. Each device may be a portable computing device as defined in relation to the apparatus according to the first aspect. The kit may be so suitable for implementing an apparatus according to any one of the first, third, fifth and/or seventh aspects of the invention.

The kit may also include one or more test objects configured such that, when the kit is combined with devices mounted to at least two of the mounting brackets so as to result in an arrangement of two or more colour displays and one or more cameras suitable for implementing an apparatus according to the first aspect, the one or more cameras may be used to image the one or more test objects. The resulting images may include sufficient information to enable calibration of the relative positions of the one or more colour displays and the one or more cameras relative to the volume.

The kit may include further parts configured to provide features corresponding to any features of an apparatus according to any one of the first, third, fifth and/or seventh aspects of the invention, or system incorporating an apparatus according to any one of the first, third, fifth and/or seventh aspects of the invention. Definitions applicable to the apparatus according to the first aspect, or a system incorporating the apparatus according to the first aspect, are equally applicable to the kit and/or a system implemented using the kit. A telepresence system may be implemented using one or more kits.

According to an eleventh aspect of the invention, there is provided a method of obtaining a reflectance map and a photometric normal map of an object. The method includes receiving two or more images of the object. Each image is obtained from the same viewpoint. The images show the object illuminated using three or more illumination conditions. The illumination conditions include a first illumination condition in the form of a binary pattern along a first direction. The illumination conditions also include a second illumination condition in the form of binary pattern along a second direction which is different to the first direction. The illumination conditions also include at least one selected from: a third illumination condition which is a complement of the first illumination condition; a fourth illumination condition which is a complement of the second illumination condition; and a fifth illumination condition which is a uniform illumination condition. The method also includes calculating the reflectance map and the photometric normal map of the object based on the set of images. All of the illumination conditions are applied to the object from a hemisphere, or from a zone which is less than a hemisphere. Each of the first and second directions is substantially orthogonal to a reference line extending from the so object at an angle within the zone.

The reference line may correspond to a midline of the apparatus according to the first aspect. The reference line may correspond to zero latitude and zero longitude relative to the volume.

The fifth illumination condition corresponds to a sum of the first and third illumination conditions. The fifth illumination condition also corresponds to a sum of the second and fourth illumination conditions.

The first and second directions may be substantially orthogonal. The language "substantially orthogonal" may include $\pi/2 \pm \pi/18$ (90±10 degrees). The first direction may correspond to a unit vector of latitude and the second direction may correspond to a unit vector of longitude. The binary patterns may be as defined in relation to the apparatus of the first aspect, for example $B_1$, $B_2$ and/or $B_3$.

The two or more images of the object may be obtained using the apparatus according to the first aspect or a system incorporating the apparatus according to the first aspect.

The method of obtaining a reflectance map and a photometric normal map of an object may also include obtaining the two or more images of the object.

At least one image may corresponds to two or more spectrally multiplexed illumination conditions. The illumination conditions may be spectrally multiplexed in red, green and/or blue channels.

Spectrally adjacent illumination conditions may not spatially overlap. For example, a first binary pattern encoded in green light may not spatially overlap a second binary pattern encoded in blue light, binary patterns encoded in green and red light may not spatially overlap, and so forth depending on camera sensitivity and spectral overlaps of colour channels of the camera. A pair of illumination conditions may be considered as not spatially overlapping if one illuminates the object from angles (as viewed from the object), from which the other does not illuminate the object, and vice-versa.

The two or more images may consist of a first image and a second image. The sum of the first and second images may correspond to uniform illumination using white light.

The method may also include separating the reflectance map into diffuse and specular components.

The method may also include separating the photometric normal map into diffuse and specular components.

Calculation of the photometric normal map may be based on singular value decomposition. Photometric normals may additionally or alternatively be calculated directly. Photometric normals calculated based on singular value decomposition may be rotated based on directly calculated photometric normals.

The method according to the eleventh aspect may be carried out using the apparatus according to the first aspect, or a system incorporating the apparatus according to the first aspect. Definitions applicable to the apparatus according to the first aspect, or a system incorporating the apparatus according to the first aspect, are equally applicable to the method according to the eleventh aspect.

The method according to the eleventh aspect may include, or be combined with, the methods according to any of the twelfth to sixteenth aspects, whether individually or in any combination.

According to a twelfth aspect of the invention, there is provided a method of imaging an object for obtaining a reflectance map and a photometric normal map of that object. The method includes obtaining at least two images of the object from the same viewpoint. The images correspond to the object illuminated using three or more illumination conditions. The illumination conditions include a first illumination condition in the form of a binary pattern along a first direction. The illumination conditions also include a second illumination condition in the form of binary pattern along a second direction which is perpendicular to the first direction. The illumination conditions also include at least one selected from: a third illumination condition which is a complement of the first illumination condition; a fourth illumination condition which is a complement of the second illumination condition; and a fifth illumination condition which is a uniform illumination condition. All of the illumination conditions are applied to the object from a hemisphere, or from a zone which is less than a hemisphere. Each of the first and second directions is substantially orthogonal to a reference line extending from the object at an angle within the zone.

The method according to the twelfth aspect may be carried out using the apparatus according to the first aspect, or a system incorporating the apparatus according to the first aspect. The reference line may correspond to a midline of the apparatus according to the first aspect. The reference line may correspond to zero latitude and zero longitude relative to the volume.

The method according to the twelfth aspect may include any features corresponding to the method according to the eleventh aspect. Definitions applicable to the method according to the eleventh aspect are equally applicable to the method according to the twelfth aspect.

The method according to the twelfth aspect may include, or be combined with, the methods according to any of the eleventh and thirteenth to sixteenth aspects, whether individually or in any combination.

According to a thirteenth aspect of the invention, there is provided a method of obtaining a specular normal map of an object. The method includes receiving five or more images of the object. Each image is obtained from the same viewpoint. The images show the object illuminated using illumination conditions including first, second and third illumination conditions in the form of sinusoidal patterns along a first direction. The second and third illumination conditions correspond to the first illumination condition phase shifted by different angles. The images also show the object illuminated using illumination conditions including fourth and fifth illumination conditions in the form of sinusoidal patterns along a second direction substantially orthogonal to the first direction. The fifth illumination condition corresponds to the fourth illumination condition phase shifted by an angle. The method also includes calculating the specular normal map of the object based on the five or more images.

The method according to the thirteenth aspect may be carried out using the apparatus according to the first aspect, or a system incorporating the apparatus according to the first aspect. In particular, the five or more images of the object may be obtained using the apparatus according to the first aspect or a system incorporating the apparatus according to the first aspect. Definitions applicable to the apparatus according to the first aspect, or a system incorporating the apparatus according to the first aspect, are equally applicable to the method according to the thirteenth aspect.

The illumination conditions may be applied from a sphere, a zone of a sphere larger than a hemisphere, a hemisphere, or a zone of a hemisphere which is less than a hemisphere.

The language "substantially orthogonal" may include $\pi/2 \pm \pi/18$ (90±10 degrees). The first direction may correspond to a unit vector of latitude and the second direction may correspond to a unit vector of longitude. The sinusoidal patterns may be as defined in relation to the apparatus of the first aspect, for example $S_\alpha$ and $S_\beta$.

The specular normal map of the object may be calculated based on the five or more images and the viewpoint. The specular normal map of the object may be calculated based on the five or more images, and one or both of an angle and a position of the viewpoint relative to the object. The method may also include receiving or calculating the angle and/or the position of the viewpoint relative to the object.

The method may also include receiving an albedo map corresponding to the object, and separating the albedo map into diffuse and specular components. The albedo map may correspond to the viewpoint.

The first to fifth illumination conditions may be applied from a hemisphere or a zone which is less than a hemisphere. The method may also include receiving two further images. The two further images may correspond respectively to sixth and seventh illumination conditions in the form of radial sinusoidal patterns about a direction connecting the object to the viewpoint. The seventh illumination condition may correspond to the sixth illumination condition phase shifted by an angle. The method may also include calculating a specular anisotropy map of the object based on the two further images and the specular normal map. The radial sinusoidal patterns may be as defined in relation to the apparatus of the first aspect, for example $S_P$, with the polar direction substantially aligned to the direction connecting the object to the viewpoint.

The method according to the thirteenth aspect may include, or be combined with, the methods according to any of the eleventh, twelfth and fourteenth to sixteenth aspects, whether individually or in any combination.

According to a fourteenth aspect of the invention, there is provided a method of obtaining a specular anisotropy map of an object. The method includes receiving three or more images of the object. Each image is obtained from the same viewpoint. The images show the object illuminated using illumination conditions including first, second and third illumination conditions in the form of radial sinusoidal patterns about a direction connecting the object to the viewpoint. The second and third illumination conditions correspond to the first illumination condition phase shifted by different angles. The method also includes calculating the specular anisotropy map of the object based on the three or more images. All of the illumination conditions are applied to the object from a hemisphere or from a zone which is less than a hemisphere.

The radial sinusoidal patterns may be as defined in relation to the apparatus of the first aspect, for example $S_P$, with the polar direction substantially aligned to the direction connecting the object to the viewpoint.

The method according to the fourteenth aspect may be carried out using the apparatus according to the first aspect, or a system incorporating the apparatus according to the first aspect. In particular, the three or more images of the object may be obtained using the apparatus according to the first aspect or a system incorporating the apparatus according to the first aspect. Definitions applicable to the apparatus according to the first aspect, or a system incorporating the apparatus according to the first aspect, are equally applicable to the method according to the fourteenth aspect.

The method according to the fourteenth aspect may include, or be combined with, the methods according to any of the eleventh to thirteenth, fifteenth and sixteenth aspects, whether individually or in any combination.

According to a fifteenth aspect of the invention, there is provided a method of obtaining a specular reflectance map of an object. The method includes receiving a first colour image of the object illuminated using a first white light illumination condition. The first image is obtained from a viewpoint. The first illumination condition corresponds to direct illumination of a region of a surface of the object. The method also includes calculating first luminance components of the first image. The method also includes receiving a second colour image of the object illuminated using a second white light illumination condition. The second image is obtained from the viewpoint. The second so illumination condition corresponds to only indirect illumination of the region of the surface of the object. The method also includes calculating second luminance components of the second image. The method also includes, for each pixel corresponding to the region of the surface of the object, calculating a specular reflectance as a weighted difference of the first and second luminance components.

The region of the surface of the object is preferably formed of a dielectric material. White light may be defined as light emitted by a white light source as defined in relation to the apparatus according to the first aspect.

The luminance components may be calculated according to any colour space. For example, luminance components may be calculated as the L channel in lab colour space, the L channel in luv colour space, the Y channel in Yuv space or the V channel in HSV color space. Luminance components may alternatively be referred to as luminance values.

The method may also include, for each pixel corresponding to the region of the surface of the object, calculating the diffuse reflectance as a difference of total reflectance and the calculated specular reflectance.

The first illumination condition may take the form of a binary pattern and the second illumination condition may take the form of a complement of the binary pattern, such that the region of the surface of the object corresponds to the visible surface of the object. The visible surface of the object may refer to the surface of the object visible from the viewpoint.

Calculating the specular reflectance of a pixel corresponding to the region of the surface of the object may include determining the larger of the first and second luminance components, and in response to the first luminance component is larger, calculating the specular reflectance according to:

specular=$L_1-\gamma L_2$

Calculating the specular reflectance of a pixel corresponding to the region of the surface of the object may include determining the larger of the first and second luminance components, and in response to the second luminance component is larger, calculating the specular reflectance according to:

$$\text{specular} = L_2 - \frac{1}{\gamma}L_1$$

Wherein specular is the specular reflectance of the pixel, $L_1$ is the first luminance component, $L_2$ is the second luminance component and $\gamma$ is a weighting factor.

The method may also include calculating first chroma components of the first image and calculating second chroma components of the second image. The weighting factor $\gamma$ may be calculated as:

$$\gamma = \frac{Ch_1}{Ch_2}$$

Wherein $Ch_1$ is the first chroma component and $Ch_2$ is the second chroma component.

Chroma components may be calculated according to any colour space. For example the chroma component may be calculated as the magnitude of the individual chroma components in lab, luv or Yuv spaces. For example, $(a^2+b^2)^{0.5}$ in lab colour space, $(u^2+v^2)^{0.5}$ in luv colour space, or as the range of RGB (max-min) in HSV colour space.

The colour space used for calculating chroma components is preferably the same colour space used for calculating luminance components. Chroma components may alternatively be referred to as chroma values.

The first and second images may include a number Nc of colour channels. The number Nc may be two or more. The weighting factor $\gamma$ may be calculated as an average of one or more estimated weighting factors $\gamma^*$. Each estimated weighting factor $\gamma^*$ may be calculated for a different pairing of colour channels as:

$$\gamma^* = \frac{Col_1^n - Col_1^{k \neq n}}{Col_2^n - Col_2^{k \neq n}}$$

Wherein $Col_1^n$ is the value in the first image of the $n^{th}$ of Nc colour channels, and $Col_2^n$ is the value in the second image of the $n^{th}$ of Nc colour channels.

The weighting factor $\gamma$ may be calculated as a mean average of the one or more estimated weighting factors $\gamma^*$. The weighting factor $\gamma$ may be calculated as a weighted average over two or more estimated weighting factors $\gamma^*$. Weights for calculating the weighted average over two or more estimated weighting factors $\gamma^*$ may be pre-calibrated. For example, if it is determined during calibrations that a difference of red and green channels of RGB images provides superior signal-to-noise ratio, then estimated weighting factors $\gamma^*$ calculated from red-green differences may be assigned a higher weighting when calculating the weighting factor $\gamma$.

The weighting factor $\gamma$ may be calculated as a weighted average over estimated weighting factors $\gamma^*$ calculated for every distinct pairing of the Nc colour channels.

The first illumination condition may take the form of a first binary pattern aligned along a first direction. The second illumination condition may take the form of a complement of the first binary pattern. The method may also include receiving a third colour image of the object illuminated using a third white light illumination condition in the form of a second binary pattern aligned along a second direction which is different to the first direction. The third image may be obtained from the viewpoint. The method may also include calculating third luminance components of the third image. The method may also include receiving a fourth colour image of the object illuminated using a fourth white light illumination condition in the form of a complement of the second binary pattern. The second image may be obtained from the viewpoint. The method may also include calculating fourth luminance components of the second image. The method may also include, for each pixel corresponding to the region of the surface of the object, calculating a second specular reflectance as a weighted difference of the third and fourth luminance components. The method may also include, for each pixel corresponding to the region of the surface of the object, calculating a photometric normal.

The photometric normal may be a mixed photometric normal, including components of specular and diffuse reflectance. The photometric normal may be a specular normal. The photometric normal may be a diffuse normal. The method may include calculating both the specular normal and the photometric normal.

The photometric normal may be calculated based on the specular reflectance and/or the corresponding diffuse reflectance, and on the second specular reflectance and/or a second diffuse reflectance. The second diffuse reflectance may be calculated from a second total reflectance and the second specular reflectance in the same way as the diffuse reflectance.

The method according to the fifteenth aspect may be carried out using the apparatus according to the first aspect, or a system incorporating the apparatus according to the first aspect. In particular, the first and second colour images of the object, and optionally the third and fourth colour images, may be obtained using the apparatus according to the first aspect or a system incorporating the apparatus according to the first aspect. Definitions applicable to the apparatus according to the first aspect, or a system incorporating the apparatus according to the first aspect, are equally applicable to the method according to the fifteenth aspect.

The method according to the fifteenth aspect may include, or be combined with, the methods according to any of the eleventh to fourteenth and sixteenth aspects, whether individually or in any combination.

According to a sixteenth aspect of the invention, there is provided a method of calculating a separation of a reflectance of an object into diffuse and specular components. The method includes receiving first to fourth images illuminated using respective first to fourth illumination conditions. The first to fourth images are obtained from the same viewpoint. Each of the first to fourth illumination conditions corresponds to illumination of the object from a range of angles which is less than a sphere. The first illumination condition corresponds to a first binary pattern aligned along a first direction. The second illumination condition corresponds to a complement of the first binary pattern. The third illumination condition corresponds to a second binary pattern aligned along a second direction which is different to the first direction. The fourth illumination condition corresponds to a complement of the second binary pattern. The method also includes generating first and second relit images by transforming the luminance and shading of the first and second images to correspond to a rotation of the respective first and second illumination conditions to coincide with the first direction. The method also includes generating third and fourth relit images by transforming the luminance and shading of the third and fourth images to correspond to a rotation of the respective third and fourth illumination conditions to coincide with the second direction. The method also includes receiving a photometric normal map of the object corresponding to the viewpoint. The method also includes, for each pixel of a region of the surface of the object, calculating a specular reflectance and a diffuse reflectance by solving a linear system which relates a first vector comprising pixel values of two or more relit images to a second vector comprising the specular reflectance and the diffuse reflectance via a transformation matrix based on the photometric normal.

The first to fourth images may be extracted corresponding to colour channels of a smaller number of spectrally multiplexed images. The first to fourth images may correspond to different colour channels obtained from two or more sets of images obtained used the apparatus of the first aspect or a system incorporating the apparatus of the first aspect.

The linear system may be deterministic for a pair of relit images. The linear system may be solved for each distinct pairing of the first to fourth relit images, and the resulting values of specular reflectance and diffuse reflectance may be averaged.

The linear system may be overdetermined for three or more relit images.

Any or all of the first to fourth illumination conditions may correspond to a single colour of light. Any or all of the first to fourth illumination conditions may correspond to a single colour channel of a colour display.

The linear system solution may be applied to first to fourth images corresponding to colour multiplexed binary patterns, for example the first to fourth illumination conditions may correspond to two or more colour channels. This may permit calculation of specular content separately in each colour channel. Specular content calculated separately in each colour channel may be averaged to estimate final specular and diffuse values under white illumination, for example using sums of complementary colour multiplexed binary patterns.

The first and second directions may be independent of the viewpoint, and may be defined relative to an apparatus used to obtain the first to fourth images. The first and second directions may be substantially perpendicular, for example 90±10 degrees.

The first to fourth images may be obtained using the apparatus according to the first aspect. The first and second directions may correspond to latitude and longitude respectively.

The photometric normal map may take the form of diffuse, mixed or specular photometric normals. Preferably the photometric normal map may take the form of diffuse or mixed photometric normals.

Generating the first to fourth relit images by transforming the luminance and shading of the first to fourth images to correspond to a rotation of the respective first to fourth illumination condition may employ the method of rotation transformation as described in Kampouris2018.

The linear system may be similar to a linear system as described in Kampouris2018, except that the inputs are provided by the first and second relit images. However, the linear system may be more flexible than the linear system described in Kampouris2018, for example the linear system according to the present specification is not restricted to a binary pattern and its' complement. Additionally, the linear system may be applied to a first image corresponding to a binary pattern and a second image which may correspond to the complement of that binary pattern, or to a distinct binary pattern or complement thereof. Moreover, the linear system of the present application may be solved as an overdetermined system relating three or four relit images.

Receiving a photometric normal map of the object corresponding to the viewpoint may include calculating the photometric normal map based on the first to fourth images or on the first to fourth relit images. The photometric normal map may be calculated using any of the methods described herein.

The method may also include receiving geometric information describing first to fourth ranges of angles from which the respective first to fourth illumination conditions illuminate the object. The method may also include calculating first and second angles between the first direction and respective centroids of the first and second ranges of angles. The method may also include calculating third and fourth angles between the second direction and respective centroids of the third and fourth ranges of angles. Generating the first to fourth relit images may include transforming the luminance and shading of the first to fourth images to correspond to a rotation of corresponding illumination condition based on the respective first to fourth angle. Generating the first to fourth relit images may include transforming the luminance and shading of the first to fourth images to correspond to a rotation of corresponding illumination condition by π/2 (90 degrees) minus the respective first to fourth angle The first and second ranges of angles may each correspond to an arc of less than 2π in a plane containing the first direction. The third and fourth ranges of angles may each correspond to an arc of less than 2π in a plane containing the second direction.

The linear system may be defined as:

$$\begin{pmatrix} relit_b \\ relit_d \end{pmatrix} = \begin{pmatrix} 1 & norm_b \\ 0 & 1 - norm_d \end{pmatrix} \begin{pmatrix} S \\ D \end{pmatrix}$$

Wherein S is the specular reflectance, D is the diffuse reflectance, $relit_b$ is the value of the brighter of the pair of relit images, $relit_d$ is the value of the darker of the pair of relit images, $norm_b$ is a direction cosine corresponding to the component of the photometric normal parallel to whichever of the first and second directions corresponds to the brighter of the pair of relit images, shifted to the range [0, 1], and $norm_d$ is a direction cosine corresponding to the component of the photometric normal parallel to whichever of the first and second directions corresponds to the darker of the pair of relit images, shifted to the range [0, 1].

The linear system may be solved for each pixel position, and pixel positions may correspond across the first to fourth images because all are obtained from the same viewpoint. For a pair of relit images, one may be the brighter for a first pixel position and the darker for a different pixel position.

The method according to the sixteenth aspect may be carried out using the apparatus according to the first aspect, or a system incorporating the apparatus according to the first aspect. In particular, the first and second images of the object may be obtained using the apparatus according to the first aspect or a system incorporating the apparatus according to the first aspect. Definitions applicable to the apparatus according to the first aspect, or a system incorporating the apparatus according to the first aspect, are equally applicable to the method according to the sixteenth aspect.

The method according to the sixteenth aspect may include, or be combined with, the methods according to any of the eleventh to fifteenth aspects, whether individually or in any combination.

Any or all of the methods according to any one of the eleventh to sixteenth aspects may be computer implemented.

BRIEF DESCRIPTION OF THE DRAWINGS

Certain embodiments of the present invention will now be described, by way of example, with reference to the accompanying drawings, in which:

FIGS. 15A to 15C schematically illustrate the projection of an exemplary apparatus of the type shown in FIG. 13 into a latitude-longitude spherical parameterisation;

DETAILED DESCRIPTION

Figure 1:
FIG. 1 is a photograph of an apparatus according to the present specification.

In the following, like parts are denoted by like reference numerals.

Herein, a practical, portable 3D capture and display system is proposed which may enable controlled active illumination for high quality appearance and shape acquisition.

However, unlike a lightstage, the apparatus of the present specification has a practical form factor consisting of a set of colour displays arranged to cover a zone of a hemisphere (for example a semi-circular arc) around a subject (e.g., face or skin) or an object/material. The colour displays substantially cover the zone of a frontal hemisphere of directions with piecewise continuous active illumination (see FIG. 1).

Referring to FIG. 1, an example of the apparatus according to the present specification in use is photographed from behind and slightly to the side of an imaged subject.

The example shown in FIG. 1 provides a practical, portable high-quality 3D capture apparatus for shape and appearance capture and display. The apparatus includes a set of colour display devices (for example iPad® Pros in this example) surrounding a subject's face in a roughly semi-circular arrangement. This may:

(a) provide piecewise continuous active illumination substantially covering a zone of the frontal hemisphere, while integrated cameras and depth sensors on the displays provide multiview imaging of subject shape and reflectance.

(b) A set of cameras, in this example integrated into smart phones (e.g., iPhone (TRM) 12 Pro Max) mounted between the display columns provide high resolution multiview imaging (using the back cameras) along the principal equatorial viewing directions.

The display devices also serve to subsequently display the processed 3D scanning and rendering results for visualization and evaluation purposes.

In some examples, two sets of the proposed apparatus can be coupled together to create an effective 3D teleconferencing system, where a remote participant is scanned at one location, for example using the apparatus shown in FIG. 1. Subsequently, the remote participant may be displayed with view-dependent parallax, and optionally spatial audio, to one or more people surrounding the remote participant's virtual avatar at a second location (for example using a complementary setup where the display devices and sensors face outwards instead of inward). The principal cameras and optionally depth sensors in the complementary setup can be used to track faces and eye gaze of one or more people (for example an audience) for appropriate view-dependent display of the remote participant. Additional cameras may also be used to record the directional environmental illumination at the second (audience) location in order to appropriately illuminate the remote participant during scanning with a directional lighting reproduction corresponding (or at least approximating) the environment illumination at the second (audience) location. The may help to increase realism and immersion of the remote participant's displayed avatar at the second (audience) location.

The piecewise continuous active illumination enabled by the colour display panel(s) of the apparatus make it very suitable for acquisition of shiny, specular objects/surfaces, so and particularly human eyes which are accustomed to looking at displays. The apparatus also includes of a set of one or more cameras and optionally a set of depth sensors (preferably regularly spaced) between the colour display panels in order to provide multiview capture of a subject or object's shape and reflectance. The apparatuses described herein may be used for acquisition of subject appearance and 3D shape for realistic rendering applications using model-based rendering. Equally, the apparatuses described herein may be used for acquisition of a subject/object reflectance-field/light-field for image-based rendering, as well as neural rendering techniques.

Unlike previous 3D capture systems, the apparatuses described herein also enable direct viewing and evaluation of the 3D capture results subsequently on the same apparatus as employed for the scanning purposes. This is a unique and desirable feature of the apparatus described herein, as it allows immediate iteration of the scanning process if required after viewing the results (e.g., to account for any imperfections in the scan or if the subject's facial pose/performance during scanning was not satisfactory). This unique aspect of joint capture and display allows two complementary sets of the proposed capture system can be coupled together to create an effective 3D teleconferencing system are mentioned hereinbefore.

Herein, a practical, portable high-quality 3D capture apparatus is described which is suited for acquisition of faces (including eyes), object, material or skin appearance and 3D shape for realistic rendering applications using model-based rendering, image-based rendering, as well as neural rendering techniques. The proposed 3D capture system includes a set of colour display panels (preferably two or more), which may take any form such as, for example, phone or tablet screens, or larger displays, or even lightfield displays. The colour displays are arranged to surround a subject (face or skin) or object/material in order to cover a zone of a frontal hemisphere of directions with piecewise continuous active illumination from the colour display panels. The continuous active illumination enabled by the colour display panels make the apparatus suitable for acquisition of shiny, specular objects/surfaces, and particularly human eyes which are accustomed to looking at displays. The capture apparatus also includes set of one or more cameras (which may include lightfield cameras). Optionally the capture apparatus may also include a set of depth sensors spaced regularly between the colour display panels in order to provide multiview capture of the subject/object's shape and reflectance. Optionally, some cameras and/or depth sensors may be co-located with the colour display panels (e.g., TrueDepth® camera on an iPad® Pro), or integrated into a mobile phone (e.g., a set of front or back cameras on an iPhone® Pro). Optionally, some cameras may have (or be fitted with) a polarizing filter (linear or circular) so as to cross-polarize the natively polarized illumination emitted from a colour display panel.

The apparatus may also be used for multispectral imaging of subject reflectance using a combination of colour imaging in conjunction with illumination (e.g. RGB) from the colour display panels and broadband white illumination from a phone/camera flash. Optionally, IR imaging using depth sensors may also be included in a multispectral imaging approach.

Unlike previous 3D capture systems, the apparatus described herein also enables direct viewing and evaluation of the 3D capture results on the same setup employed for the scanning purposes. Whilst the apparatuses described herein may be installed in a fixed location, the configuration of the apparatuses means that some examples may be highly portable, for example they may be easily assembled on a flat surface, mounted on stands, or mounted from a vertical surface such as a wall and so forth.

The apparatus can be controlled through a wired connection, or wirelessly (e.g., wifi, Bluetooth® or 5G protocols), or a mixture, with the same wired and/or wireless connections supporting data transfer between different components of the apparatus (for example between a set of tablets and smartphones, between a desktop PC and a number of monitors and cameras, and so forth).

A set of basis illumination conditions (preferably modulated by the display setup form factor, for example to compensate for variations in the distance from different parts of the same colour display to an illuminated object/subject/volume) may be employed to estimate reflectance and photometric normal maps for model based rendering. Depending on the choice of basis functions (see further examples hereinafter), the apparatus may also be used for acquisition of 6D reflectance field data for image-based rendering/relighting (or even higher dimensional 8D reflectance fields using lightfield displays and/or lightfield cameras). Basis illumination conditions may include, without being limited to, uniform illumination, horizontally and vertically aligned binary patterns, 2D Haar wavelet patterns (shifted between 0-1), lines or bands of illumination (for example corresponding to planes of latitude and/or so longitude), phase shifted sinusoidal patterns (along latitudes and longitudes or about a local view-vector), axis-aligned 2D Gaussians, steerable radial basis functions such as Spherical Gaussians, and so forth. The apparatus supports spectrally multiplexing two or more basis illumination conditions on the colour display panels to enable faster capture with reduced numbers of measurements using colour cameras.

The capture process can be repeated with the subject/object rotated with respect to the apparatus to capture other sides, including the back side of the subject/object not seen from the frontal viewpoint. The data acquired by a side camera after subject rotation (particularly 90° rotation to face left or right) may also be aligned with the frontal viewpoint in post-process to recover response to a substantially spherical set of lighting directions including a missing back hemisphere of incident illumination that cannot be directly acquired using the setup. Additionally, neural networks may be employed to take advantage of the acquired data with view and illumination multiplexing, optionally with estimated reflectance and photometric normals to provide continuous interpolation (spatial and angular super-resolution), as well as some degree of extrapolation of the acquired reflectance field and/or light field of the subject/object.

Two sets of the proposed capture apparatus may be coupled together to create an effective 3D teleconferencing system where the first apparatus may be used to scan a remote participant from multiple inward facing viewpoints dynamically at video rates, optionally along with spatial audio. At the same time, the second complementary apparatus may be used to display the remote participant with view-dependent parallax, and optionally directional audio playback, to a set of one or more people (e.g. an audience) at a second location surrounding the second apparatus. The second apparatus may have its display panels and cameras/depth sensors facing outward directions (compared to the first apparatus).

Compared to the facial relighting of Sengupta2021, the method of Sengupta2021 has the asymmetry of illumination inherent in the setup, and consequently cannot achieve lighting effects from above a face since this is not captured by such an arrangement. To avoid such a problem, some examples of the apparatus may specifically include some principal camera placements between multiple display devices (see for example FIG. 1) so as to achieve symmetrical illumination coverage around these principal camera viewpoints. This may enable achieving high quality reflectance measurement for 3D objects or a face.

Compared to the system described in Starline2021, the 3D teleconferencing system described herein includes some key differences. The system of Starline2021 couples separate pieces of hardware for the 3D scanning system and the 3D display system whereas in the 3D teleconferencing system described herein, the 3D scanning and display can be done by the same hardware components, reducing complexity. Furthermore, Starline2021 does not appear to provide any reflectance information or relightability for the scanned subject, who is displayed at the display location exactly as they are scanned under the fixed room lighting of the scanning location. In contrast to this, the 3D teleconferencing system described herein may enable estimating reflectance and normal maps of the subject during 3D scanning, which may permit relighting of the subject to any arbitrary lighting condition before 3D display at a second (audience) location.

Moreover, the 3D teleconferencing system described herein may allow greater immersion of the remote participant during their virtual display at a second (audience) location, since the 3D teleconferencing system described may allow simultaneous capture of the directional lighting (environment illumination condition) at the second (audience) location. The captured directional lighting may then be directionally reproduced on the remote participant while that person is being scanned by their local apparatus during a 3D teleconferencing session. In this scenario, the remote participant may be displayed at another location with the correct lighting reproduction corresponding to the display location (instead of the scanning location as in Starline2021), which may help to increase a sense of realism and immersion of the virtual participant at the second (audience or display) location. In summary, the apparatuses described herein, when used to implement a 3D teleconferencing system, may provide the ability to do appropriate lighting reproduction on a remote participant and/or additional reflectance capture for relighting during 3D teleconferencing.

Examples of the 3D Capture Apparatus

Figure 2A:
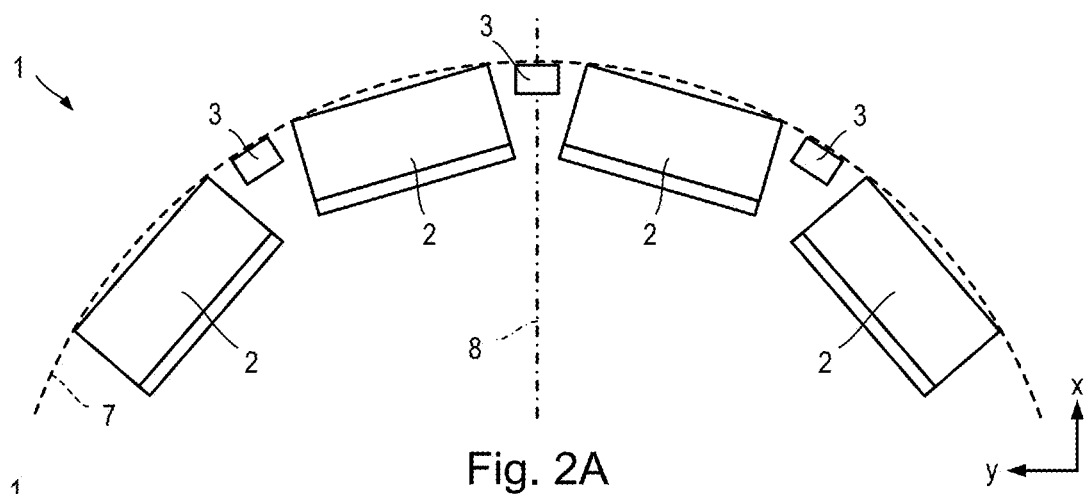
FIGS. 2A to 2C schematically illustrate a first exemplary apparatus, an implementation of which is shown in FIG. 1.
Figure 2B:
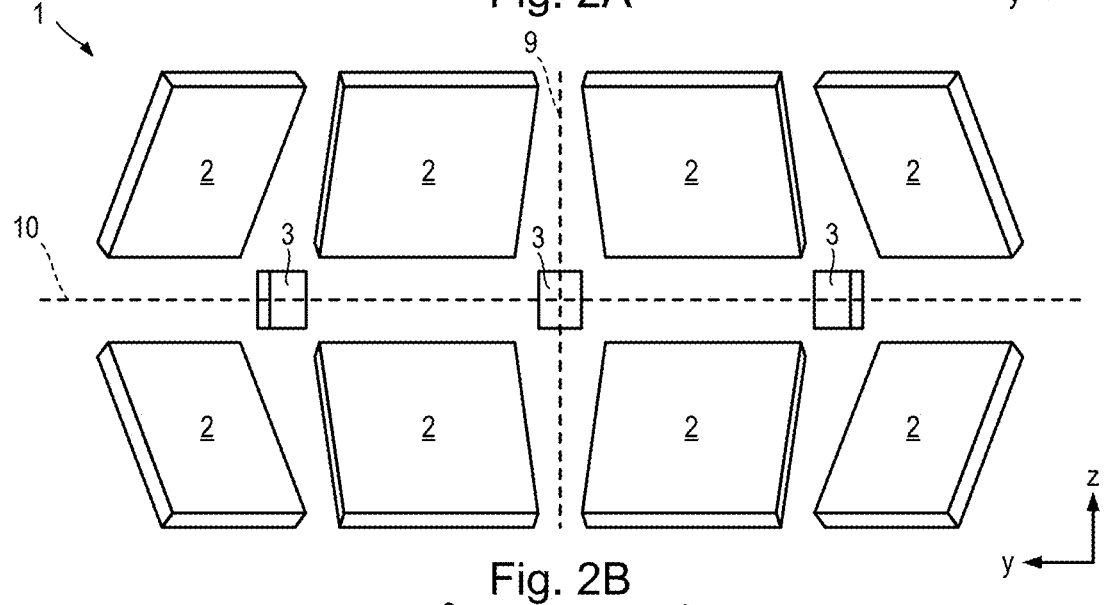
Figure 2C:
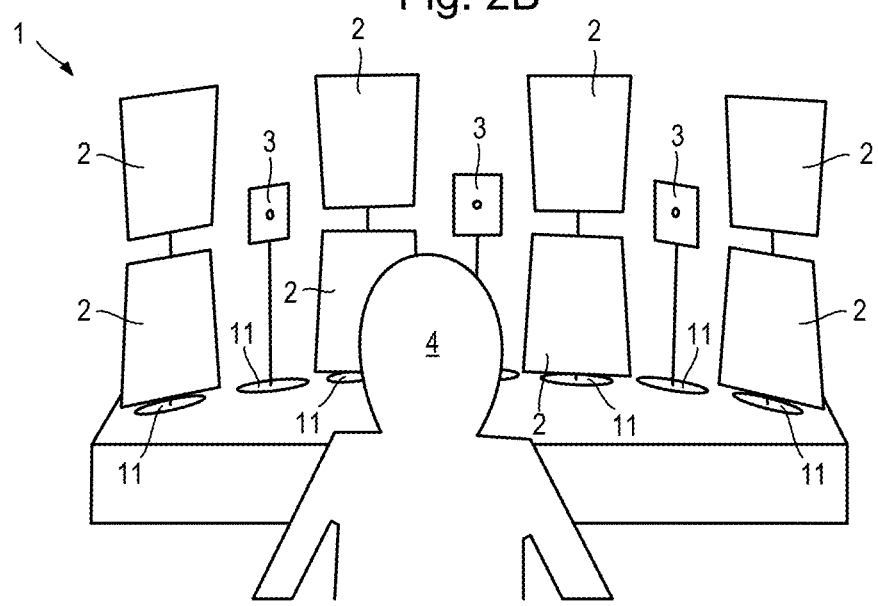

Referring also to FIGS. 2A to 2C, a first exemplary apparatus 1 (hereinafter "first apparatus") is shown. An implementation of the first apparatus 1 is also shown in FIG. 1.

FIG. 2A is a plan view of the first apparatus 1, FIG. 2B is a front view of the first apparatus 1, and FIG. 2C is a projected view of the first apparatus 1.

The apparatus in general includes two or more colour displays 2 arranged to provide piece-wise continuous illumination of a volume. In the first apparatus 1, the two or more colour displays 2 take the form of displays provided by eight tablet computers arranged using respective stands. The apparatus in general also includes one or more cameras 3, each camera 3 arranged to image the volume illuminated by the two or more colour displays 2. In the first apparatus 1, the one or more cameras 3 take the form of rear cameras of smartphones arranged between the pairs of tablet computers providing the colour displays 2. The apparatus in general is configured to control the two or more colour displays 2 and the one or more cameras 3:

- to illuminate the volume with each of two or more illumination conditions; and
- to obtain two or more sets of images, each set of images being obtained during illumination of the volume with one or more corresponding illumination conditions.

The two or more sets of images should include sufficient information for calculation of a reflectance map and a photometric normal map of an object or subject 4 positioned within the volume. For example, in the first apparatus 1 shown in FIGS. 2A to 2C, one of the tablet computers may be configured to control the other tablet computers and the smartphones. Alternatively, the control functions may be split across two or more, or all, of the tablet computers and/or smart phones. In the first apparatus 1 shown in FIGS. 2A to 2C, the object/subject 4 takes the form of a person, specifically their head and upper torso region.

When viewed from the (illuminated and imaged) volume (for example from the object/subject 4), the apparatus only provides direct illumination of the volume from angles within a zone of a hemisphere, the zone being less than a hemisphere and corresponding to a first range $\Delta\alpha$ of latitudinal angles $\alpha$ and a second range $\Delta\beta$ of longitudinal angles $\beta$, wherein each of the first and second ranges is no more than $17\pi/18$.

Using latitude-longitude spherical parameterisation ($\alpha$, $\beta$), the hemisphere may be defined as one in which the latitudinal angle $\alpha$ corresponds to an angle above/below an equatorial plane (e.g. the plane of the cameras 3 in FIG. 2), ranging from $-\pi/2 \leq \alpha \leq \pi/2$, and in which the longitudinal angle $\beta$ corresponds to an angle relative to a notional front direction ($\beta=0$), ranging from $-\pi \leq \beta \leq \pi$. In this coordinate system, the hemisphere is bounded by $\pi/2 \leq \alpha \leq \pi/2$ and $-\pi/2 < \beta < \pi/2$. In this coordinate system, the maximum and minimum latitudinal angles of the zone may be $\alpha_{max} < \pi/2$ and $\alpha_{min} > \pi/2$ respectively, such that the first range is $\Delta\alpha = \alpha_{max} - \alpha_{min}$. The first range $\Delta\alpha$ is within the range $\pi/18 \leq \Delta\alpha \leq 17\pi/18$. In this coordinate system the maximum and minimum longitudinal angles of the zone may be $\beta_{max} < \pi/2$ and $\beta_{min} > \pi/2$ respectively, such that the second range is $\Delta\beta = \beta_{max} - \beta_{min}$. The second range $\Delta\beta$ may be the range $\pi/18 \leq \Delta\beta \leq 17\pi/18$. The magnitudes of the first $\Delta\alpha$ and second $\Delta\beta$ ranges may be the same. Alternatively, the magnitudes of the first $\Delta\alpha$ and second $\Delta\beta$ ranges may differ, i.e. $\Delta\alpha > \Delta\beta$ or $\Delta\alpha < \Delta\beta$. The magnitude of a difference $|\Delta\alpha > \Delta\beta|$ between the ranges $\Delta\alpha$, $\Delta\beta$ may be greater than or equal to $\pi/18$ (10 degrees).

The origin of the latitude-longitude spherical parameterisation ($\alpha$, $\beta$) is preferably within the volume, for example coincident with the centroid of the volume. The apparatus does not cause any direct illumination to be incident on the volume from angles outside the zone, i.e. from angles $\alpha > \alpha_{max}$ or $\alpha < \alpha_{min}$, and/or $\beta > \beta_{max}$ or $\beta < \beta_{min}$.

Radial locations of the two or more colour displays 2 from the origin need not be equal. In other words, whilst the direct illumination provided by light sources of the apparatus including the two or more colour displays, e.g. the first apparatus 1, correspond to angles within the zone, the two or more colour displays 2 (and any other light sources) are not required to be arranged/disposed to coincide with a portion of a spherical surface (although this is one possible implementation).

The zone may be bounded by curves corresponding to constant latitudinal angle $\beta$ 35 and/or constant longitudinal angle $\alpha$. However, the zone may in general be bounded by any closed curve which may be parameterised in latitudinal angle $\beta$ and longitudinal angle $\alpha$.

Colour displays 2 may take any suitable form, including but not limited to liquid crystal displays (LCD), LED displays, OLED displays, plasma displays, or any type of emissive display. In some implementations, some or all of the two or more colour displays 2 may take the form of curved, flexible and/or foldable colour displays, or even lightfield (holographic) displays.

Figure 3A:
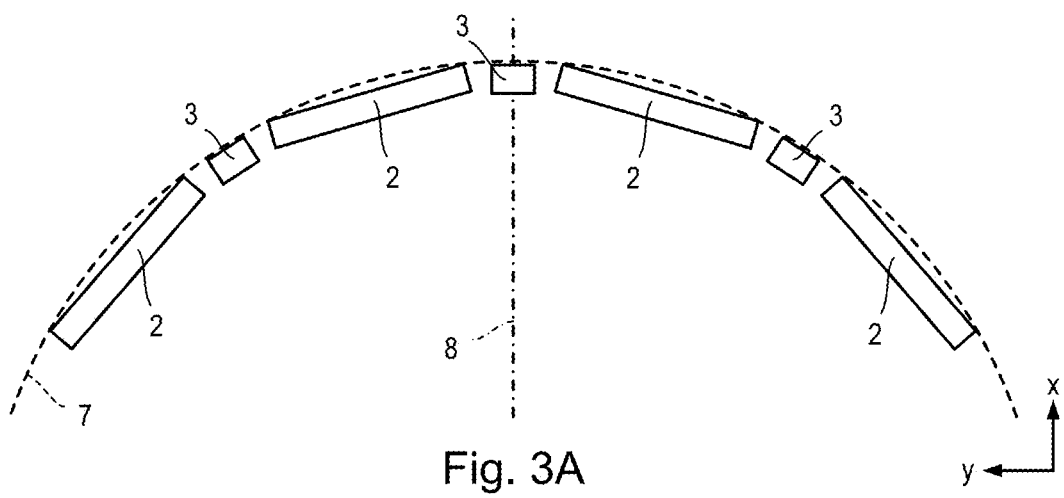
FIGS. 3A to 3C schematically illustrate a second exemplary apparatus.
Figure 3B:
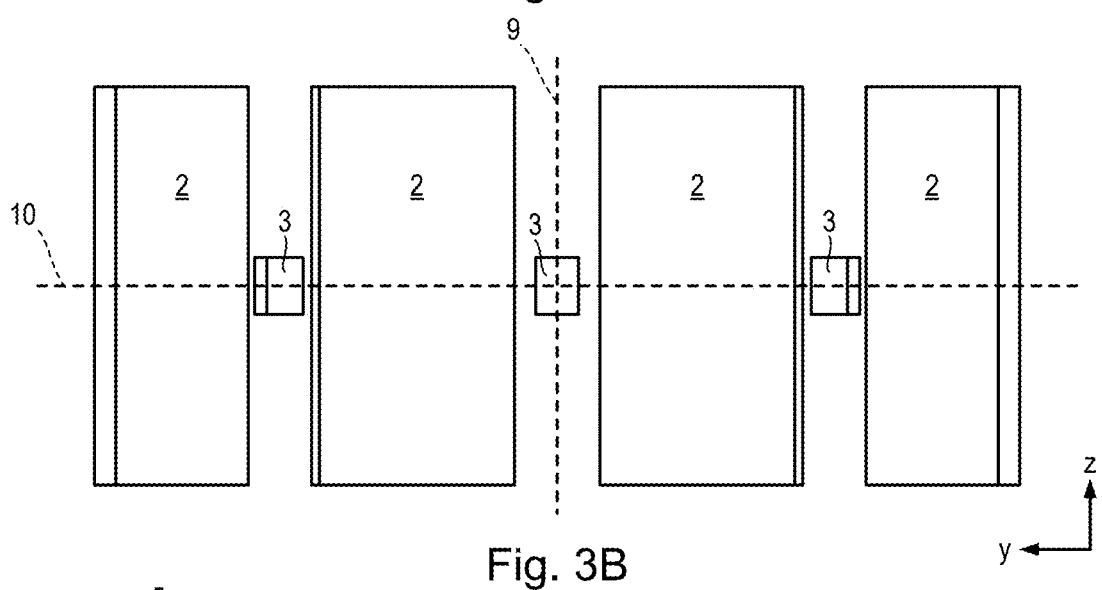
Figure 3C:
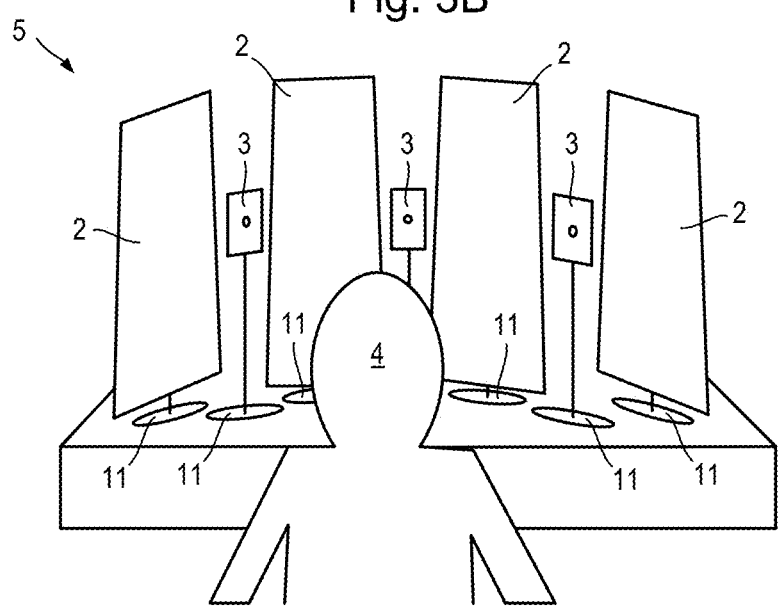

In the example of the first apparatus 1 illustrated in FIGS. 2A to 2C, the colour displays 2 are arranged about an arc 7 representing a portion of a semi-circle. The arc 7 is arranged generally symmetrically with respect to a midline 8 corresponding to $\alpha=\beta=0$ (aligned with the positive x-axis as drawn in FIGS. 2A to 2C). When viewed along the midline 8, the arrangement of colour displays 2 and cameras 3 is substantially mirror symmetric about a meridian plane 9 containing the midline 8 and an equatorial plane 10. The cameras 3 are also arranged substantially along the equatorial plane 10. Each of the colours displays 2 is slightly inclined towards the equatorial plane 10. The colour displays 2 and cameras 3 are supported by corresponding stands/frames 11. Referring also to FIGS. 3A to 3C, a second exemplary apparatus 5 (hereinafter "second apparatus") is shown.

FIG. 3A is a plan view of the second apparatus 5, FIG. 3B is a front view of the second apparatus 5, and FIG. 3C is a projected view of the second apparatus 5.

The second apparatus 5 is the same as the first apparatus 1, except that instead of being provided by eight tablet computers, the two or more colour displays 2 take the form of four larger displays such as desktop computer monitors or televisions, each arranged in portrait orientation.

In the example of the second apparatus 5 illustrated in FIGS. 3A to 3C, the colour displays 2 are arranged about an arc 7 representing a portion of a semi-circle. The arc 7 is arranged generally symmetrically with respect to a midline 8 corresponding to $\alpha=\beta=0$ (aligned with the positive x-axis as drawn in FIGS. 3A to 3C). When viewed along the midline 8, the arrangement of colour displays 2 and cameras 3 is substantially mirror symmetric about a meridian plane 9 containing the midline 8 and an equatorial plane 10. The cameras 3 are also arranged substantially along the equatorial plane 10.

Each of the colours displays 2 is arranged substantially perpendicular to the equatorial plane 10. The colour displays 2 and cameras 3 are supported by corresponding stands/frames 11.

Referring also to FIG. 4, a third exemplary apparatus 6 (hereinafter "third apparatus") is shown.

Figure 4A:
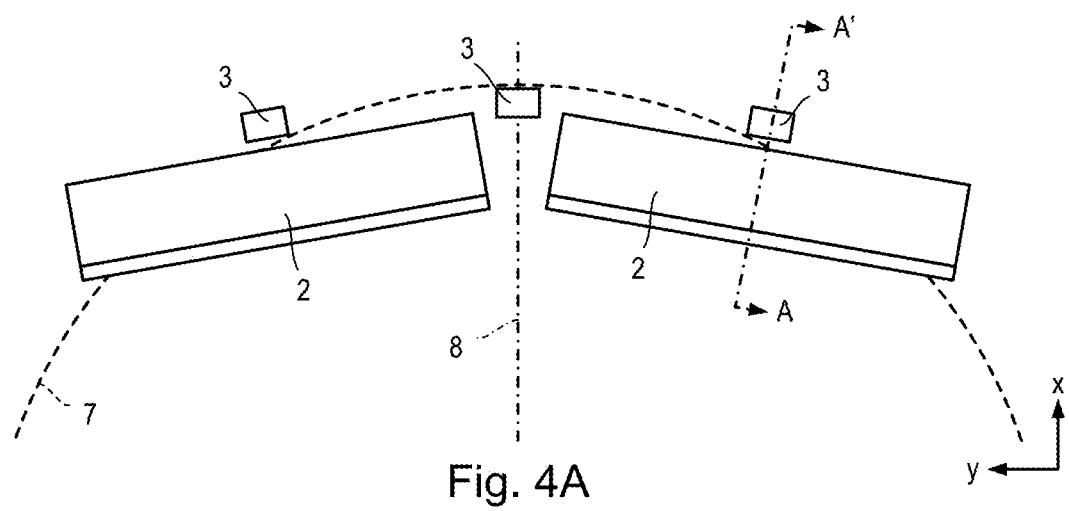
FIGS. 4A to 4C schematically illustrate a third exemplary apparatus.
Figure 4B:
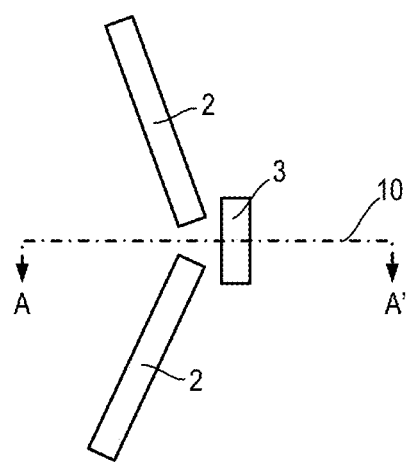
Figure 4C:
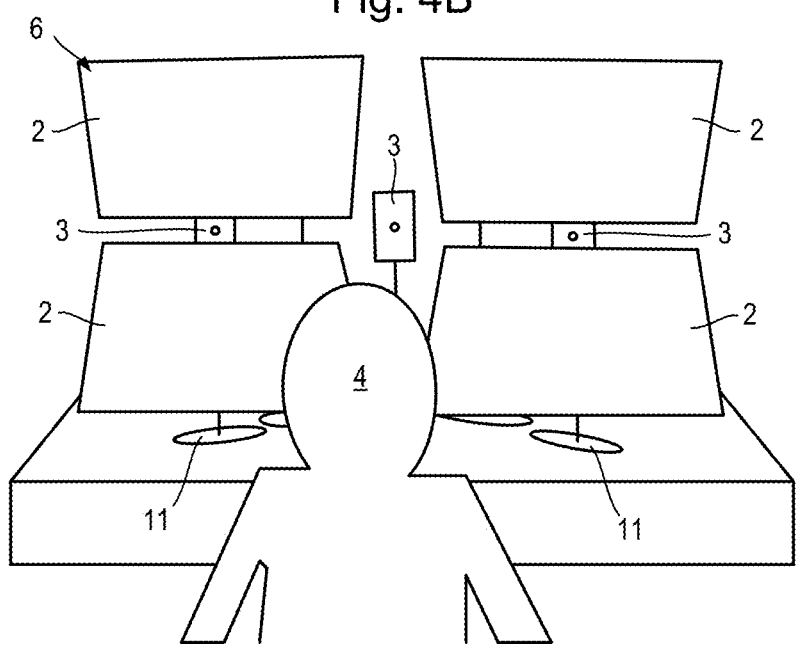

FIG. 4A is a plan view of the third apparatus 6, FIG. 4B is a cross-section along the line labelled A-A' in FIG. 4A, and FIG. 4C is a projected view of the third apparatus 6.

The third apparatus is the same as the second apparatus 5, except that the four colour displays 2 are oriented in landscape mode.

In the example of the third apparatus 6 illustrated in FIGS. 4A to 4C, the colour displays 2 are arranged about an arc 7 representing a portion of a semi-circle. The arc 7 is arranged generally symmetrically with respect to a midline 8 corresponding to $\alpha=\beta=0$ (aligned with the positive x-axis as drawn in FIGS. 4A to 4C). When viewed along the midline 8, the arrangement of colour displays 2 and cameras 3 is substantially mirror symmetric about a meridian plane 9 containing the midline 8 and an equatorial plane 10. The cameras 3 are also arranged substantially along the equatorial plane 10.

Referring in particular to FIG. 4B, in a cross-sectional view it may be observed that each colours display 2 is slightly inclined towards the equatorial plane 10, and that each pair of colour displays 2 is arranged one above the other, leaving a gap about the equatorial plane 10 through which a camera 3 may obtain images. The colour displays 2 and cameras 3 are supported by corresponding stands/frames 11.

In general, or in any one of the first to third apparatuses 1, 5, 6, cameras 3, and optionally depth sensors, may be integrated in the colour display devices 2 (e.g., in a tablet), or separately mounted in the setup within the gaps in the colour display panel 2 arrangements. Whilst only one camera 3 is essential for some methods, for maximum flexibility it is preferred to include at least two cameras 3 to enable multiview capture of the subject (object) 4 shape and reflectance information.

The colour display 2 panels can be planar, curved, or even foldable for portability. The capture apparatus 1, 5, 6 also includes a set of one or more cameras 4 and optionally a set of depth sensors, for example spaced regularly between the colour display panels 2 in order to provide multiview capture of the subject (object) shape and reflectance (see FIG. 5A to FIG. 5C).

Figure 5A:
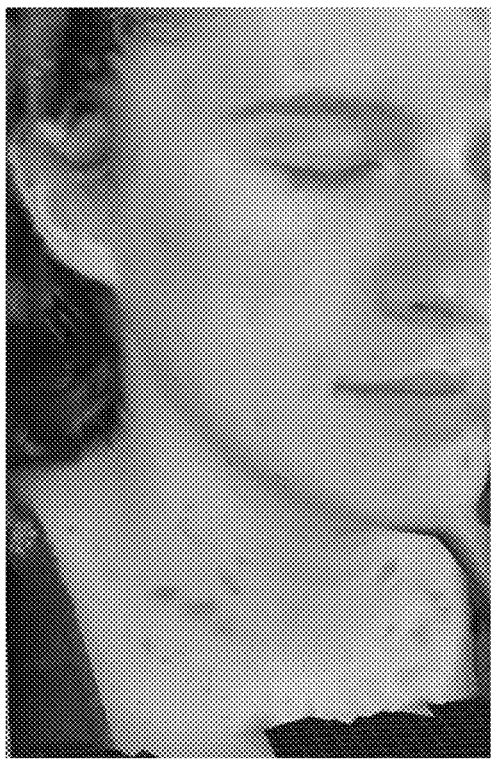
FIG. 5A shows a 3D geometry obtained using the apparatus shown in FIG. 1.
Figure 5B:
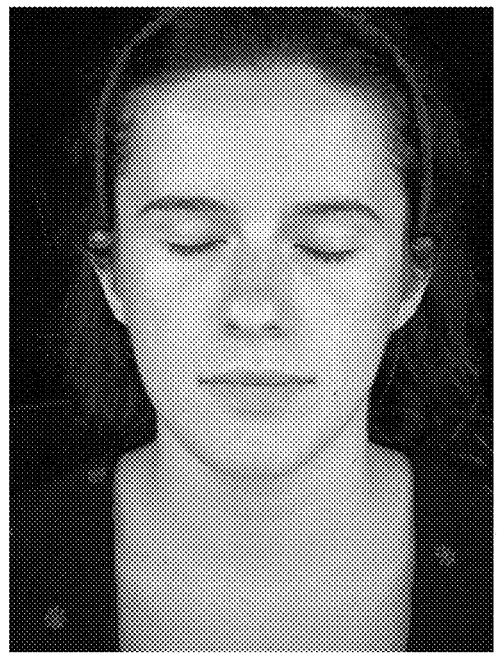
FIG. 5B shows an unpolarized measurement obtained using the apparatus shown in FIG. 1.
Figure 5C:
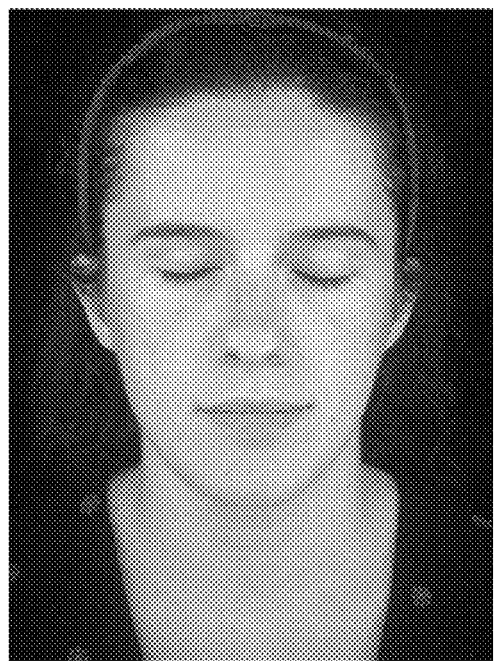
FIG. 5C shows a polarized measurement obtained using the apparatus shown in FIG. 1.

Referring also to FIGS. 5A to 5C, results obtained using an implementation of the first apparatus 1 are shown. The implementation is shown in FIG. 1, and used iPad® Pros to provide colour displays 2.

FIG. 5A shows a 3D geometry of a face reconstructed using multiview capture with the implementation of the first apparatus 1 (shown in FIG. 1 and illustrated schematically in FIG. 2).

FIG. 5B shows an unpolarized measurement obtained using the implementation first apparatus 1 under a uniform illumination condition. The image includes contributions from diffuse and specular reflectance.

FIG. 5C shows a polarized measurement obtained using the implementation first apparatus 1 under a uniform illumination condition, but with the camera 3 imaging through a circular polarizer that cross-polarizes with respect to natively circularly polarized illumination emitted by the colour displays 2 in the form of iPad Pro displays.

The cross-polarized measurement contains only diffuse reflectance, and the pair of measurements in FIGS. 5A and 5B may be used for diffuse-specular separation.

Optionally, some cameras and/or depth sensors can be co-located or integrated with the colour displays (e.g., TrueDepth camera on an iPad® Pro), and/or integrated in a mobile phone (e.g., set of back cameras and lidar sensor on an iPhone® Pro).

The apparatus 1, 5, 6 will typically employ cameras 3 having high resolution for multiview imaging from principal viewpoints, for example disposed along the gaps in the arrangements of colour displays 2. Such high resolution cameras 3 can be Digital Single Lens Reflex (DSLR), machine vision, or even a back camera on a mobile device with appropriate zoom lens.

A small form-factor is preferred for the colour displays 2, cameras 3 and so forth, in order to improve portability, as well as to ensure that the camera lenses may be accommodated in the gaps between the colour displays 2 without requiring the gap to be widened to fit said camera lenses.

The apparatus 1, 5, 6 may be is designed to be highly portable, so that it can be easily assembled on a flat surface mounted on stands (as shown in FIGS. 1 to 4C), or mounted from a vertical surface such as a wall (e.g., using adjustable VESA wall mounting brackets).

The apparatus 1, 5, 6 can be controlled through a wired connection and/or wirelessly (e.g., wifi, Bluetooth® or 5G protocols), with the same wired or wireless connections supporting data transfer between different components of the setup. An advantage of using tablet computers and mobile (smart) phone devices for the apparatus 1, 5, 6 is that integrated camera and depth sensors of such devices may be included in the operation of the apparatus. Furthermore, such devices include significant processing power, and such on-device computation may be harnessed for processing the acquired 3D scan data for rapid subsequent display of the scan results.

An advantage of using larger desktop monitors as colour displays 2 (see e.g. the second apparatus 5 in FIGS. 3A to 3C or the third apparatus 6 in FIGS. 4A to 4C) is that there are fewer devices to control. A modern graphics card may typically control up to four display monitors 2, and a computer incorporating said graphics card may provide the necessary processing power to analyse images obtained using the camera(s) 3.

As mentioned hereinbefore, a set of basis illumination conditions may be emitted by the colour displays 2, and corresponding images may be employed to estimate reflectance and photometric normal maps of the scan subject/object 4 for model based 3D rendering, as well as acquisition of a reflectance field or light field for image-based rendering/relighting.

Optionally, some of the cameras 3 in the apparatus 1, 3, 5 may include, or be fitted with, a polarizing filter (linear or circular) so as to cross- or parallel polarize with respect to the natively polarized illumination emitting from one or more colour displays 2 (e.g., one of the multiple back cameras on a mobile phone could optionally have a polarizing filter). Modern display panels typically either emit linearly polarized illumination (typically desktop display panels) or circularly polarized illumination (typically mobile device displays). At least some of the cameras 3 in the apparatus 1, 5, 6 may optionally be appropriately polarized to take advantage of this for diffuse-specular separation of measured reflectance (see FIG. 5C). Unlike previous works that have employed polarization for diffuse-specular separation, the apparatus 1, 5, 6 does not require mounting of polarization filters on all the lights (due to typical colour displays 2 being natively polarized), and does not require mechanical/electronic flipping of a polarization filter on a camera 3 (as described in Ma2007), or switching of polarization states on light-sources (as described in Ghosh2011).

Also, unlike the approach described in Riviere2020, apparatuses and methods of the present specification do not need a polarized camera to be strictly cross-polarized with respect to the illumination. All that is required is that the type and/or orientation of polarization on the camera is known and hence the camera can even be parallel polarized with respect to the illumination condition.

The apparatus 1, 5, 6 may also be employed for multi-spectral imaging of subject/skin 4 or material reflectance using a combination of display illumination spectra (typically RGB) and one or more types of broadband white illumination spectrum emitted from primary camera 3 viewpoints (e.g., using mobile phone LED flash or DSLR camera flash) in conjunction with imaging by colour cameras (with calibrated spectral sensitivity). Optionally additional spectral filters may be included on some cameras 3 (e.g., one or more back cameras on mobile phones could have a spectral filter).

In the case of mobile phone LED flashes, there are often two types of LEDs combined—namely LEDs having respectively cool and warm spectra that may be individually controlled to provide an additional degree of spectral control over the broadband flash spectrum. Thus, in some implementations the colour displays 2 and camera 3 flashes together may be used cooperatively to provide RGBW+ spectral illumination.

Additionally, infrared (IR) imaging may also be performed using IR cameras in the depth sensors (when present/included in the apparatus 1, 5, 6), which may measure a response to either visible white or red illumination in the near IR band emitted by the displays or flashes. Additionally or alternatively, IR cameras may measure a response to IR illumination emitted by the depth sensors (e.g., IR flood illuminator on an iPad (RMT) Pro).

Optionally, the colour displays 2 panels may be augmented with (or some of them could be replaced with) programmable LED panels to complement the spectral illumination of colour displays 2. For example, colour displays 2 central in the zone of the hemisphere may take the form of displays with high resolution corresponding to higher resolution of foveal vision, and hence may be used to display the results of scanning. However, around the periphery of the zone, illumination may be provided by lower resolution LED panels corresponding to lower resolution peripheral vision, and hence can act simply as light sources for spectral lighting reproduction. Additionally or alternatively, a few additional LED light sources (e.g. discrete or point light sources) may be added to the setup in the gaps between the colour displays 2 in order to provide extended spectral control over/augment the illumination conditions.

Another type of point light source which may be used to augment illumination using the colour displays 2 is a projector such as an LCD projector, an OLED projector and so forth. A projector may output uniform and/or structured (patterned) illumination.

Active Illumination for Reflectance Capture

The apparatus 1, 5, 6 can be controlled to emit active illumination on a subject/object 4 in the form of uniform (full-on) illumination conditions, and horizontally aligned and vertically aligned binary pattern illumination conditions (preferably modulated by the colour display 2 form-factor) to estimate diffuse and specular albedo and photometric normal maps. Whilst such illumination conditions are applied, multiview captures are obtained using the camera(s) 3, and when present the optional depth sensors enable capture of 3D geometry (alternatively "surface" geometry). Alternatively, a pair of cameras 3 may be used for stereoscopic measurement of 3D geometry.

Modulation of uniform illumination pattern with the colour display 2 form-factor may improve the approximate of uniform illumination, which may help to achieve a desired measurement of an evenly lit albedo using the apparatus 1, 5, 6 (see FIGS. 5B and 5C).

Figure 6:
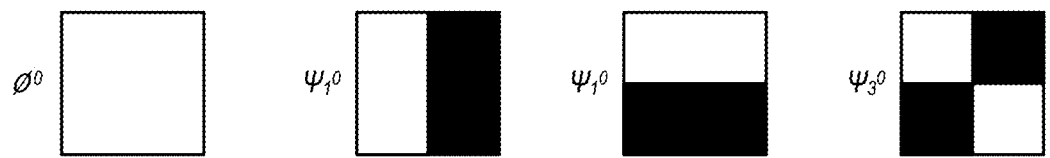
FIG. 6 illustrates the first four 2D Haar basis functions.

Referring also to FIG. 6, the apparatus 1, 5, 6 may also be controlled to emit more general 2D Haar wavelet patterns.

FIG. 6 shows the first few 2D Haar basis functions, shifted versions (0-1) of which can be used as basis illumination conditions for reflectance capture (negative values are shifted to zero, i.e. the range [−1, 1] is mapped to [0, 1]). The first three 2D Haar basis functions directly correspond to special cases of uniform illumination, and binary patterns along a pair of orthogonal directions X, Y respectively (for example the X and Y directions may correspond to latitude α and longitude β directions).

Any 2D Haar wavelet patterns employed are preferably modulated by the form-factor of the colour displays 2. Images obtained using 2D Haar wavelet patterns may be employed to compute a response of a smaller subdivided quadrant with higher signal to noise ratio than direct measurement with a piece-wise constant basis.

Furthermore, diffuse-specular separated albedo and photometric normals may be estimated using reduced measurements—just the full-on (uniform) condition and the binary illumination patterns (e.g. along α and β, X and Y etc.) and their complements. Unlike the methods described in Kampouris2018, the approach described herein does not require binary multiplexing along a third direction (for example X, Y and Z). This is because of the extent of the zone of the apparatus 1, 5, 6, which illuminates only the zone (or "portion" or "segment") of the frontal hemisphere.

Binary and/or 2D Haar wavelet patterns are further discussed in relation to FIGS. 25A to 28B, and modulation by the form-factor of an arrangement of colour displays 2 is discussed hereinafter in relation to FIGS. 29A to 30.

Figure 7:
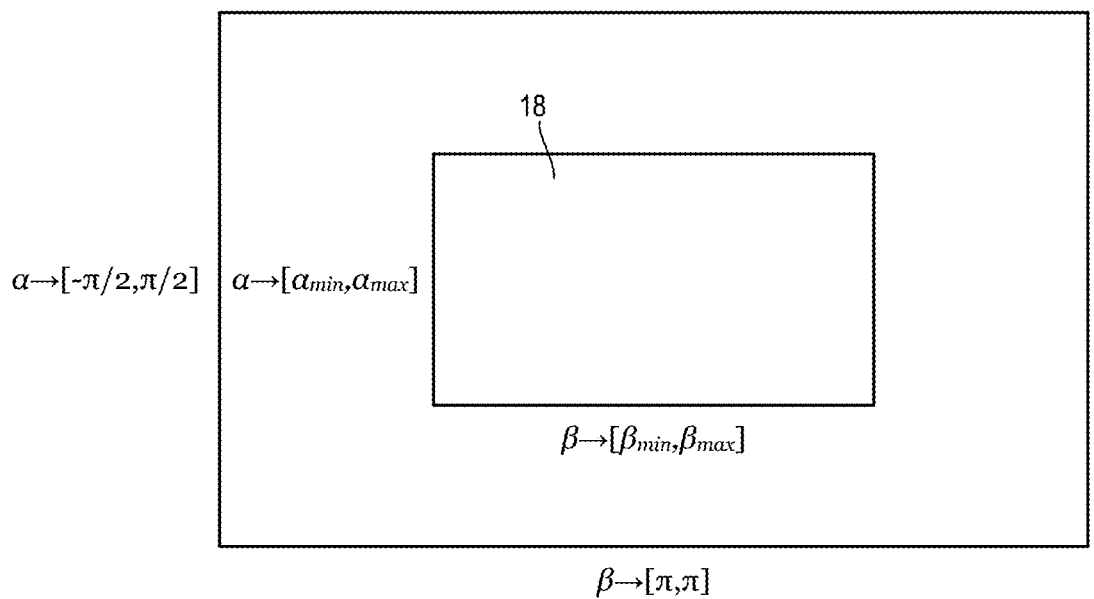
FIG. 7 illustrates the zone of a frontal hemisphere from which apparatus according to the present specification provides illumination conditions.

Referring also to FIG. 7, the zone of the frontal hemisphere illuminated by the apparatus 1, 5, 6 is shown, compared to full spherical coverage.

As described hereinbefore, the first range is $\Delta\alpha = \alpha_{max} - \alpha_{min}$ and satisfies $\pi/18 \leq \Delta\alpha \leq 17\pi/18$, and the second range is $\Delta\beta = \beta_{max} - \beta_{min}$ and satisfies $\pi/18 \leq \Delta\beta \leq 17\pi/18$.

The binary illumination pattern aligned with the X direction and its complement need not be centred about X and −X directions like in a spherical lightstage, but instead are centred around +450 and −45° in the X-Z plane, where +Z would be 0° (e.g. a direct line from the volume to the centre of the colour displays 2), and +X would be +90°. Thus, the binary pattern X and its complement binary pattern X' in the apparatus 1, 5, 6 may provide information about orthogonal directions in the X-Z plane. Consequently, these binary patterns X, X' are sufficient for estimate of both X and Z coordinates of the surface normal. The estimated X and Z coordinates are subsequently rotated by 45° in the X-Z plane (about Y axis) to obtain the correctly aligned surface normal.

The zone of the frontal hemisphere illuminated by an apparatus in the general case is further discussed hereinafter in relation to FIGS. 15A to 15C.

Figure 8A:
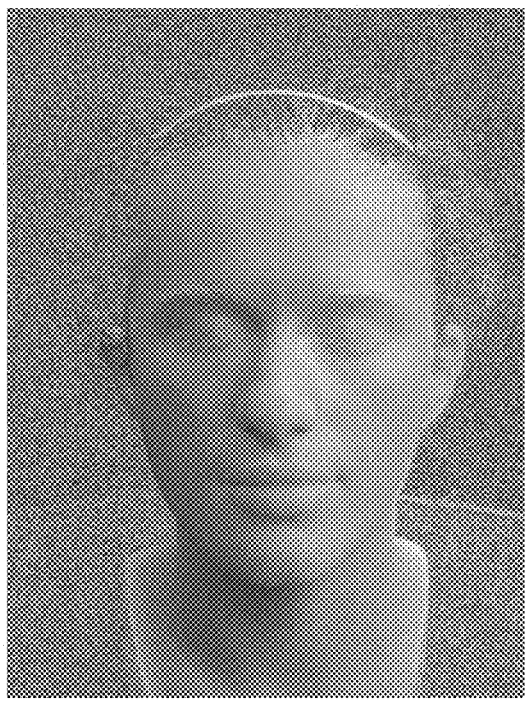
FIG. 8A shows a directly calculated photometric normal map.

Referring also to FIG. 8A, photometric normals calculated in this way are shown.

The photometric normals of a face were acquired using only X and Y aligned binary patterns and their complements, using the implementation of the first apparatus 1 shown in FIG. 1. Given the restriction of the illumination to a frontal hemispherical zone, binary patterns X and its complement X' contain information about both the x and z components of the surface normal. FIG. 8A shows the results of direct computation of photometric normals.

While directly computing surface normals as described hereinbefore is possible, it may be observed to suffer from slight bias in the Y component in some cases, believed to be due to a limited extent of illumination in the Y direction (using the implementation of the first apparatus shown in FIG. 1). In general, it is possible that the apparatus 1, 5, 6 may have a limited extent along the latitudinal direction $\alpha$ and will not cover the full set of latitudes ($\alpha \rightarrow -\pi/2, \pi/2$) on a sphere, but instead a much more truncated set of latitudes ($\alpha \rightarrow -\alpha_{min}, \alpha_{max}$). Herein, $|\alpha_{max}|$ and $|\alpha_{min}| < \pi/2$, and more typically $\leq \pi/4$.

This may cause the Y component of the estimated normal map to bend forward a bit and not point exactly in the correct direction due to truncation of the illumination along the latitudinal direction.

It is proposed to avoid such issues by instead employing Singular Value Decomposition (SVD) on the images (can be on a single colour channel or an average across the three colour channels) acquired under the X and Y binary illumination conditions and their complements.

Figure 8B:
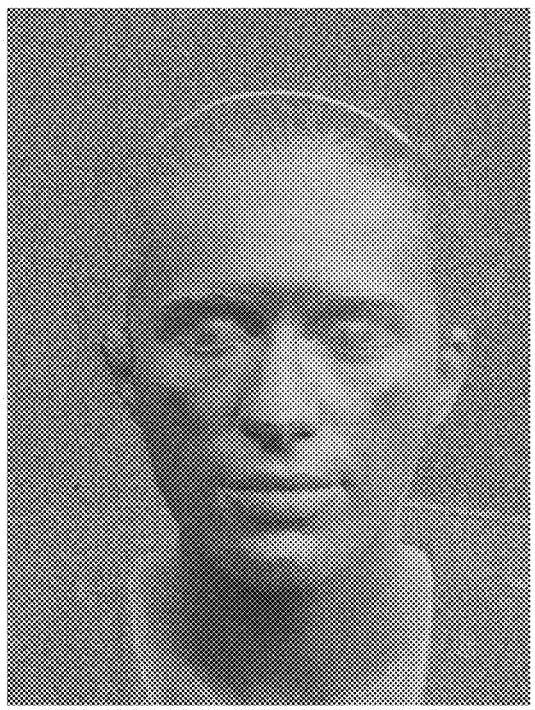
FIG. 8B shows a photometric normal map calculated using singular value decomposition.

Referring also to FIG. 8B, photometric normals calculated using SVD are shown.

The alternative SVD is based on the same inputs, but the SVD may provide a more correct global orientation which is likely to suffer from bias in the Y direction when the first range $\Delta \alpha$ of latitudinal angles is of limited extent. The SVD allows selection of the directions corresponding to the three most significant singular values (principal components) and these directions are by definition orthogonal to one another and give an improved estimation of a normal map. The remaining step is aligning the normals obtained using SVD to the desired coordinate system, since the SVD solution by itself need not be aligned with this direction. Herein it is proposed to employ the directly estimated normal map from the binary patterns (e.g. FIG. 8A), which might suffer from bias but remains a good indicator of the ideal coordinate system, to rotate the corresponding SVD based normals (e.g. FIG. 8B) to the desired coordinate system (e.g., by rotation of one normal map such that its mean direction matches the mean direction of the other normal map). The geometric normal of a surface could also be used for this coordinate system rotation of the SVD based normal. The geometric normal may be obtained from the 3D shape obtained from a depth sensor or from multiview stereo reconstruction of the surface geometry.

The binary illumination patterns along X and Y may be spectrally multiplexed, for example in red, green and blue (RGB) colour channels of the colour displays 2 to further reduce the measurements into two photographs that employ two complementary patterns with 4 colours.

Figure 9A:
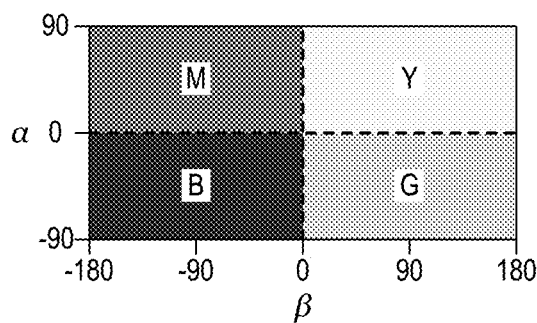
FIGS. 9A and 9B illustrate a spectrally multiplexed binary pattern and the respective complement.
Figure 9B:
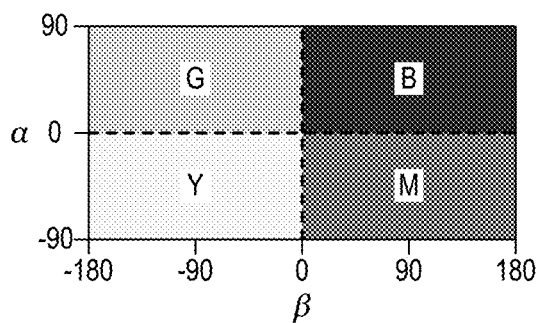

For example, referring also to FIGS. 9A and 9B, complementary binary patterns along X and Y multiplexed into RGB colour channels of illumination are shown FIG. 9A shows a first pattern in which a binary X pattern is encoded in a green (G) channel while its complement X' is encoded in a blue (B) channel. Additionally, a binary Y pattern is encoded in the red (R) channel (B+R=magenta (M), and G+R=yellow (Y)).

FIG. 9B shows a second pattern in which the binary X pattern encoded in the blue B channel, while its complement X' is encoded in the green (G) channel. Additionally, the complement of the binary Y pattern is encoded in the red (R) channel.

The first and second patterns shown in FIGS. 9A and 9B are complementary and add up to produce uniform white light in all the four quadrants.

Unlike the methods described in Kampouris2018, since the methods of the present specification do not employ binary illumination along a third direction (e.g. the Z direction), fewer colours need to be produced in an RGB multiplexing—only 4 fully saturated colours: blue (B), green (G), magenta (M) and yellow (Y) in the example shown in FIGS. 9A and 9B.

This has an advantage over the colour multiplexed patterns described by Kampouris2018, in that the response of neighbouring colour spectra such as green and blue illumination patterns may be kept physically separated and not spatially overlapping. This may provide better spectral separation of the binary illumination multiplexed along the green and blue channels imaged using a regular colour camera. Red and blue illumination are always well separated spectrally when imaged by a regular colour camera, but there can be significant cross-talk between green and blue illumination due to the overlap in spectral sensitivity on some colour cameras in the green and blue wavelengths. In fact, the work described by Kampouris2018 did not so obtain good quality results with spectral multiplexing because of the above mentioned cross-talk of illumination response between the green and blue colour channels of the camera used.

Besides better spectral separation, the proposed complementary first and second spectrally multiplexed binary patterns (FIGS. 9A, 9B) add up to producing white light in all four quadrants. This is a desirable property for measurement of a reflectance response to uniform white light for estimation of albedo. The first and second patterns (FIGS. 9A, 9B) can be used to either reduce the number of measurements for static capture of an object/subject, or more likely for video-rate capture of dynamic object/shape and appearance (e.g., facial performance capture).

Video-rate capture may be performed by rapidly illuminating the first and second patterns (FIG. 9A, 9B) at 30 fps or 60 fps, or even 120 FPS using the colour displays 2, and capturing the reflectance data with a camera 1 in the form of a synchronized video camera. Since two patterns have to be combined to estimate albedo and surface normals with the two binary multiplexed patterns, the effective capture rate would be normally half the video rate (e.g., 30 FPS for 60 FPS capture). However, by combining every two adjacent frames in the video sequence, which will always have the two complementary patterns (first and second, or second and first), it is possible to use the first and second patterns (FIGS. 9A, 9B) to even estimate albedo and surface normals at exactly the video capture rate.

Figure 10A:
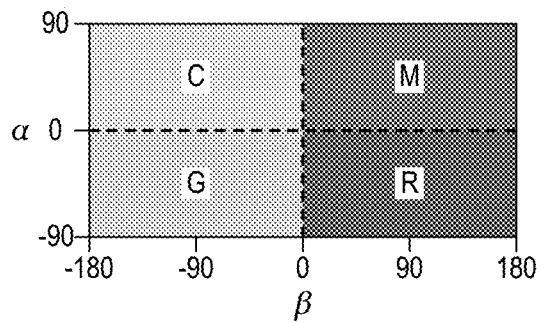
FIGS. 10A to 10F illustrate alternative spectrally multiplexed binary patterns and their respective complements.
Figure 10B:
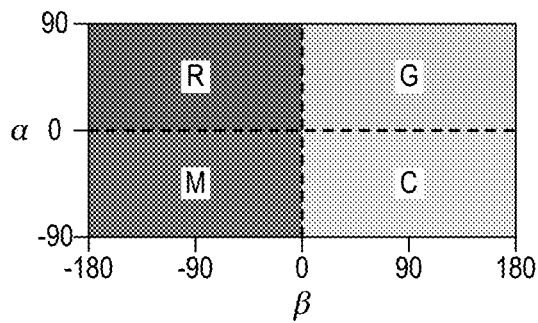

Note that for some cameras 3, given the spectral distributions of some RGB illumination primaries, the spectral sensitivity of green colour channel overlaps much more with red colour channel than with blue colour channel on the camera. Referring also to FIGS. 10A and 10B, alternative spectrally multiplexed patterns are shown.

In this case, the choice of four colours to be produced in the illumination would change to red (R), green (G), magenta (M) and cyan (C)—with the binary pattern along X and its complement being encoded in red (R) and green (G) respectively for physical separation, while the binary pattern along Y and its complement Y' is encoded in blue (B) which does not spectrally overlap with red or green.

FIG. 10A shows the binary X pattern encoded in the red (R) channel while its complement X' is encoded in the green (G) channel. Additionally, the binary Y pattern so is encoded in the blue (B) channel (G+B=cyan (C), and R+B=magenta (M)).

FIG. 10B shows the binary X pattern encoded in the green (G) channel while its complement X' is encoded in the red (R) channel. Additionally, the complement of the binary Y pattern is encoded in the blue channel.

The two patterns are complementary and add up to produce uniform white light in all the four quadrants.

The complementary patterns shown in FIGS. 9A to 9B and 10A to 10B may be horizontally or vertically flipped, or rotated left or right by 90° (thereby swapping X and Y patterns), or may undergo a combination of these transformations, without affecting the validity of the method for albedo and normal estimation.

It is also possible for one of the two patterns to be uniform white illumination (which is useful for measurement of albedo), while the other pattern has the X and Y binary patterns or their complements spectrally multiplexed into two spectrally non-overlapping colour-channels (e.g., Xin red and Yin blue). In this case, the two patterns are not strictly complementary in that they do not add up to white light, but they still contain sufficient information for computation of an albedo map and a photometric normal map.

Figure 10C:
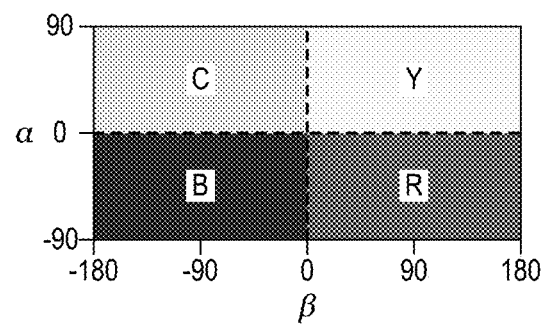
Figure 10D:
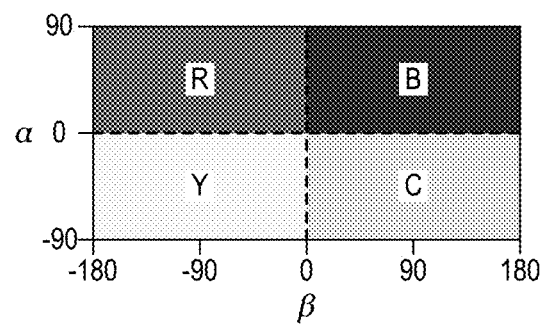

Referring also to FIGS. 10C and 10D, further spectrally multiplexed patterns are shown.

FIG. 10C shows the binary X pattern encoded in the blue (B) channel while its complement X' is encoded in the red (R) channel. Additionally, the binary Y pattern is encoded in the green (G) channel (G+B=cyan (C), and R+G=yellow (Y)).

FIG. 10D shows the binary X pattern encoded in the red (R) channel while its complement X' is encoded in the blue (B) channel. Additionally, the complement of the binary Y pattern is encoded in the green (G) channel.

Figure 10E:
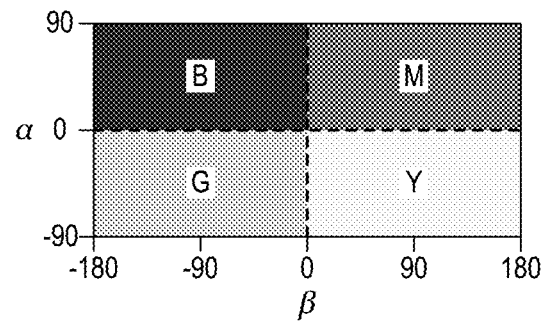
Figure 10F:
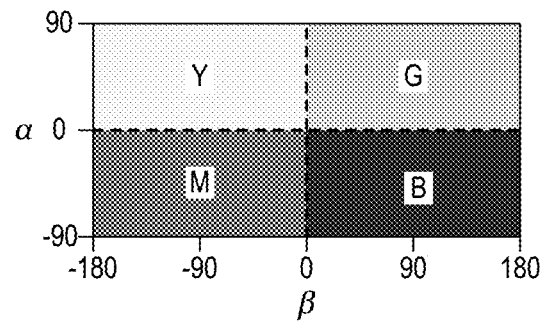

Referring also to FIGS. 10E and 10F, spectrally multiplexed patterns are shown which are the rotations (90 degrees clockwise) of the spectrally multiplexed patterns shown in FIGS. 9A and 9B respectively.

Figure 11A:
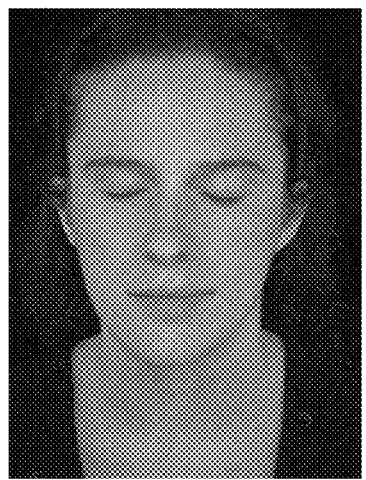
FIG. 11A shows a diffuse reflectance map obtained using the apparatus shown in FIG. 1.

Diffuse-Specular Separation Using Binary Patterns:

Given measurements with binary patterns (for example X and Y measurements aligned to longitude β and latitude α), a novel method for diffuse-specular separation is proposed based on chromaticity-luminance decomposition (see FIG. 11A). The method for diffuse-specular separation using binary patterns and chromaticity-luminance decomposition may be useful because it is does not require images acquired using polarisers (although it may also be used with images obtained using polarisers).

Figure 11B:
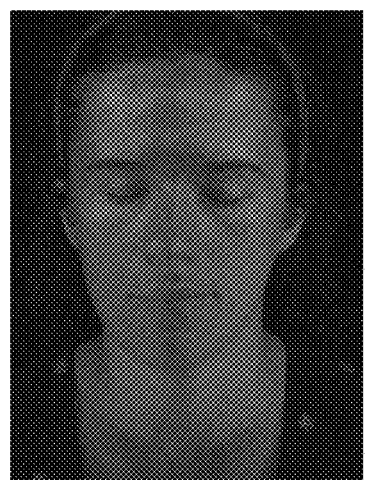
FIG. 11B shows a specular reflectance map corresponding to FIG. 11A.
Figure 11C:
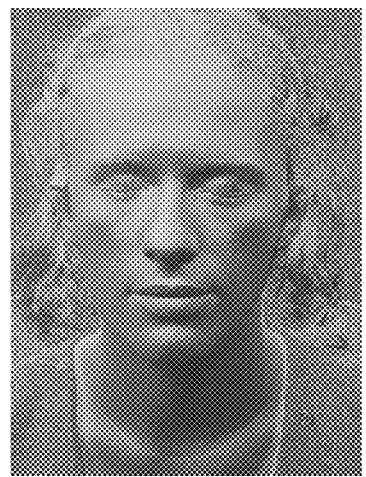
FIG. 11C shows a mixed normal map corresponding to FIG. 11A.
Figure 11D:
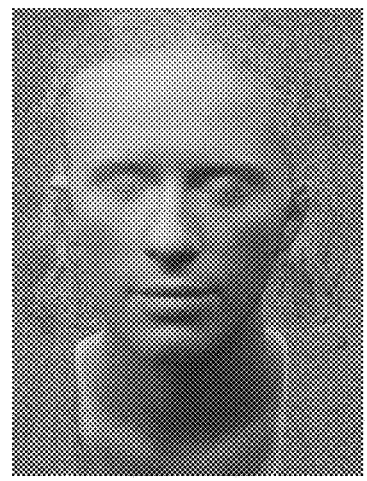
FIG. 11D shows a diffuse normal map corresponding to FIG. 11A.
Figure 11E:
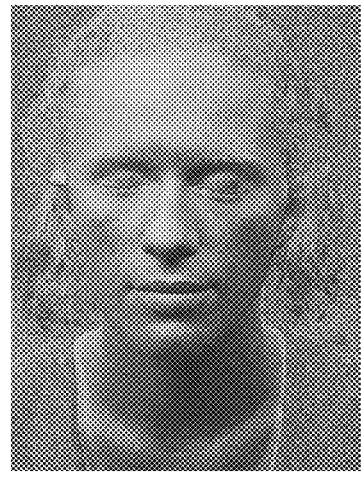
FIG. 11E shows a specular normal map corresponding to FIG. 11A.

Referring also to FIGS. 11A to 11E, diffuse-specular separation of reflectance and normals are shown. FIG. 1A shows diffuse reflectance, FIG. 11B shows specular reflectance, FIG. 1C shows a mixed normal map, FIG. 11D shows a diffuse normal map and FIG. 11E shows a specular normal map. The data in FIGS. 1A to 11E were obtained using the implementation of the first apparatus 1 shown in FIG. 1 in combination with binary patterns and methods described herein.

Given a pair of RGB measurements under a binary illumination pattern and its complement (produced using white light), the brighter measurement will face the "on" side of the binary pattern and will include responses of diffuse and specular reflection. The darker measurement will face the "off" side of the binary pattern and include only a response of diffuse reflection. These two RGB measurements (RGB_on and RGB_off) may be used by decomposing them into their chroma and luminance components ((Ch_on, L_on) and (Ch_off, L_off) respectively) in any suitable colour space (e.g., HSV, CIE Lab, CIE Luv, or Yuv), to compute an estimate of specular reflection as follows:

$$\text{specular} = L\_on - (Ch\_on/Ch\_off) * L\_off \qquad (1)$$

The ratio of the two chromas can be represented as γ=Ch_on/Ch_off. Then, the above Equation (1) can be represented as:

$$\text{specular} = L\_on - \gamma * L\_off \qquad (2)$$

The luminance in the above equations can be the L channel in lab or luv colour space, so or the yellow (Y) channel in Yuv space or the V channel in HSV colour space, while the chroma component can be the magnitude of the individual chroma components in lab, luv or Yuv spaces: e.g., $(a^2+b^2)^{0.5}$ or $(u^2+v^2)^{0.5}$, or the range of RGB (max−min) in HSV color space. Interestingly, the inventors have found that the ratio of chroma components γ can be well approximated in RGB colour space using the ratio of difference of any two brighter and darker colour channels. This is implies that given RGB measurements of color, it is possible to compute up to three different estimates of the chroma ratio γ using the combination of three possible colour differences. For example, in human skin reflectance, usually R>G>B. In this case we can have up to three different estimates of γ as:

$$\gamma 1 = (R\_on - G\_on)/(R\_off - G\_off)$$

$$\gamma 2 = (R\_on - B\_on)/(R\_off - B\_off)$$

$$\gamma 3 = (G\_on - B\_on)/(G\_off - B\_off) \qquad (3)$$

Then the final γ may be computed as a weighted average of two or more of the above individual chroma ratio estimates γ1, γ2, and γ3. Note that since this is a ratio of differences, the channel-wise difference can be done in any order as even if the difference leads to a negative value such a negative quantity in the numerator will cancel with the negative quantity in the denominator. The method for diffuse-specular separation using ratios of colour channel difference to approximate chroma components may be useful because it is does not require images acquired using polarisers (although it may also be used with images obtained using polarisers).

This weighted averaging of multiple chroma ratios provides noise filtering and hence a higher quality estimate of specular response using Equation (2) (where the corresponding luminance could be computed using any suitable colour space transform). The final specular response estimate can be obtained by weighted averaging of the specular estimate obtained separately from multiple binary patterns and their complements, e.g., weighted averaging of separately estimated specular using the X and Y binary patterns and their complements.

While the estimate of specular reflectance using Equations (1) and (2) is designed to be used with binary on-off patterns and their complements, it can also be used more generally with any pair of measurements where one of the measurements has diffuse and specular reflectance and the other measurement in the pair has only diffuse reflectance. Thus, the two measurements need not be from the same pair of binary pattern and its complement (e.g., X and X') but can also be from different types of binary patterns or their complements (e.g., X and Y or 0-1 shifted Haar wavelet patterns—see FIG. 6 and also FIGS. 25A to 30). The only requirement of the method is that one measurement is the brighter among its own binary-complement pair, and the other is the darker among its own binary-complement pair. For example, it would be possible to use a measurement from the X binary pattern and another measurement from the complement of the Y binary pattern (Y') to evaluate Equation (2) as long as these two measurements satisfy the above condition. In other words, that the X pattern measurement is the brighter (or darker) of X and complement X', and the Y' pattern measurement is the darker (or brighter) of Y and complement Y'.

Furthermore, the method can also be used for estimation of specular given a pair of measurements under uniform illumination, where one of the measurements is unpolarized or parallel polarized (which will provide a measurement of diffuse and specular), while the other measurement is cross-polarized with respect to the polarization of the illumination.

While in the case of such a cross-polarized measurement, one can usually measure the specular directly using a simple difference of the unpolarized or parallel polarized image and the cross-polarized measurement (as described in Ma2007 or Riviere2020). Such difference imaging is not as straightforward if the cross-polarized measurement is taken with a different camera with different viewpoint and optics (resolution and/or focal lens) than the camera used for the unpolarized or parallel polarized measurement. For instance, the apparatus 1, 5, 6 may include a wide angle camera on an iPhone® providing a lower resolution cross-polarized measurement along with a zoom lens on the iPhone® providing higher resolution unpolarized measurement. In this case, instead of just upsampling the lower resolution cross-polarized image to match the resolution of the unpolarized measurement and then using it for the polarization difference computation, one could use it for computing the weighted difference following a chroma-luminance decomposition as given by Equation 2. This may provide a higher quality estimate of specular reflectance than can be provided by simple difference imaging in this scenario.

Diffuse-Specular Separation of Surface Normals

As mentioned hereinbefore, the display illumination can be used to estimate surface normals using the binary X and Y patterns along with either a uniform full-on illumination pattern F, or along with the complements X' and Y'. The x and y components of the surface normal can be computed as follows:

$x' = X/F = X/(X+X')$, followed by $x = 2*x'-1$ and, $$y = Y - Y' = 2Y - F \quad (4)$$

Finally, the z component of the surface normal can be computed from the complement of X in the apparatus 1, 5, 6 with illumination restricted to the zone $\Delta\alpha$, $\Delta\beta$ of a frontal hemisphere.

$z' = X'/F = (F-X)/F$, followed by $$z = 2*z'-1 \quad (5)$$

The individual components of the surface normal (x, y, z) computed this way have to be normalized afterwards to obtain a surface normal. However, as mentioned hereinbefore, direct computation of the normal this way will have the x and z components of the normal rotated by 45° in the X-Z plane. Consequently, a last step is to rotate these two components of the surface normal appropriately by 45° to align them with the coordinate system. The same measurements of full-on F along with the X and Y binary patterns and/or complements can also be used to compute surface normals using SVD computation and obtaining the normals from the eigenvectors corresponding to the three most significant singular values.

Another way to estimate surface normals would be to employ standard photometric stereo on response of surface reflectance to localised banks of illumination. For example, as described in "Photometric Method for Determining Surface Orientation from Multiple Images", R. J. Woodham, Optical Engineering 19(1)139-144 (1980) (hereinafter "Woodham1980"). This can be generated, for example, by switching only one or even a portion of (e.g., half or quarter) one of the colour displays 2 panels on one so at a time and recording a "one-light-at-a-time" (OLAT) dataset of reflectance response. This data may then be input to a standard photometric stereo algorithm to estimate the surface normals.

However, all of the methods of obtaining surface normals hereinbefore will have diffuse and specular reflectance mixed in the reflectance response used for surface normal computation (more specular mixing with binary patterns than when using OLAT to compute normals). Thus, such approaches will estimate a mixed surface normal which is not ideal for realistic rendering applications. It is proposed to separate the mixed surface normal into a diffuse surface normal and a specular surface normal with further processing.

The diffuse normal may be computed by employing cross-polarized RGB measurements (which only contain diffuse) for the above normal computation methods.

Alternatively, the diffuse normal may be computed by employing only the magnitude of the chroma component of unpolarized RGB measurements observed under any of the above lighting conditions for surface normal computation using any of the above methods. This chroma may be computed in any color space that allows isolating the chroma component such as SUV, Yuv, Lab or Luv. Similarly, the diffuse normal may also be computed directly in RGB color space by using the absolute value of any of the channel-wise differences (|R−G|, |R−B| or |G−B|) for the surface normal computation. The method for computing the diffuse normal using only the magnitude of chroma components may be useful because it is does not require images acquired using polarisers (although it may also be used with images obtained using polarisers).

When estimating the photometric normal using binary patterns, first the specular reflectance can be estimated using the chroma-luminance decomposition method described herein. Subsequently, the specular reflectance may be subtracted from the brighter of the binary-complement pairs. The specular subtracted binary-complement pairs may be used to estimate the diffuse normal. When employing spectrally multiplexed binary X and Y patterns and/or their complements X', Y' encoded in a pair of colour channels exhibiting higher amounts of subsurface scattering may be used.

For example, for human skin, the red and blue colour channels may be used to approximate a diffuse normal (the red colour channel is considered to exhibit the most subsurface scattering in human skin). In such an example, the binary patterns (or complements) encoded in another pair of colour channels exhibiting lower amounts of subsurface scattering, for example green and blue, may be employed to approximate a mixed normal.

Specular normals can then be estimated given the mixed normal and the diffuse normal by directly subtracting the diffuse normal (which contains low frequencies due to diffuse reflectance) from the mixed normal (which contains both low and high frequencies due to diffuse and specular reflectance) to isolate the high frequencies in the normal map due to specular reflectance. These high frequencies may be empirically scaled up and added back to the diffuse normal followed by normalization to obtain a qualitative specular normal with much more pronounced high frequencies due to specular reflectance.

Another alternative would be to represent each mixed measurement employed for mixed surface normal computation as a weighted linear combination of a diffuse component and a specular component:

mixed_component=μ*diffuse_component+(1−μ)
*specular_component; thus specular_component=(mixed_component−
μ*diffuse_component)/(1−μ) (6)

The mixed measurement under a full-on F, or any of the binary X or Y patterns or their complements is a known quantity. The corresponding diffuse component is also a known quantity obtained from the magnitude of the chroma component. This allows solution for the unknown specular component if the weight p of mixing is known using Equation (6). The weight μ of mixture can be computed from the ratio of separated diffuse reflectance and the mixed reflectance as:

μ=diffuse/(mixed) (7)

Note that three different mixtures of diffuse and specular may be observed in the three RGB colour channels of a typical camera 3. Hence, it is possible to obtain three different estimates of specular component using Equation (6) which may then be used for weighted averaging to obtain a final estimate of the specular component. The so isolated specular components under each of the illumination patterns (F, X, Y and/or X', Y') may be employed to compute the specular normal. However, given the employment of binary patterns, the specular normal obtained in this manner will have the desired high frequency of surface details, but may suffer from low frequency bias. Hence, it may be advantageous to include a step for correction of this low frequency bias. Herein, it is proposed to apply a high pass filter to the specular normal and to add the high-pass of this specular normal to the diffuse normal followed by normalization. This process will achieve a specular normal that has the correct high frequencies as well as the low frequencies (see FIG. 11E).

Sinusoidal Phase-Shifting Patterns for Specular Normal Estimation

The apparatus 1, 5, 6 may also be employed to emit phase shifted sinusoidal patterns (0-1 shifted sinusoids), preferably modulated by the form-factor of the colour displays 2, along the two principal spherical directions α, β (along latitudes and longitudes respectively). Such measurements may be used to estimate separated diffuse and specular albedo as well as surface normal.

Phase shifted sinusoidal patterns have been described in "Image-based Separation of Diffuse and Specular Reflections using Environmental Structured Illumination", Bruce Lamond, Pieter Peers, Abhijeet Ghosh, Paul Debevec, IEEE International Conference on Computational Photography (ICCP) 2009 (hereinafter Lamond2009), for diffuse-specular separation of albedo. The results described in Lamond2009 showed that three phase shifted sinusoids of sufficiently high frequency which excites only specular, but not diffuse, can be used to compute three sinusoidal parameters by solving a linear system to compute parameters A, S, and C where:

$A$=diffuse+specular (8)

and S and C are magnitude of sinusoidal phases (cos and sin respectively) of the specular reflectance variation.

In Lamond2009 it was further shown that specular response can be obtained as:

specular=$(S^2+C^2)^{0.5}$; and diffuse=$A$−specular (9)

However, by phase-shifting specifically along latitudinal and longitudinal directions, the inventors of the present specification have observed that it may also be possible to reason about the specular normal, besides separation of the albedo into its diffuse and specular components. Specifically, three phase shifted sinusoids employed in the method of Lamond2009 for diffuse-specular separation may also be used to estimate the phase of the sinusoid that results in maximal response of specular reflectance. This maximal response phase direction directly corresponds to one of the spherical coordinates (α or β) depending on the direction of phase shifting) of the specular reflection vector (with respect to camera 3 viewpoint). Three phase shifted measurements are obtained along one of the spherical directions, say longitudinal direction β, to estimate diffuse and specular reflectance by estimating parameters A, S, and C, as well as a β_r parameter of the specular reflection vector, which may be computed as:

β_$r$=arctan($C/i$) (10)

Thereafter, only two more phase shifts are required along the orthogonal latitudinal direction α to estimate the phase of maximal response in the latitudinal direction which corresponds to the α_r parameter of the specular reflection vector. The reduced number of phase shifts in the latitudinal direction arises because the amplitude A of the signal (total reflectance) can already be estimated from the longitudinal phase shifting, which results in fewer parameters (S and C) to be estimated during the latitudinal phase shifting of the sinusoid. The estimated coordinates (α_r, β_r) can be converted into Cartesian coordinates to obtain the specular reflection vector r. The specular normal n_s can then be estimated from the specular reflection vector r as the halfway vector between the viewing direction v and the reflection direction r. Thus, a total of five measurements with phase-shifted sinusoids aligned with latitudinal and longitudinal directions (3 phase shifts along one direction and 2 phase shift along the other direction) may provide an estimate of both diffuse and specular albedo and the specular normal.

Sinusoidal patterns along latitudinal and longitudinal directions α, β of a latitude-longitude spherical parameterisation (α, β) may be written as:

$$S_\alpha = \sin\left(\frac{\alpha}{C}\right) \tag{11}$$

$$S_\beta = \sin\left(\frac{\beta}{D}\right) \tag{12}$$

and phase shifted versions thereof. In equations (11) and (12), C and D are constants determining the respective spatial frequencies of the patterns $S_\alpha$ and $S_\beta$.

Related to this, the apparatus may also be employed to emit phase shifted sinusoidal patterns where the phase shifting is about a local z axis or a local view-vector instead of along latitudes α or longitudes β. In other words, linear sinusoidal patterns may be rotated about a midline 8 direction α=β=0.

Figure 12A:
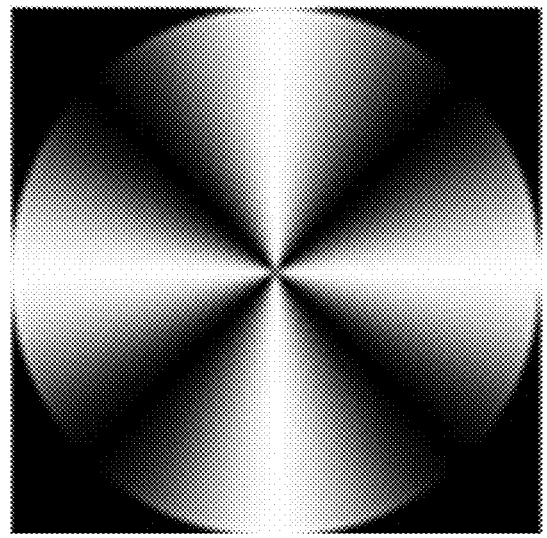
FIGS. 12A and 12B illustrate an illumination condition with a sinusoidal gradient for two different phases.
Figure 12B:
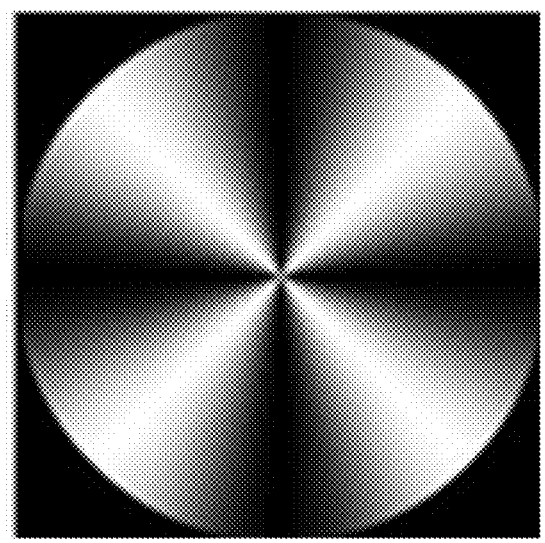

Referring also to FIGS. 12A and 12B, sinusoidal patterns about a local view vector are shown (which encompasses a hemisphere). The pattern shown in FIG. 12B is the same as the pattern in FIG. 12A, except rotated by 45 degrees (π/4).

In FIGS. 12A and 12B, the phase is shifted by 45° about a local z vector coming out of plane (which is also a local view vector v). The specular response to these two patterns can be employed to reason about the local orientation of specular anisotropy.

This orthogonal phase shifting about the local z axis or about a local view vector may be employed to estimate the local axis of anisotropic specular reflectance on a planar surface/sample facing the z axis or the camera 3 viewpoint. Similar to the methods described hereinbefore, three phase shifts may be employed to estimate the parameters of the sinusoid A, S, and C, followed by computation of the axis or orientation of anisotropy using Equation (10).

Alternatively, if A is already known through diffuse-specular separation, then only two phase shifts as shown in FIGS. 12A and 12B need be used to estimate S and C, followed by computing the axis or orientation of anisotropy using Equation (10).

In some examples, sinusoidal patterns may additionally or alternatively be defined in terms of a spherical polar coordinate system (θ, φ) with polar angle θ and azimuthal angle φ, instead of the latitude-longitude spherical parameterisation (α, β). The polar direction θ=0 may be substantially aligned (e.g. ±10 degrees/π/18) with the midline 8 direction α=β=0 in latitude/longitude coordinates:

$$S_P = \sin\left(\frac{\varphi}{E}\right) \quad (13)$$

and phase shifted versions thereof. In equation (13), E is a constant determining the spatial frequencies of the pattern $S_P$. Phase shifted sinusoidal patterns may have phase shifts along the spherical directions θ, φ of the spherical polar coordinate system (θ, φ).

Radial Basis Functions

In further examples, the apparatus 1, 5, 6 may also be employed to emit axis-aligned Gaussian or Spherical Gaussian basis functions, hemispherical harmonics, or orthogonal basis functions defined over the hemispherical zone (shifted between 0-1), or indeed any general spherical/hemispherical/zonal radial basis functions, in order to estimate subject/object shape and reflectance properties. Preferably, basis functions are also modulated by the form-factor of the colour displays. For example, Spherical Gaussian basis functions of two different widths (variance or standard deviation of the Gaussian) may be used to estimate parameters of specular roughness.

Basically, a surface with rough specular lobe will exhibit a greater response to a Spherical Gaussian of larger width than a Spherical Gaussian of narrow width. The opposite will be the case for a surface with a sharp specular lobe, which will have a stronger response to the narrow width Spherical Gaussian. Thus, by emitting illumination conditions corresponding to Spherical Gaussians of two different widths from multiple directions over the zone of illumination, it is possible to reason about the specular roughness of each surface point. This approach requires the surface normal of each surface point to be known and the observation of a pure specular reflectance response to each Spherical Gaussian. Herein, it is proposed to achieve this through either subtraction of a cross-polarized measurement from the mixed observation of response due to the Spherical Gaussian, or by modelling the diffuse component that need to be subtracted from the measurement under the Spherical Gaussian illumination using a known diffuse albedo and surface normal for a surface point.

Lighting Reproduction

The apparatus 1, 5, 6 may be employed to illuminate a subject/object 4 with illumination corresponding to a different scene for lighting effects/design or compositing applications.

This has previously been done using a spherical lightstage, and the process is called lighting reproduction. An environmental illumination (light-probe) is recorded of a different scene using a mirror ball or panoramic capture, and that illumination is then reproduced on a subject inside the lightstage. See, for example, "A lighting reproduction approach to live-action compositing", Paul Debevec, Andreas Wenger, Chris Tchou, Andrew Gardner, Jamie Waese, and Tim Hawkins, 2002, ACM Trans. Graph. 21, 3, 547-556, (July 2002) (hereinafter "Debevec2002").

Using the apparatus 1, 5, 6, a comparable process may be performed by using the colour displays 2 to illuminate an object/subject 4 with directional illumination corresponding to a different scene (e.g. measured environment illumination), or to carefully designed artistic lighting. Unlike a discrete lightstage, the apparatus' 1, 5, 6 piecewise continuous illumination is more suitable for illuminating very specular/shiny surfaces such as eyes or glass/mirror objects without generating unwanted reflection artefacts.

The colour displays 2 may even be employed to illuminate a subject/object using dynamic lighting at video rates (e.g., 30 or 60 FPS) whilst one or more cameras 3 acquire the dynamic lighting reflection on the subject at video rates. Unlike a lightstage, the lighting reproduction would be limited to the angular zone covered by the setup. Consequently, appropriate mapping of the spherical environmental illumination data may be employed to reproduce the appropriate zone on each of the colour displays 2. The lighting data is preferably also modulated by the form-factor of the colour displays, in order to brighten the sides/edges of the setup compared to the centre/equatorial plane so as to achieve a desired distribution of spherical illumination when employing the setup for lighting reproduction.

Such lighting reproduction methods may also be employed in conjunction with the 3D teleconferencing system utilising the apparatus 1, 5, 6. A remote participant may be illuminated with environmental lighting corresponding to a second (audience) location while that remote participant is being scanned in 3D for transmission and display at the second (audience) location. This may make the remote participant's display at the audience location appear more realistic, with lighting consistent with the second (audience) location. The illumination at the second (audience) location may be continuously recorded for reproduction, thereby achieving dynamic lighting reproduction on the remote participant. The remote participant's face could be lit so according to any changes in lighting at the second (audience) location (e.g. lights being switched on or off at audience location). The lighting reproduction may also correspond to any artistically/aesthetically designed lighting for subject/object photography/videography (e.g., designed lighting for product advertising).

Generalised Apparatus

Figure 13:
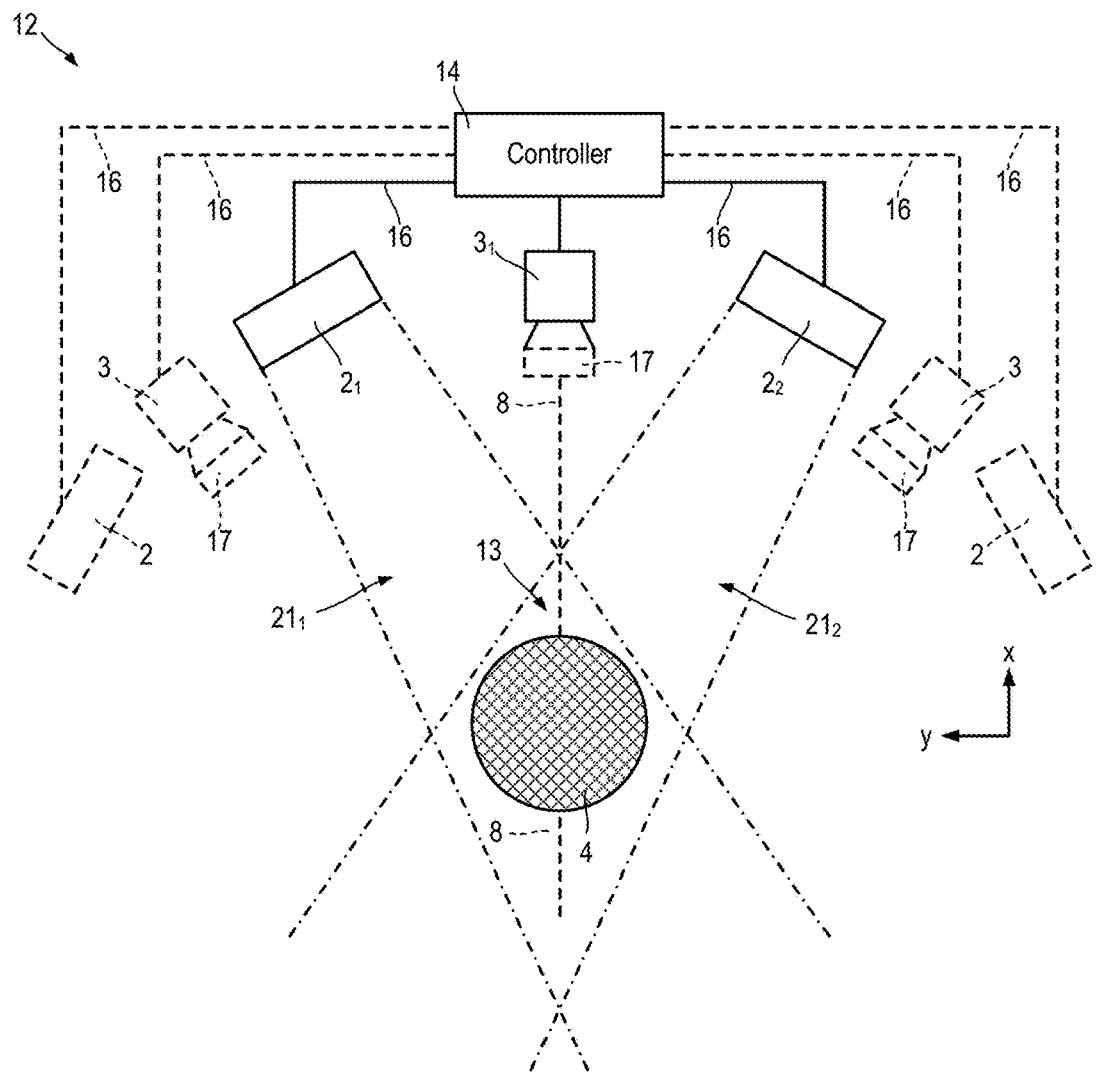
FIG. 13 schematically illustrates a generalised apparatus for piece-wise continuous active illumination and optical property capture.

Referring also to FIG. 13, a generalised apparatus 12 for piece-wise continuous active illumination and optical property capture (hereinafter "apparatus" 12) is schematically illustrated.

The first, second and third exemplary apparatuses 1, 5, 6 all represent particular implementations of the apparatus 12.

The apparatus 12 includes two or more colour displays 2 arranged to provide piece-wise continuous illumination of a volume 13. Two colour displays 2 is a minimum, and the apparatus 12 may include any number N≥2 of colour displays 2. The apparatus 12 also includes one or more cameras 3. One camera 3 is a minimum, and the apparatus 12 may include any number M≥1 of cameras 3. Each camera 3 is arranged to image the volume 13 illuminated by the colour displays 2.

Colour displays 2 may take any suitable form, including but not limited to liquid crystal displays (LCD), LED displays, OLED displays, plasma displays, or any type of emissive display. Any or all of the two or more colour displays 2 may take the form of curved, flexible and/or foldable colour displays, or lightfield (holographic) displays.

The apparatus 12 is configured to control the two or more colour displays 2 and the one or more cameras 3 to illuminate the volume 13 with each of two or more illumination conditions. In general the apparatus 12 may apply any number NIL≥2 of illumination conditions, denoted for example as $IL_1, \ldots, IL_2, \ldots, IL_n, \ldots, IL_{NIL}$, with $IL_n$ denoting the $n^{th}$ of NIL illumination conditions. An illumination condition $IL_n$ may be distinguished from other illumination conditions $IL_{k \neq n}$ by colour (or spectrum) and/or by a distribution of light intensity as a function of angle relative to the volume 13.

The illumination conditions $IL_1, IL_2, \ldots, IL_{NIL}$ may all belong to a single type of basis illumination condition (basis pattern/function), for example binary patterns, Harr wavelets, phase shifted sinusoids and so forth. Additionally or alternatively, the illumination conditions $IL_1, IL_2, \ldots, IL_{NIL}$ may include a mixture of two or more types of basis illumination condition. Basis functions in the abstract mathematical sense may span negative to positive numbers. However, utilisation of such basis functions to provide a basis illumination condition $IL_n$ requires mapping the range [-1, 1] to a range [0, 1] which is suitable to output using illumination intensity from colour displays 2.

Figure 20:
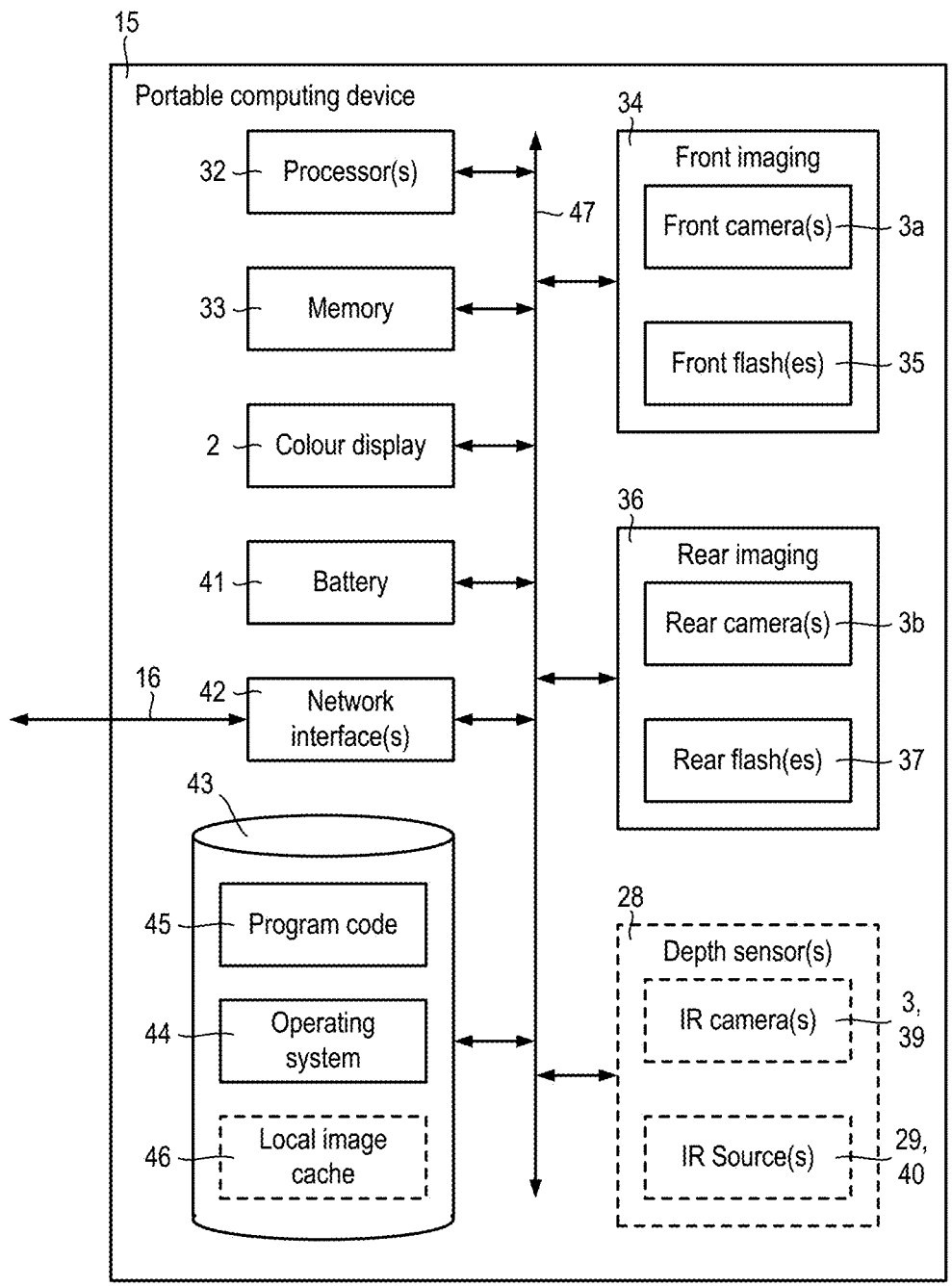
FIG. 20 is a block diagram of a portable computing device.

The apparatus 12 may include a controller 14 which coordinates and synchronises the colour displays 2 and cameras 3. Alternatively, when some or all of the colour displays 2 and/or cameras 3 are provided by portable computing devices 15 (FIG. 20), one of the portable computing devices 15 (FIG. 20) may provide the function of coordinating and synchronising the colour displays 2 and cameras 3. In effect, the controller 14 may be implemented/executed by such a portable computing device 15 (FIG. 20). Each colour display 2 and camera 3 is connected to the controller 14 by a respective wired or wireless link 16. The links 16 may be a mixture, in other words some links 16 may be wireless and other wired in the same apparatus 12. Examples of wireless links 16 may include, without being limited to, Bluetooth®, wireless (e.g. IEEE standards and comparable), infrared (IR) links, and mobile phone wireless protocols such as 4G, 5G and any other comparable or future mobile communications protocols having sufficient bandwidth to transmit and receive images. Wired links 16 may include, without being limited to, Universal Serial Bus (USB), High-Definition Multimedia Interface (HDMI), Display Port (DP). Some cameras may include audio input ports which can accept time-code from an external time-code generator for the purposed of synchronisation. When the colour displays 2 and cameras 3 are provided by portable computing devices, synchronization between portable computing devices may also be done wirelessly through generation of light or sound by the controller 14 (for example provided by one of the portable computing devices 15) that is sensed by light sensors/cameras 3 or microphones included in each portable computing device 15.

In other examples, the task of coordinating and synchronising the colour displays 2 and cameras 3 may be distributed in parallel across two or more portable computing devices 15 (FIG. 20).

The apparatus 12 is also configured to obtain two or more sets of images using the cameras 3. Each set of images is obtained during (concurrently with) illumination of the volume 13 with one, or a combination of, illumination conditions $IL_n$. For example, a set of images obtained during the first illumination condition $IL_1$ may be denoted $SET_1$ $(IL_1) = \{IM_1, \ldots, IM_m, \ldots, IM_M\}$, with $IM_m$ denoting an image obtained using the $m^{th}$ of M≥1 cameras 3. In total, a number NS≥2 of sets of images $SET_1, \ldots, SET_{ns}, \ldots, SET_{NS}$ are obtained. Since a set of images $SET_{ns}$ may correspond to one or more illumination conditions $IL_n$, it follows that 2≤NS≤NIL. An $ns^{th}$ set of images $SET_{ns}$ corresponding to multiple illumination conditions $IL_n$ emitted concurrently, for example a set of images $SET_{ns}$ corresponding to a pair of spectrally multiplexed illumination conditions $IL_n, IL_{k \neq n}$, may be denoted as $SET_{ns}(IL_n, IL_{k \neq n})$.

Each set of images may include at least one image $IM_1$ obtained using each of the M≥1 or more cameras 3, i.e. each set of images $SET_{ns}$ may include M images $IM_1, \ldots, IM_M$. In other words, every camera 3 included in the apparatus 12 may be used to obtain an image (or a sequence of images) for each set of images $SET_{ns}$. Alternatively, each set of images $SET_n$ may include images $IM_m$ obtained using a subset (e.g. two or more members) of the M cameras 3. When a subset of cameras 3 is used, the same subset of cameras may be used to obtain all of the sets of images $SET_1, \ldots, SET_{NS}$. However, it is possible to change the membership of the subset of cameras 3 between sets of images $SET_{ns}$. For example, the subset of cameras 3 used for obtaining the sets of images $SET_{ns}$ may switched when the illumination condition(s) are changed. This may be useful, amongst other applications, to switch from a subset of visible light cameras 3 to as a set of one or more infra-red (IR) cameras 3 for IR illumination conditions.

Each set of images $SET_{ns}$ of the two or more sets of images $SET_1, SET_2, \ldots, SET_{NS}$ may correspond to a different illumination condition $IL_n$, or to a different combination of illumination conditions $IL_n$ (i.e. two or more spectrally multiplexed illumination conditions $IL_n$), compared to each other set of images $SET_{ns}$.

The two or more sets of images $SET_1, SET_2, \ldots, SET_{NS}$ should include sufficient information for calculation of a reflectance map and a photometric normal map of an object or subject 4 positioned within the volume 13. Two or more sets of images $SET_1, SET_2, \ldots, SET_{NS}$ include sufficient information for calculation of a reflectance map and a photometric normal map if it is possible to determine at least one reflectance map and at least one photometric normal map for an object/subject 4 within the volume 13, without requirement for further inputs. Unless specifically indicated otherwise, the terms "object" and "subject" should be considered interchangeable in the present specification.

For example, reflectance maps and/or photometric maps may be calculated using any of the methods described herein such as binary patterns (e.g. using white light, monocoloured light, spectrally multiplexed patterns and so forth), Haar wavelet patterns, phase shifted sinusoidal patterns and so forth. The precise number NIS of illumination conditions $IL_n$ used depends on the specific choice of method, basis functions, whether or not spectral multiplexing is employed, and other factors as described herein.

Each reflectance map and/or photometric normal map may be calculated from the viewpoint of one of the cameras 3. Alternatively, multiple reflectance maps and or photometric normal maps may be calculated based on the two or more sets of images $SET_1$, $SET_2$, ..., $SET_{NS}$, for example one reflectance map and one photometric normal map may be calculated correspond to all, or a subset, of the M≥1 cameras 3. Another example in which more than one reflectance map and/or photometric normal map may be calculated is where two or more different calculation methods are used, for example to allow comparison or averaging of photometric normal maps using different methods. In some example configured to use three or more illumination conditions IL so that there is a choice of a minimum combination of the sets of images $SET_1$, $SET_2$, ..., $SET_{NS}$ to use as input, different reflectance maps/photometric normal maps may be calculated using different combinations of inputs.

As described hereinbefore, calculation of a photometric normal map may be based on singular value decomposition and/or may be calculated directly. Photometric normals calculated based on singular value decomposition may be rotated based on directly calculated photometric normal.

The apparatus 12 may be configured to calculate the one or more reflectance maps and the one or more photometric normal maps internally. For example, the controller 14 may be provided or executed by a desktop or laptop personal computer (not shown), which may perform the necessary calculations. Alternatively, the controller 14 may be exclusively concerned with coordinating the colour displays 2 and cameras 3, and may be communicatively coupled via a wired or wireless link to a data processing device (not shown) such as a desktop or laptop personal computer (not shown), which may perform the necessary calculations. In the latter example, the apparatus 12 may be configured to transmit the two or more sets of images $SET_1$, $SET_2$, ..., $SET_{NS}$, for to the data processing device (not shown), which may optionally send the calculated reflectance map(s) and photometric normal map(s) back to the apparatus 12 to display to a user on the colour displays 2.

Where one or more portable computing devices 15 (FIG. 20) provide the functions of the controller 14, the calculations for determining the one or more reflectance maps and the one or more photometric normal maps may be performed on (or in parallel across) the one or more portable computing devices 15 (FIG. 20). For example, each of several portable computing devices 15 (FIG. 20) may calculate a reflectance map and a photometric normal map from a different viewpoint.

Whether calculations are performed within the apparatus 12 (e.g. by the controller 14), by one or more portable computing devices 15 (FIG. 20), or by a separate data processing device (not shown), a separation of any or all calculated reflectance maps into diffuse and specular components may be calculated. Additionally or alternatively, a separation of any or all calculated photometric normal maps into diffuse and specular components may be calculated. The apparatus 12 (e.g. the controller 14), one or more portable computing devices 15 (FIG. 20), or a separate data processing device (not shown) may be additionally configured to calculate one or more 3D geometries of the object or subject, for example based on depth sensor information, or stereoscopic method. The apparatus 12 (e.g. the controller 14), one or more portable computing devices 15 (FIG. 20), or a separate data processing device (not shown) may be additionally configured to calculate one or more specular roughness maps of the object or subject. The apparatus 12 (e.g. the controller 14), one or more portable computing devices 15 (FIG. 20), or a separate data processing device (not shown) may be additionally configured to generate a 3D rendering for display on one or more of the colour displays 2.

When a data processing device (not shown) is used, it may be local to the apparatus 12 (for example within the same room or and the same building) or remote from the apparatus 12 (for example in a different building, city and/or country). The data processing device (not shown) may be communicatively coupled to the apparatus 12 via a direct wired and/or wireless link. The data processing device may be communicatively coupled to the apparatus 12 via a network including wired and/or wireless links (for example a local area network, the internet and so forth).

When the apparatus 12 includes two or more cameras, i.e. when M≥2, the apparatus 12 should be additionally configured (e.g. using controller 14) to synchronise the start and/or end of exposure periods for all cameras 3 used to obtain images $IM_m$ belonging to a given set of images $SET_{ns}$. In this way, variations in orientation and/or motion of a living subject 4 may be minimised between images $IM_m$ forming part of the same set $SET_{ns}$.

When the apparatus 12 includes two or more cameras, i.e. when M≥2, the cameras 3 are preferably spaced apart to image the volume 13 from different angles. In this way, the two or more sets of images $SET_1$, $SET_2$, ..., $SET_{NS}$ may include sufficient information for calculation of dense correspondence between the viewpoints of the two or more cameras 3. The calculated dense correspondence may be usable to calculate stereo-based 3D geometry of the object or subject 4 positioned within the volume 13, for example using stereoscopic techniques. When stereoscopic techniques are to be used, at least one set of images $SET_{ns}$ should include at least a pair of images $IM_m$, and preferably each of the two or more sets of images $SET_1$, $SET_2$, ..., $SET_{NS}$ will include at least a pair of images $IM_m$ corresponding to the same cameras 3.

The 3D geometry may also be referred to as a mesh, a depthmap and/or a geometric normal map. The calculated dense correspondence may additionally or alternatively be usable for image-based viewpoint interpolation for virtual camera view synthesis.

Measurements Using Polarisation

When the apparatus 12 includes two or more cameras 2, at least one those cameras 3 may include or have a polariser 17 applied in the imaging path. The polariser 17 should have a known relationship with respect to the illumination emitted by the N≥2 colour displays 2. For example, the colour displays 2 may all emit light having the same polarisation (linear or circular). This may be arranged by using colour displays 2 of a single type and having the same orientation (see for example the second or third apparatuses 5, 6). When the colour displays 2 emit linearly polarised light, the polariser(s) 17 corresponding to cameras 3 may be oriented either perpendicular (or "crossed") or parallel with respect to the light emitted by the colour displays 2. In this way, diffuse specular separation may be performed by comparing images $IM_m$ in each set $SET_{ns}$ between cameras 3 imaging the object 4 through a crossed polariser and other cameras 3 imaging the object 4 through a parallel polariser or no polariser. In this way, the two or more sets of images $SET_1$, $SET_2$, ..., $SET_{NS}$ may include sufficient information so to enable separation of the reflectance map and/or the photometric normal map into diffuse and specular components.

In examples where the colour displays 2 emit circularly polarised light, the polariser(s) 17 may be oriented with the same or opposite chirality (or "sense") as the light emitted by the colour displays 2.

If the colour displays 2 do not natively emit polarised light, a polarising film may be applied before use as part of the apparatus 12. Alternatively, if the two or more colour displays emit unpolarised light. A linear or circular polariser 17 on the camera 3 may still provide useful information. This is because the camera 3 with a polariser 17 applied will observe half the intensity of diffuse reflectance compared to another camera 3 without a polariser 17, while observing a similar intensity of specular reflectance.

Symmetrical Arrangement of Colour Displays Relative to Cameras

Within the two or more (N≥2) colour displays 2 and one or more (M≥1) cameras 3, there may be included at first and second colour displays 2 which are arranged substantially symmetrically about a plane including an optical axis of a first camera 3. For example, first and second colour displays 21, 22 shown in FIG. 13 are arranged substantially symmetrically relative to the meridian plane containing the midline 8, which is also aligned with the optical axis of a first camera 3a. A plane includes/contains the optical axis of a camera 3 if that plane is both parallel to and coincident with the optical axis of that camera 3. The symmetry plane need not be a meridian plane, and may be the equator or any other plane containing the optic axis of the camera.

In this way, the problems of asymmetrical illumination described hereinbefore in connection with the relighting of Sengupta2021 may be avoided.

Zone of Illumination

Figure 14:
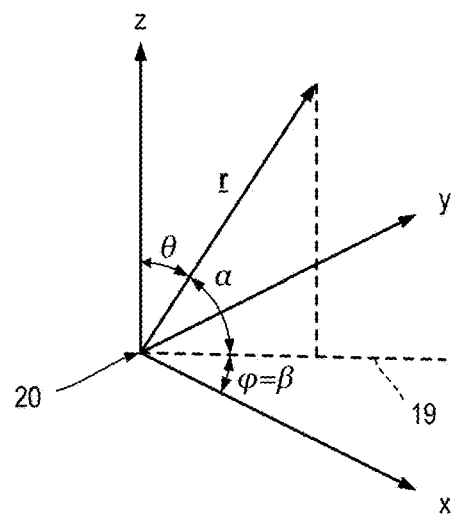
FIG. 14 schematically illustrates the relationships between coordinate systems referenced herein.
Figure 15C:
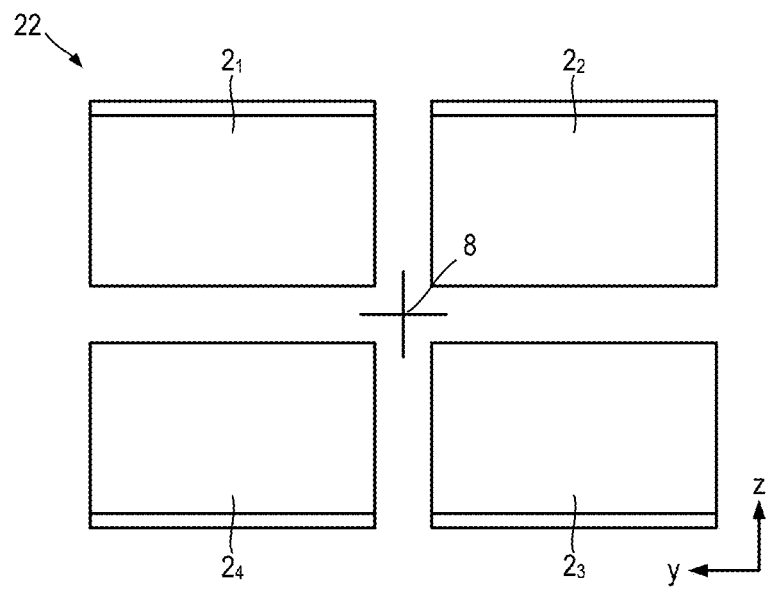
Figure 15C:
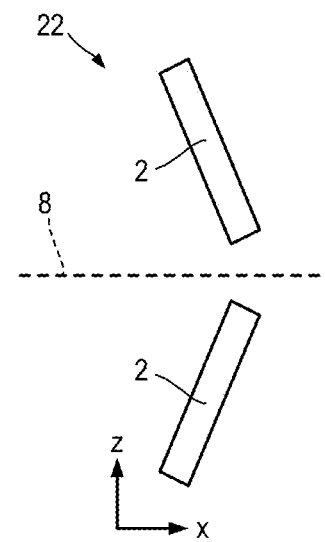
Figure 15C:
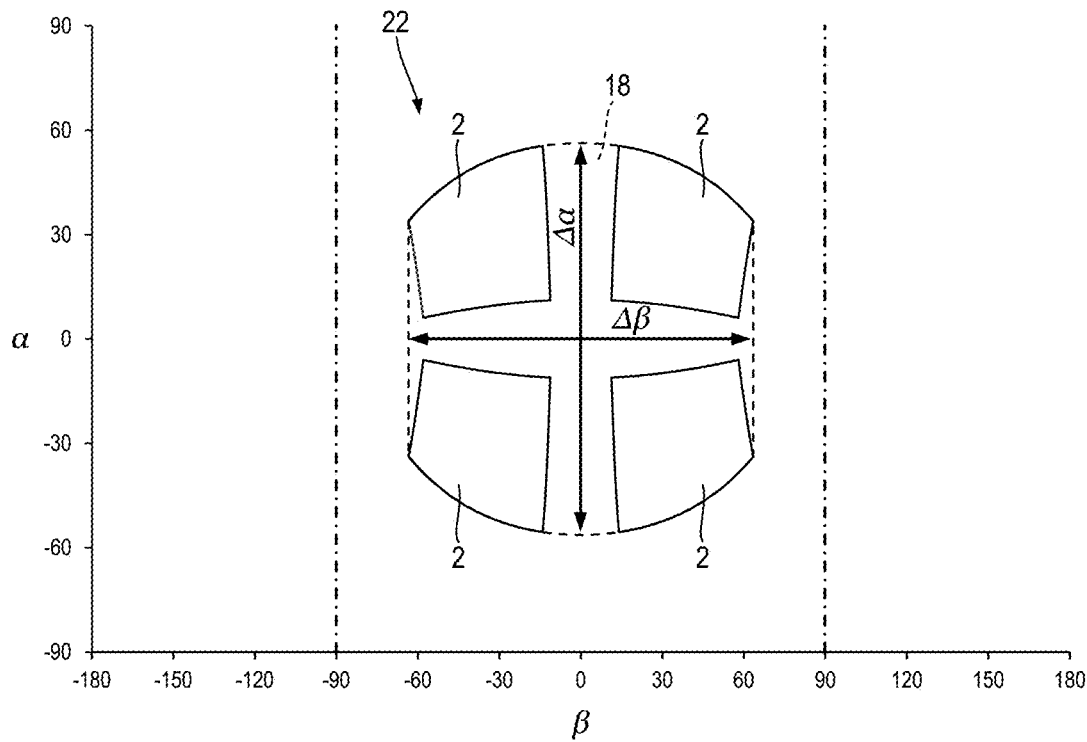

Referring also to FIG. 14 through 15C, the zone 18 from which the apparatus 12 directly illuminates the volume 13 shall be described further.

Referring in particular to FIG. 14, the various coordinate systems referred to herein are illustrated for reference.

A position vector r is illustrated against conventional right-handed Cartesian coordinates (x, y, z), the x-axis of which is taken to be aligned to a midline 8 of the apparatus 12. The projection of the position vector r onto the x-y (equatorial) plane is parallel to a line 19 within the x-y plane and making an angle $\beta=\varphi$ to the x-axis (and midline 8). In the latitude-longitude spherical parameterisation, this is the longitude angle $\beta$, and in spherical polar coordinates the azimuthal angle $\varphi$. The position vector r makes a latitude angle $\alpha$ to the x-y (equatorial) plane, and a polar angle $\theta$ to the z-axis. The position vector r is expressed in the latitude-longitude spherical parameterisation as $(r, \alpha, \beta)$, with r being the length (magnitude) of position vector r from a common origin 20. The position vector r is expressed in the latitude-longitude spherical parameterisation as $(r, \alpha, \beta)$.

Referring in particular to FIG. 13, each colour display 2 emits light according to an illumination pattern 21. For example, the first colour display $2_1$ emits a corresponding first illumination pattern $21_1$ whilst the second colour display $2_2$ emits a second illumination pattern $21_2$. An illumination pattern 21 may be regarded as analogous to a radiation pattern of a directional radio frequency antenna. The illumination patterns 21 illustrated in FIG. 13 are narrower than is typical for modern displays for visual purposes.

The volume 13 may be defined as the common intersection (volume intersection) of the illumination patterns 21 of all of the N≥2 colour displays 2 included in the apparatus 12.

For example, the intersection of the first and second illumination patterns $21_1$, $21_2$ illustrated in FIG. 13 forms the volume 13 as illustrated. However, if a third colour display 2 was added, the volume 13 would correspond to the volume intersection of first, second and third illumination patterns $21_1$, $21_2$, $21_3$. The N≥2 colour displays 2 are be considered to be arranged to provide piece-wise continuous illumination of the volume 13 corresponding to a common intersection (volume intersection) of the respective illumination patterns.

Consequently, when viewed from within the volume 13, the apparatus only provides direct illumination of the volume from angles within a zone 18, which for the apparatus 12 should be less than a hemisphere.

Referring in particular to FIGS. 15A to 15C, a fourth exemplary apparatus 22 (hereinafter "fourth apparatus") is shown.

FIG. 15A shows a view of the fourth apparatus 22 along the midline 8, FIG. 15B shows a side view along a direction within the equatorial ($\alpha$=0) plane and perpendicular to the midline 8, and FIG. 15C shows a projection of the fourth apparatus 22 into a latitude-longitude parameterisation taken from an origin 20 located on the midline 8 a distance in front of the fourth apparatus 22.

The fourth apparatus 22 is an implementation of the apparatus 12. The fourth apparatus includes four colour displays 21, 22, 23, 24, and one or more cameras 3 are not illustrated in FIGS. 15A to 15C for clarity of illustration the zone 18.

Referring in particular to FIG. 15C, the zone 18 may be represented as a closed curve which bounds the projection of the colour displays 2. The zone 18 corresponds to a first range $\Delta\alpha$ of latitudinal angles $\alpha$ and a second range $\Delta\beta$ of longitudinal angles $\beta$. An alternative definition is that, when viewed from within (inside) the volume 13, no part of any colour display 2 extends to an angle outside of the zone 18.

Depending on the shape, number and arrangement of colour display 2, the zone 18 may have any shape, and is not limited to the shape illustration in FIG. 15C for the fourth apparatus 22. For example, the zone 18 may be bounded by curves corresponding to constant latitudinal angle $\beta$ and/or constant longitudinal angle $\alpha$. However, the zone 18 may in general be bounded by any closed curve which may be parameterised in latitudinal angle $\beta$ and longitudinal angle $\alpha$. Preferably the zone 18 has the minimum size necessary in order to just enclose the colour displays 2 (and any additional light sources).

The apparatus 12 does not include any light sources which directly illuminate the volume 13 from angles outside of the zone 18. Direct illumination refers to light emitted from a light source which reaches the volume 13 without first reflecting from a surface (for example an environment such as a room).

Light sources include the colour displays 2, and also additional light sources 23 (FIG. 18) such as, for example, area light sources including large area organic light emitting diodes, OLEDs, or fluorescent tubes, point light sources including light emitting diodes, LEDs), or any other device capable of emitting visible light, Infra-red light and/or ultraviolet light.

The hemisphere corresponds to a latitudinal angle $\alpha$ ranging from $-\pi/2 \leq \alpha \leq \pi/2$, and a longitudinal angle $\beta$ ranging from $-\pi/2 \leq \beta \leq \pi/2$, and as illustrated for the fourth apparatus 22 in FIG. 15C, the zone 18 lies entirely within, and is smaller than, a hemisphere. The maximum and minimum latitudinal angles of the zone 18 within the hemisphere are $\alpha_{max} < \pi/2$ and $\alpha_{min} > -\pi/2$ respectively, and the first range is $\Delta\alpha = \alpha_{max} - \alpha_{min}$. In general, each of the first and second ranges $\Delta\alpha$, $\Delta\beta$ should be no more than $17\pi/18$, and there is also a minimum extent for useful illumination so that the first range satisfies $\pi/18 \leq \Delta\alpha \leq 17\pi/18$. Similarly the maximum and minimum longitudinal angles $\beta$ of the zone may be $\beta_{max} < \pi/2$ and $\beta_{min} > -\pi/2$ respectively, such that the second range is $\Delta\beta = \beta_{max} - \beta_{min}$. The second range $\Delta\beta$ should also satisfy $\pi/18 \leq \Delta\beta \leq 17\pi/18$. The magnitudes of the first $\Delta\alpha$ and second $\Delta\beta$ ranges may be the same, or may differ, i.e. $\Delta\alpha > \Delta\beta$ or $\Delta\alpha < \Delta\beta$.

The origin of the latitude-longitude spherical parameterisation ($\alpha$, $\beta$) referred to herein is presumed to be within the volume 13. For example, the origin of the latitude-longitude spherical parameterisation ($\alpha$, $\beta$) may be coincident with the centroid of the volume 13. The apparatus 12 does not cause any direct illumination to be incident on the volume from angles outside the zone, i.e. from angles $\alpha > \alpha_{max}$ or $\alpha < \alpha_{min}$, and/or $\beta > \beta_{max}$ or $\beta < \beta_{min}$.

However, radial distances r of the colour displays 2 from the origin 20 need not be equal. In other words, whilst the direct illumination provided by light sources of the apparatus, including the colour displays 2, corresponds to angles within (bounded by) the zone 18, the colour displays 2 (and any other light sources) are not required to be arranged/disposed to coincide with a portion of a spherical surface (although this is one possible implementation).

Nearfield Illumination

A local or nearfield light source is defined in computer graphics/vision as a light source that is large enough and/or near enough to an object/subject 4 to create substantial variations in the distance and/or angle of illumination across the extent of the object/subject 4. Since the size of an object/subject 4 may vary in use, it may sometimes be more useful to instead refer to whether a particular light source is so configured to provide local or nearfield illumination of the volume 13.

In contrast to a local/nearfield light source, a distant, directional or farfield light source is one that is at sufficient distance and/or of sufficiently small size that its size and position no longer create a substantial variation of distance and/or angle of illumination across the extent of an object/subject 4 (or the volume 13). Lightstages are typically designed to have small point lights at sufficient distance (for example several meters) from a object/subject at the centre to create only directional lighting on the subject/object with negligible variation of direction over the object/subject 4 due to one individual light source. In other words, all surface points on the object/subject 4 see the light from such each light source as being incident from effectively the same direction.

An area light source such as a colour display 2 at a short distance will present as a local/nearfield light source for an object/subject 4 (or the volume 13), since different points on the display screen will be at measurably different distances from the object/subject. In this context, a short distance may be considered to be of the order of 40 to 50 cm or closer, or less than 1 metre. In this way, the apparatus 12, as well as extensions and/or variants thereof described herein, may be configured so that the colour displays 2 provide nearfield illumination of the volume 13 (and an object/subject 4 within the volume 13). A colour display 2 which provides nearfield illumination of the volume 13 may still present as a distant source to a small object/subject 4 which is significantly smaller than the volume 13.

The different distances of different pixels of a particular colour display 2 from the volume 13 may be utilised in some illumination conditions $IL_n$, whilst in other illumination conditions $IL_n$ these differences in distance may need to be accounted and/or corrected for. Such "form factor corrections" have been described hereinbefore, and are also discussed in relation to FIG. 23.

Method of Obtaining Reflectance Maps and Photometric Normal Maps

Figure 16:
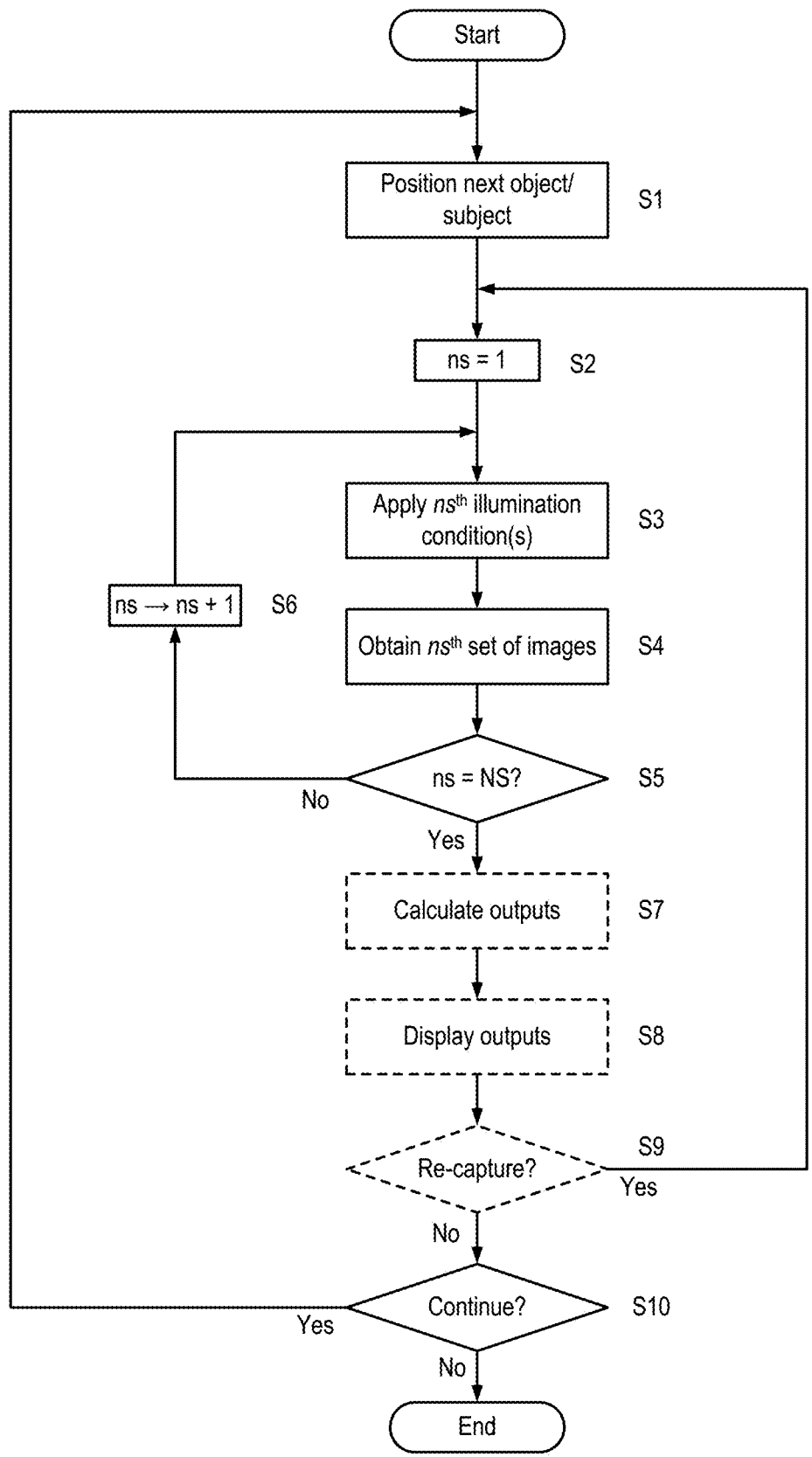
FIG. 16 is a process-flow diagram of a method of using the apparatus of FIG. 13.

Referring also to FIG. 16, a method of using the apparatus 12 is shown.

An object or subject 4 is positioned within the volume 13 (step S1). Starting with the first, ns=1 (step S2), the illumination conditions $IL_n$ corresponding to the $ns^{th}$ set of images $SET_{ns}$ are output towards the volume 3 (step S3). With the object/subject 4 so illuminated by the illumination conditions $IL_n$ corresponding to the $ns^{th}$ set of images $SET_{ns}$, the images $IM_m$ corresponding to the $ns^{th}$ set of images $SET_{ns}$ are obtained (step S4).

If the index ns<NS (step S5|No), then the index ns is incremented by one (step S6) and the next set of images $SET_{ns+1}$ is obtained under the corresponding illumination conditions (steps S3 and 4). The process loops (steps S3 through S6) until the index ns=NS and all NS sets of images $SET_1, \ldots, SET_{NS}$ have been obtained (step S5 Yes).

For example, four illumination conditions $IL_1$, $IL_2$, $IL_3$, $IL_4$ may correspond to the first four Haar wavelet patterns illustrated in FIG. 6, and a set of images $SET_1(IL_1)$, $SET_2(IL_2)$, $SET_3(IL_3)$, $SET_4(IL_4)$ may be obtained for each illumination condition $IL_1$, $IL_2$, $IL_3$, $IL_4$ separately. Alternatively, spectral multiplexing may be used to reduce the number of sets of images $SET_{ns}$. If the second illumination condition $IL_2$ is encoded into one colour channel (for example red) and the third illumination condition is encoded in another, spectrally resolvable colour channel (for example green or blue), then only three (NS=3) sets of images $SET_1(IL_1)$, $SET_2(IL_2, IL_3)$, $SET_3(IL_4)$ need to be obtained.

Referring again to FIG. 9A, the illustrated pattern is a spectral multiplexing of three illumination conditions. A first illumination condition $IL_n$ is a binary X pattern encoded in blue, a second illumination condition $IL_{n+1}$ is the complement X' encoded in green, and a third illumination condition $IL_{n+2}$ is a binary Y pattern encoded in red. The three illumination conditions $IL_1$, $IL_2$, $IL_3$ are emitted concurrently to generate the pattern shown in FIG. 9A, and a corresponding set of images $SET_{ns}(IL_n, IL_n, IL_n)$ may be obtained.

When a set of images $SET_{ns}(IL_n, IL_{k \neq n})$ corresponds to a spectrally multiplexing of two or more spectrally resolvable illumination conditions $IL_n$, $IL_{k \neq n}$, the images $IM_m$ may be post-processed to generate a sets of images $SET_{ns}(IL_n)$, $SET_{ns}(IL_{k \neq n})$ corresponding to the respective illumination conditions. For example, if two illumination conditions $IL_n$, $IL_{k \neq n}$ were spectrally multiplexed in red and blue channels, then the images $IM_m$ may be simply split into monochrome red and blue images.

Two or more spectrally resolvable illumination conditions $IL_n$, $IL_{k \neq n}$ do not need to be spectrally multiplexed, and may be applied at different times, for example according to a sequence. Spectral multiplexing is preferred when possible for living subjects 4, since reducing the number of images may help to reduce any mismatches in the position of the subject between sets of images $SET_{ns}$.

If there are further objects/subjects 4 to be measured (step S10|Yes), then the next object/subject 4 is positioned within the volume 13 (step S1) and the measurement process is repeated (steps S2 through S10).

In the basic method, the apparatus 12 may simply be used to obtain the sets of images $SET_1, \ldots, SET_{NS}$. However, the apparatus 12 may additionally be used to provide feedback functions using the same apparatus 12 as is used to capture sets of images SET$_{ns}$.

For example, after the complete set of images SET$_1$, . . . , SET$_{NS}$ has been obtained (step S5|Yes), one or more reflectance maps and one or more photometric maps may be calculated (step S7). For example, the calculations may be performed as explained hereinbefore, using the controller 40, using a data processing device (not shown) coupled to, or integrated with, the apparatus 12, or using one or more portable computing devices 15 (FIG. 20). Optionally, additional calculations to determine a 3D geometry, a specular roughness maps, and so forth, may be carried out.

After one or more reflectance maps and one or more photometric maps have been obtained, whether calculated internally or sent back from a local or remote data processing device (not shown), the outputs may be presented to a user via one or more of the colour displays 2 of the apparatus 12 (step S8). For example, 2-D graphical representations of one or more reflectance maps and/or one or more photometric maps may be displayed on one or more colour displays 2. Additional derived parameters may also be displayed, for example a measure of map quality and/or identifying any region in which data was insufficient or low quality. In examples where a 3D geometry is measured or calculated, a 3D rendering of the object/subject 4 may be generated based on the 3D geometry combined with the reflectance and photometric normal maps, then displayed to a user. Multiple colour displays 2 may be used to display the 3D rendering, for example with each showing the 3D rendering from a different viewpoint.

Optionally, the outputs may include instructions to re-position and/or rotate the object/subject, other otherwise to repeat the capture process. After reviewing the outputs, a user may decide to continue by replacing the object/substrate (steps S9|No, S10|Yes, S1). Alternatively, if a user is dissatisfied with the output and/or has been given an instruction to repeat obtaining the sets of images SET$_1$, . . . , SET$_{NS}$ (step S9|Yes), then the capture process (steps S1 through S9) is repeated with the aim of obtaining more complete, accurate and/or sets of images SET$_1$, . . . , SET$_{NS}$ which the user is satisfied with.

Spectrally Multiplexed Illumination Conditions

Figure 17:
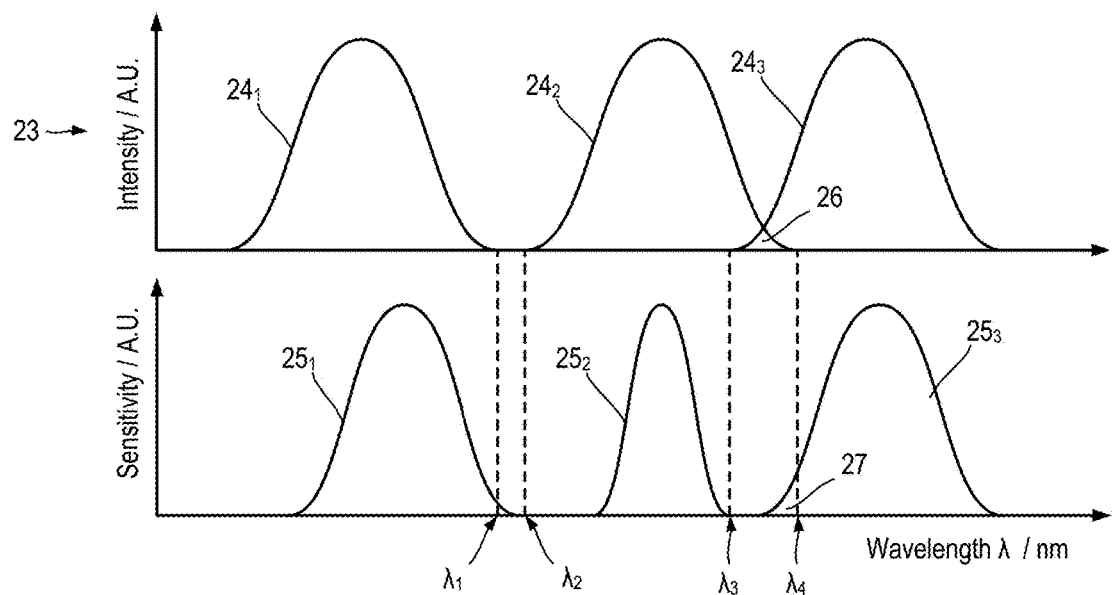
FIG. 17 schematically illustrates spectral resolvability of adjacent colour channels.

Referring also to FIG. 17, the concept of spectrally resolvable illumination conditions is further discussed.

FIG. 17 shows a schematic spectrum 23 for an example of a colour display 2 which has three colour channels (for example RGB) having first to third channel spectra 24$_1$, 24$_2$, 24$_3$ respectively. Also shown are first to third channel sensitivities 25$_1$, 25$_2$, 25$_3$ for three generally corresponding colour channels of a camera 3.

The degree of overlap between the channel spectra 24$_1$, 24$_2$, 24$_3$ is not determinative for whether colour channels are suitable for spectral multiplexing. This is determined by the degree of cross-talk between a channel spectrum 24$_1$, 24$_2$, 24$_3$ for a channel and the channel sensitivities of adjacent colour channels 25$_1$, 25$_2$, 25$_3$.

For example, whilst the first channel sensitivity 25$_1$ extends to wavelengths λ above a maximum wavelength λ$_1$ of the first channel spectrum 241 (e.g. a wavelength λ for which the first channel spectrum 24$_1$ drops below a noise level), it does not extend above a minimum wavelength λ$_2$ of the second channel spectrum 24$_2$. Additionally, the second channel sensitivity 25$_2$ does not overlap the first channel spectrum 24$_1$.

Consequently the first and second colour channels are spectrally resolvable in this example.

In practice, there may be some of degree cross-talk between adjacent colour channels. For example, the maximum wavelength λ$_3$ of the second channel spectrum 24$_2$ is larger than the minimum wavelength λ$_4$ of the third channel spectrum 24$_3$, resulting in an overlap 26 of width λ$_4$-λ$_3$. The second channel sensitivity 25$_2$ does not extend into the overlap region 26. However, the third channel sensitivity 25$_3$ does, leading to a cross-talk region 27 in which the third colour channel of the camera 3 will respond to light emitted in the second colour channel of the display 2. In this example, the signal in the second colour channel of the camera 3 may be used to compensate for the cross-talk, and the second and third colour channels of this example are still spectrally resolvable.

However, if the second channel sensitivity 25$_2$ also overlapped with the third channel spectrum 24$_3$, then whether or not the second and third channels are spectrally resolvable will depend on the degree of cross-talk. For example, if the signals S$_a$, S$_b$ in a pair of adjacent colour channels are:

$$\begin{pmatrix} S_a \\ S_b \end{pmatrix} = \begin{pmatrix} A & B \\ C & D \end{pmatrix} \begin{pmatrix} INT_a \\ INT_b \end{pmatrix} \quad (14)$$

In which INT$_a$ is the intensity of illumination in the first colour channel and INT$_b$ is the intensity of illumination in the second colour channel. The on-diagonal coefficients A and D represent the direct responses of the colour channels of a camera 3 to the respective colour channels of a display 2, and the off-diagonal coefficients B and C represent the cross-talk. In general, a pair of colour channels may be considered spectrally resolvable provided that the largest cross-talk coefficient B, C is no more than 10% of the smallest direct response coefficient A, D.

Most conventional RGB colour displays 2 and RGB cameras 3 all exhibit sufficient separation between colour channels that the red, green and blue channels are considered spectrally resolvable for the purposes of the apparatus 12 and methods described in the present application.

When there is a degree of cross-talk, for example some RGB cameras 3 may detect green illumination from an RGB illumination source on both green and red channels, this may be mitigated by using illumination patterns in which spectrally overlapping colour channels may be spatially separated in the pattern. For example, if first and second colour channels exhibit cross talk, then they may be used to encode complementary spatial patterns, e.g. binary X and X', or binary Y and Y'. If a third colour channel does not overlap significantly with either, then a third illumination condition IL$_n$ may be added concurrently.

Additional Light Sources

Figure 18:
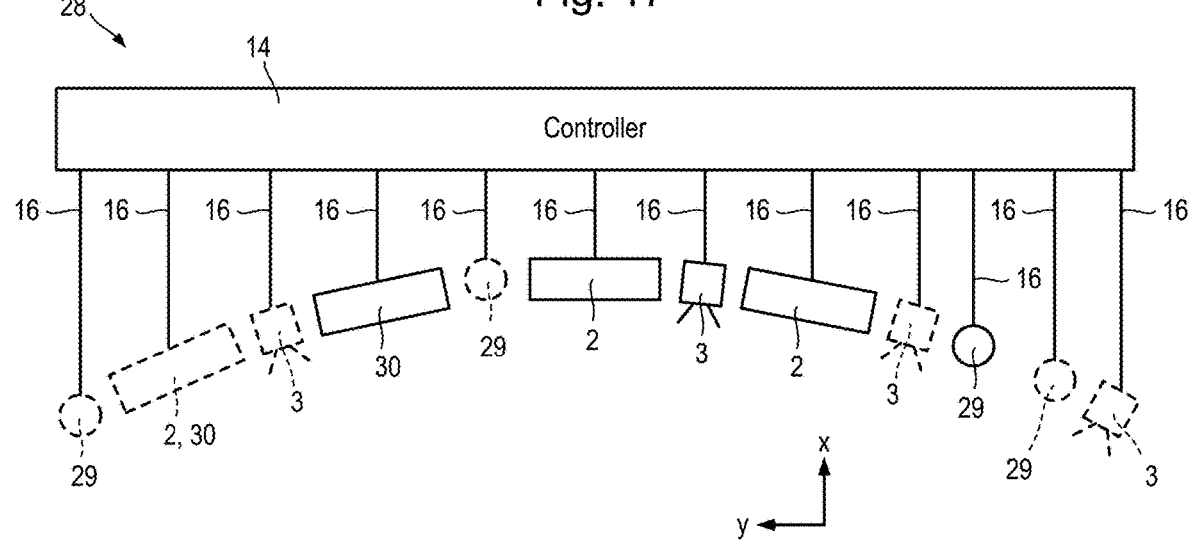
FIG. 18 schematically illustrates a first augmented apparatus for piece-wise continuous active illumination and optical property capture.

Referring also to FIG. 18, a first augmented apparatus 28 is shown.

The first augmented apparatus 28 is the same as the apparatus 12, except that in addition to the two or more colour displays 2, the first augmented apparatus 28 also includes one or more additional light sources 29, 30. Unless specifically indicated otherwise, the first augmented apparatus 28 should be considered to be interchangeable with the apparatus 12 in any examples described in the present specification. Unless specifically indicated otherwise, any definitions and/or functions described in relation to the apparatus 12 also apply to the first augmented apparatus 28.

Additional light sources 29, 30 may be point light sources 29 or area light sources 30. Area light sources 30 are preferably configured to provide nearfield illumination of the volume 13. A point light source 29 may provide distant, directional or farfield light illumination, or may provide local/nearfield illumination, in dependence on the relative positions of that point light source 29 and the size of the volume 13 (or an object/subject 4 within the volume 13).

Each additional light sources 29, 30 is arranged to provide illumination of the volume 13, and provides direct illumination of the volume 13 only from angles within the zone 18. The first augmented apparatus 28 is configured to control the one or more additional light sources 29, 30 in coordination with the two or more colour displays 2 in order to generate the illumination conditions $IL_1, \ldots, IL_{NIL}$ (e.g. using the controller 14). The additional light sources 29, 30 may be entirely separate devices, or may be integrated with a colour display 2 and/or a camera 3 (see for example portable computing device 15 in FIG. 20).

At least one of the illumination conditions $IL_n$ may include, or consist of, light emitted by one or more of the additional light sources.

Additional light sources in the form of area light sources 30 may include, or take the form of, monochrome displays, large area OLEDs, fluorescent bulbs, an LED/OLED panel, and so forth. Herein, an LED/OLED panel may be considered distinct from an LED/OLED colour display 2 in that the latter is suitable for conventional display of RGB (or other colour encoded) images, whereas an LED/OLED panel is not. This may be a consequence of insufficient colour channels, insufficient resolution and so forth. Hence, an LED/OLED panel is not well suited for image display, however, the size and spacing of individual LEDs/OLEDs is such that the LED/OLED panel overall appears as an area source 30 when viewed from the volume 13, as opposed to each individual LED/OLED appearing to be a point source 29 as discussed hereinafter. The one or more area light sources 30 may be arranged to provide piece-wise continuous illumination of the volume 13, either alone or in combination with the two or more displays 2.

The additional light sources may include one or more point light sources 29. A point light source 29 may include, or take the form of, a LED, an OLED, a termination of an optical fibre, a camera flash associated with at least one of the one or more cameras, a projector, and so forth. A projector may be, for example, an LCD projector, an OLED projector and so forth. A projector may output uniform and/or structured (patterned) illumination.

A point light source 29 may be regarded as a light source which, when viewed from within the volume 13 (for example from the origin 20 of the latitude-longitude parameterisation ($\alpha$, $\beta$)), subtends a very small solid angle compared to the smallest solid angle subtended by one of the colour displays 2 from the same position. For example, when viewed from within the volume 13, a point light source may subtend a solid angle of no more than 5 degrees arc, or no more than 0.1 times the smallest solid angle subtended by one of the colour displays 2.

The number and angular density of point light sources 29 should be insufficient to approximate continuous illumination at the volume 13 (otherwise the light sources concerned should be regarded as a single area light source 30 instead). For example, the minimum angle between any pair of point light sources 29 emitting the same spectrum of light, when viewed from the volume 13 (for example the origin 20 or the centroid of the volume 13), should be at least 20 degrees. The minimum angle between a pair of point light sources 29 emitting different spectra is not limited beyond physical practicality.

The first augmented apparatus 28 may output illumination conditions $IL_n$ which are:
  Generated exclusively using the colour displays 2 (or a subset thereof);
  Generated exclusively using the additional light sources 29, 30 (or a subset thereof);
  Generated using a combination of at least one colour display 2 and at least one additional light source 29, 30.

The one or more additional light sources 29, 30 may include at least one white light source. White light sources may take the form of point light sources 29 and/or area light sources 30. A white light source may take the form of a white LED or OLED (or a closely spaced array thereof), or may take the form of a broadband light source (e.g. an incandescent filament). The one or more additional light sources 29, 30 may include two or more white light sources which have different colour temperatures. A white light source may have a colour temperature between 2,200 K and 7,000 K (inclusive of the end-points), for example, selected from the group consisting of 2,700 K, 3,000 K, 4,000 K, 5,400 K, 5,600 K, 6,000 K and 6,500 K.

Independently of whether or not any white light sources are included, the one or more additional light sources 29, 30 may include at least one coloured light source configured to emit light which is spectrally distinct from light emitted by the colour displays 2. For example, one or more area light sources may take the form of coloured light sources and/or one or more point light sources may take the form of coloured light sources. A coloured light source 29, 30 may emit light having a complementary spectrum not achievable by the colour displays 2. For example, if the colour displays are conventional red-green-blue (RGB) displays, then one or more additional light sources 29, 30 may take the form of coloured light sources emitting colours which are distinct from the RGB light of the colour displays 2 such as, for example, royal blue, lime green, amber, and so forth. A coloured light source may take the form of a white light source combined with a colour filter.

The one or more additional light sources 29, 30 may additionally or alternatively include at least one light source which emits at non-visible wavelengths. For example, one or more area light sources 29 may emit at non-visible wavelengths and/or one or more point light sources may emit at non-visible wavelengths. Non-visible wavelength may include infra-red (IR) light sources, for example at wavelengths A more than 700 nm. Non-visible wavelength may include ultraviolet light sources, for example at wavelengths $\lambda$ less than 380 nm.

Additional light sources 29, 30 in the form of coloured and/or non-visible light sources so may be used to allow the first augmented apparatus 28 to produce additional illumination conditions $IL_n$ which may be spectrally multiplexed with one another and/or with illumination conditions emitted using the colour displays 2. Illumination conditions $IL_n$ produced using additional light sources 29, 30 in the form of coloured and/or non-visible light sources may be spectrally multiplexed provided that they are spectrally resolvable as described hereinbefore.

In order take full advantage of the options enabled by including additional light sources 29, 30, the first augmented apparatus 28 may include two or more cameras 3, at least one of which may have a different sensitivity compared to a conventional RGB camera. For example, one or more cameras 3 sensitive to IR or UV wavelengths may be included in the first augmented apparatus 28. Cameras 3 having different colour sensitivities in the visible band may also be used. Different colour sensitivities may be either inherent to the sensor used in a camera 3, or may be produced by applying colour filters (not shown) to at least some of the cameras 3. Colour filters may also be used in some cases to reduce cross-talk between adjacent colour bands. If a camera 3 images through a colour filter, then it may employ an automatically actuated mechanism for moving the colour filter in and out of the optical path (for example a rotating wheel supporting multiple filters), or else more cameras 3 may be needed. As an alternative to physically moving filters in and out of the optical path, electronically tunable colour filters may be used. For example, tunable liquid crystal colour filters, which may also be used in conjunction with unfiltered/unpolarised cameras 3 for diffuse-specular separation. Where a portable computing device 15 includes multiple cameras 3 facing in the same direction, for example a smart phone 31 having two or more back cameras 3b, a different filter may be applied to each back camera 3b to enable simultaneous capture of different spectral images from substantially the same viewpoint.

The first augmented apparatus 28 may also include one or more depth sensors 38 (FIG. 20) directed at the volume 13. Each depth sensor 38 includes one or more sets of infra-red, IR, emitters, for example provided by corresponding point sources 29 and one or more cameras 3 having a sensitivity to IR. A camera 3 for a depth sensor may take the form of a dedicated, monochrome IR camera, or a camera 3 may be an RGB and IR camera, which includes pixels for each of red, blue, green and IR wavelengths.

The first augmented apparatus 28 (e.g. the controller 14) may be configured to control the one or more depth sensors 28 (FIG. 20) to measure a 3D geometry of an object or so subject 4 positioned within the volume 14. A depth sensor may take the form of a stand-alone device, or may be integrated as part of a larger device such as a portable computing device 15 (FIG. 20).

The first augmented apparatus 28 (e.g. the controller 14) may be further configured to control IR emitters in the form of point light sources 29 and associated IR cameras 3 directly and independently. For example, rather than simply triggering a depth sensor 38 (FIG. 20) to perform pre-programmed functions and output a 3D geometry, the first augmented apparatus 28 may be configured to control illumination of IR emitters in the form of point light sources 29, and to obtain image(s) from the IR camera(s) 3 directly.

In examples using IR imaging, the illumination conditions $IL_1, \ldots, IL_{NIL}$ may include at least one illumination condition $IL_n$ corresponding to visible light and at least other illumination condition $IL_{k \neq n}$ e corresponding to IR. The visible illumination condition $IL_n$ may be provided by at least one of the colour displays 2 and/or one or more additional light sources 29, 30. The IR illumination condition $IL_{k \neq n}$ may be provided by sets of IR emitters 40 of a depth sensor 38. In such an example, the two or more sets of images $SET_1, \ldots, SET_{NS}$ will include a set of images $SET_{ns}(IL_n)$ corresponding to the visible illumination condition $IL_n$ and a second of images $SET_{k \neq n}(IL_{k \neq n})$ corresponding to the IR illumination condition $IL_{k \neq n}$. The IR illumination condition may $IL_{k \neq n}$ avoid using any IR emitters 40 which output structured light, and is preferably provided only by IR emitters 40 providing unstructured (or "flood") illumination.

Portable Computing Devices

Figure 19:
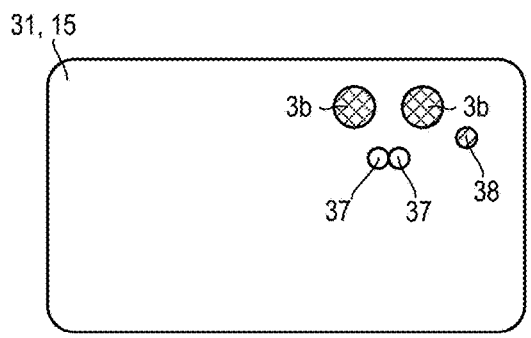
FIG. 19 schematically illustrates a rear surface of a smartphone.

Referring also to FIG. 19 a portable computing device 15 in the form of a smart phone 31 is shown.

Referring also to FIG. 20, a block diagram of a portable computing device is shown.

The apparatus may include one or more portable computing devices 15. Each portable computing device 15 includes one or more digital electronic processors 32, memory 33, and a colour display 2. Each portable computing device 15 also includes at least one camera 3. A camera 3 of a portable computing device 3 may be a front camera 3a oriented in substantially the same direction as the colour display 2, or a rear camera 3b orientated in substantially the opposite direction to the colour display 2. A portable so computing device 15 may include both front 3a and rear 3b cameras 3, or may include only one or the other type. A portable computing device 15 may include two or more front cameras 3a and/or two or more rear cameras 3b For example, recent portable computing devices 15 in the form of smart phone may include a front camera 3a and additionally two or more rear cameras 3b. A front imaging section 34 may include any front cameras 3a forming part of the portable computing device 15, and also one or more point light sources 29 in the form of front flash LEDs 35 used to provide a camera "flash" for taking picture in low-light conditions. A rear imaging section 36 may include any rear cameras 3b forming part of the portable computing device 15, and also one or more point light sources 29 in the form of rear flash LEDs 37. Although described as "sections", the cameras 3a, 3b and associated flash LEDs 35, 37 need not be integrated as a single device/package, and in many cases may simply be co-located on the respective faces of the portable computing device 15.

The portable computing device 15 may also include one or more depth sensors 38, each depth sensor 38 including one or more cameras 3 in the form of IR cameras 39 and one or more point light sources 29 in form of IR sources 40. The portable computing device may be loaded with additional drivers to enable direct and independent control of the one or more sets of IR sources (emitters) 40 and the one or more IR cameras 39 as described hereinbefore.

The portable computing device 15 also includes a rechargeable battery 41, one or more network interfaces 42 and non-volatile memory/storage 43. The network interfaces 42 may be of any type, and may include universal serial bus (USB), wireless network (e.g. IEEE 802.11b or 802.11), Bluetooth® and so forth. At least one network interface 42 is used to provide wired or wireless link 16. An apparatus 12, 28 including one or more portable computing devices 15 may include a separate controller 14, one of the portable computing devices 15 may host the controller 14 functions, or the functionality of coordinating the colour displays 2, cameras 3, and any optional additional light sources 29, 30, and/or depth sensors 38, may be distributed across two or more portable computing devices 15.

The non-volatile storage 43 stores an operating system 44 for the portable computing device 15, and also program code 45 for implementing the specific functions required to form part of an apparatus 12 or first augmented apparatus 28. Optionally, the portable computing device 15 may also store a local image cache 46. For example, when the portable computing device 15 is used to obtain an image $IM_m$ as part of a set of images $SET_{ns}$, the portable computing device 15 may store a local copy as well as transmitting the image across the link 16. When the portable computing device is also used to calculate outputs, for example a reflectance map, a photometric normal map, a 3D geometry and so forth, the local imaging cache may also be used to store entire sets of images $SET_{ns}$ for processing. Sets of images $SET_{ns}$ may include images $IM_m$ captured using the portable device 15, and typically also other images $IM_m$ captured using separate cameras 3 and/or portable computing devices 15.

Sets of images $SET_{ns}$ obtained using a number of portable computing devices 15 may be processed in parallel on multiple portable computing devices to generate different outputs. For example, first to third portable computing devices 15 may each provide a colour display 2 and a camera. One the two or more sets of images $SET_{ns}$ have been obtained, the copies required for inputs may be distributed to all the portable computing devices 15 such that each has a set, the first portable computing devices 15 may calculate the reflectance map(s) in parallel with the second portable computing device 15 calculating the photometric normal map(s). In parallel, the third portable computing device 15 may also calculate a 3D geometry using stereoscopic methods.

The portable computing device 15 also includes a bus 47 interconnecting the other components, and additionally includes other components well known as parts of a portable computing device 15. The portable computing device 15 may include, or take the form of, a tablet computer, a smart phone 31, a laptop, and/or other devices having analogous functionalities.

Any or all of the colour displays 2, cameras 3 and additional point light sources 29 may be provided by a portable computing device 15. Additionally, a single portable computing device 15 may provide multiple elements of the apparatus 12 or first augmented apparatus 28. For example, a portable computing device 15 in the form of a tablet computer may provide a colour display 2 (the main display screen) and also a camera 3 in the form of a front-facing (sometimes "selfie") camera 3a.

Referring in particular to FIG. 19, a rear face of portable computing device 15 in the form of a smart phone 31 is shown.

The smart phone 31 rear face is illustrated is rear in the sense of being opposite to the colour display 2. The smart phone 31 includes a pair of rear cameras 3b (for example one may be wide angle and the other for zoom), a pair of rear flash LEDs 37 (for example having different colours/hues), and a depth sensor 38.

Implementation Using Portable Computing Devices

Figure 21A:
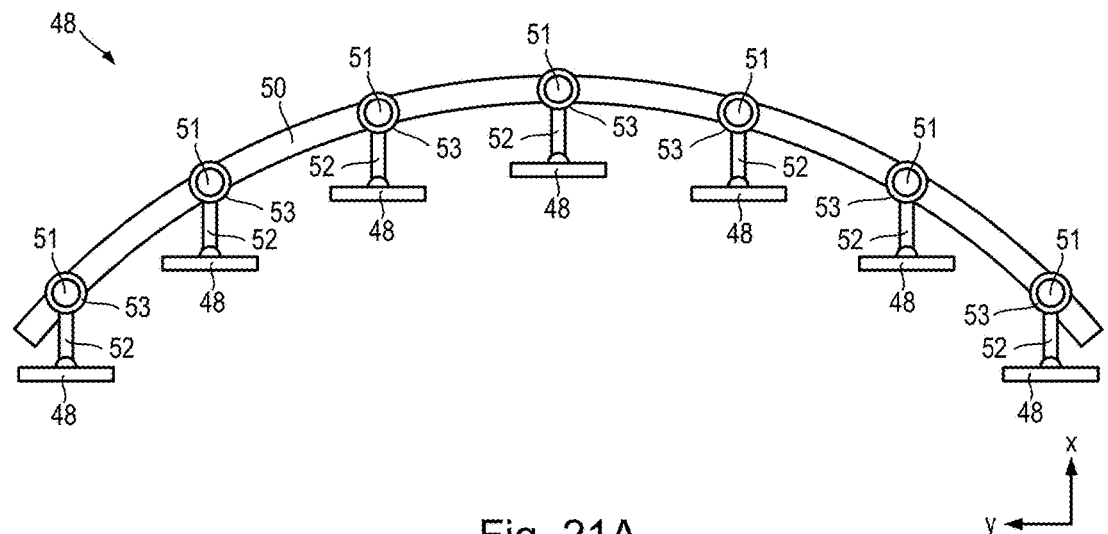
FIG. 21A is a schematic plan view of a frame for mounting a number of the portable computing devices shown in FIG. 20.
Figure 21B:
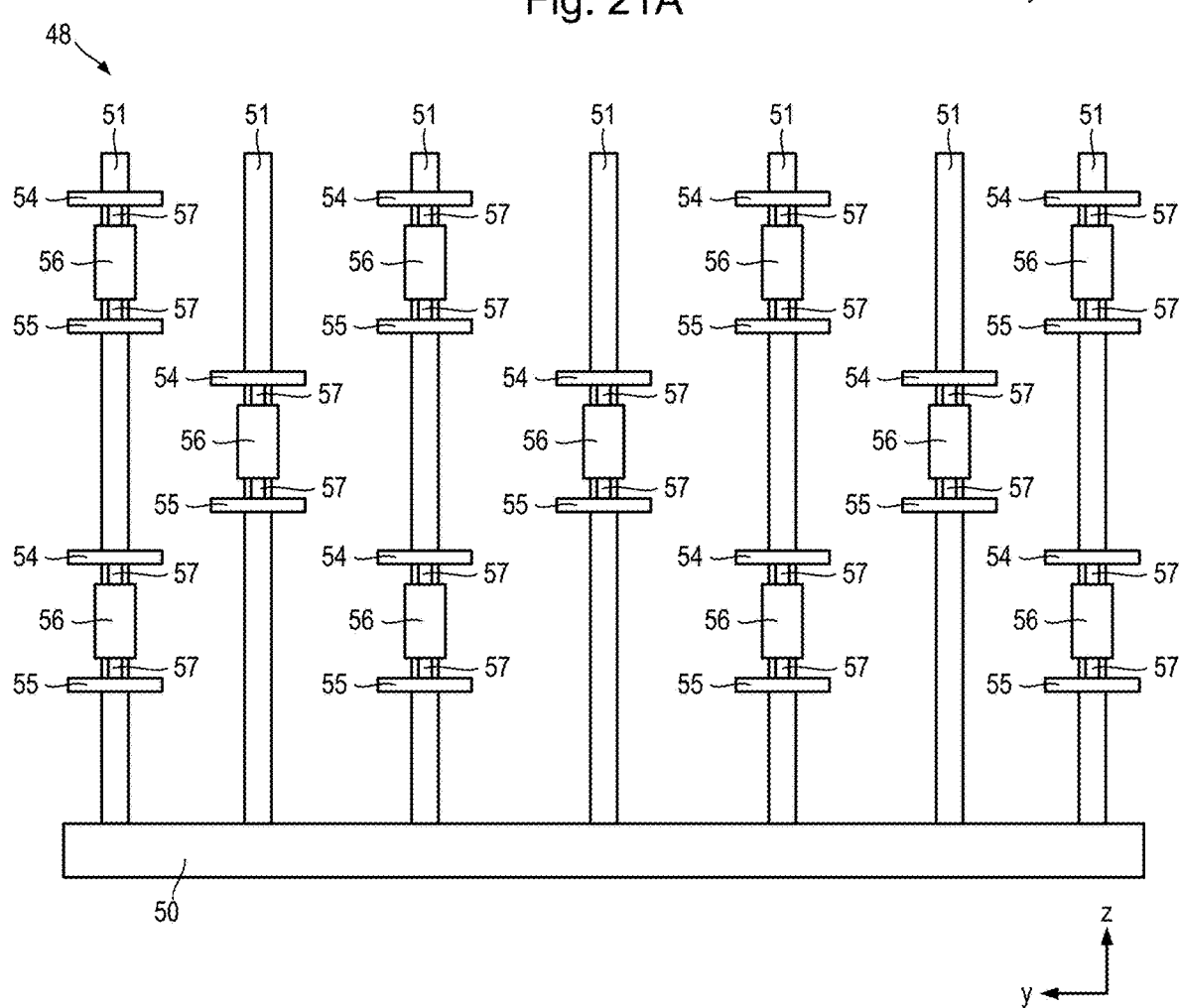
FIG. 21B is a schematic front view of the frame shown in FIG. 21A.

Referring also to FIGS. 21A and 21B, a frame 48 for mounting portable computing device 15 to provide an apparatus 12 and/or a first augmented apparatus 28 is shown.

A number of portable computing devices 15 may be arranged to implement the apparatus or first augmented apparatus 28 (i.e. to provide piece-wise continuous illumination of the volume 13) by detachably securing each portable computing device to a respective stand/frame 11 or mounting bracket 49.

Referring in particular to FIGS. 2C, 3C, and 4C, general purpose stands 11 may be used. For example, in the first apparatus 1, the colour displays 2 are provided by portable computing devices 15 in the form of tablet computers, whilst the cameras 3 are provided by portable computing devices 15 in the form of smart phones, specifically the rear cameras 3b of smart phones. As shown in FIGS. 2C, 3C, and 4C, and in particular FIG. 2C, an apparatus 12 or first augmented apparatus 28 may be provided by arranging portable computing devices 15 using stands to illuminate and/or image the volume 13, in combination with loading each portable computing device 15 with appropriate program code 45 to enable coordination and synchronisation of applying the illumination conditions $IL_n$ and obtaining the corresponding sets of images $SET_{ns}$. It should be noted that mere physical arrangement of the portable computing devices 15 is not enough to implement the apparatus 12 or the first augmented apparatus 28. Wall mounted brackets (not shown) may be used in addition to, or instead of, stands 11.

Alternatively, and referring in particular to FIGS. 21A and 21B, a more accurate and reproducible implementation of the apparatus 12 or first augmented apparatus 28 may be obtained by attaching portable computing devices 15 to a purpose-specific frame 48.

The frame 48 includes an arcuate base 50 from which a number of upright columns 51 are upstanding spaced-apart along the length of the base 50. The base 50 should either be weighted to provide stability in use, or else clamped or otherwise securely attached to a surface to prevent movement or toppling of the frame 48 in use.

One or more mounting brackets 49 are attached to the columns 51 via respective arms 52 and collars 53. The collars 53 are sized to just receive the columns 51, and permit the collar to rotate relative to the columns 51 and/or rotate about the columns 51. Each collar 53 may be secured to a particular height and angle relative to the corresponding column 51 using any suitable means, for example a screw passed through a threaded hole in the collar 53 until it engages the column 51.

Each mounting bracket 48 includes an upper grip section 54, a lower grip section 55 and a back support 56. The upper and lower grip sections 54, 55 are connected to the back support by extension arms 57. The lengths of the extension arms 57 are adjustable to allow mounting portable computing devices 15 have a range of sizes and/or orientations. Each mounting bracket 48 is coupled to the respective arm 52 by a ball joint, gimbal joint or similar joint permitting a similar range of motion. In this way, the angle of each mounting bracket 48, as well as its inclination towards/away from the equatorial plane $\alpha=0$.

Although shown with a particular number of columns 51 and mounting brackets 48, the frame 48 is not limited to the specifically illustrated example, and may include more or fewer columns 51, columns 51 of varying heights, different types of mounting bracket 48, different methods of securing the mounting brackets 48 to the columns 51 and so forth. Other types of frame may perform the same function.

The frame 48, or a similar supporting structure, may be provided as a kit which a user may assemble and then attach portable computing device(s) 15, dedicated colour displays 2, cameras 3 and/or additional lights 29, 30 thereto.

The highly configurable and adjustable nature of the frame 48 contrasts with the need for accurate knowledge of the relative positions and angles of the colour displays 2, camera(s) 3 (for example to implement some of the methods described herein), and where used additional light sources 29, 30 and/or depth sensors 38.

Calibration of an apparatus 12 or first augmented apparatus 28 provided in this way may be performed using one or more test objects (not shown). Test objects (not shown) may be included in a kit providing the frame 48. Once the displays 2 and camera(s) 3 are mounted, for example by mounting a number of portable computing devices 15, a first test object (not shown) is placed in the desired volume 13 and the colour displays 2 and cameras 3 are pointed roughly towards the test object (not shown). One or more sets of images $SET_{ns}$ are then obtained of the test objects, using one or more illumination conditions $IL_n$. Each test object should have a known shape, size and optionally patterning. Based on the images $IM_m$ obtained, the apparatus 12 or first augmented apparatus 28 may treat the viewpoint position and orientation as a variable parameter and iterate until the 3D geometry, reflectance map(s), photometric normal map(s) and so forth match stored pre-calibrated data for the test object.

This process may be particularly beneficial when the colour displays 2 are provided by tablet computers, since these typically include a front camera 3a for video-calling etc. Even if it is not intended to use the front cameras 3a of portable computing devices 15 providing colour displays 2 for imaging objects/subjects 4, the front camera 3a may still be used for calibration relative to a test object. Given that the front camera 3a and display 2 of a portable computing devices 15 typically have a fixed geometric relationship (excluding folding/flexible devices), the relative position of the colour displays 2 may also be calibrated.

In this way, a requirements of careful installation and extensive manual calibration of the camera(s) 3 and colour displays 2 may be avoided, allowing an apparatus 12 or first augmented apparatus 28 to be setup faster and without the need for specific training.

If portable computing devices 15 including internal accelerometers are used, then measurements made using the accelerometers may additionally or alternatively be used for calibration. For example, each portable computing device may be placed against a test object (not shown) placed in the intended volume 13, then moved to the mounting position, tracking the movement using the internal accelerometer. The mounting brackets 48 may be configured to be easy to release from supporting arms 52 to facilitate this. Calibration using accelerometers alone may be less accurate than imaging of test object, however, the two approaches may be combined. For example, using accelerometer data to provide a more accurate initial guess of the variable viewpoint for optical based calibration.

Other approaches to calibration may also be considered, alone or in combination, for example using ranges obtained by two or more portable computing devices 15 exchanging short range radio signals (e.g. Bluetooth®).

Specular Roughness Measurements

A specular roughness map may also be calculated using the first augmented apparatus 28 when it includes a point light source 29.

Figure 22A:
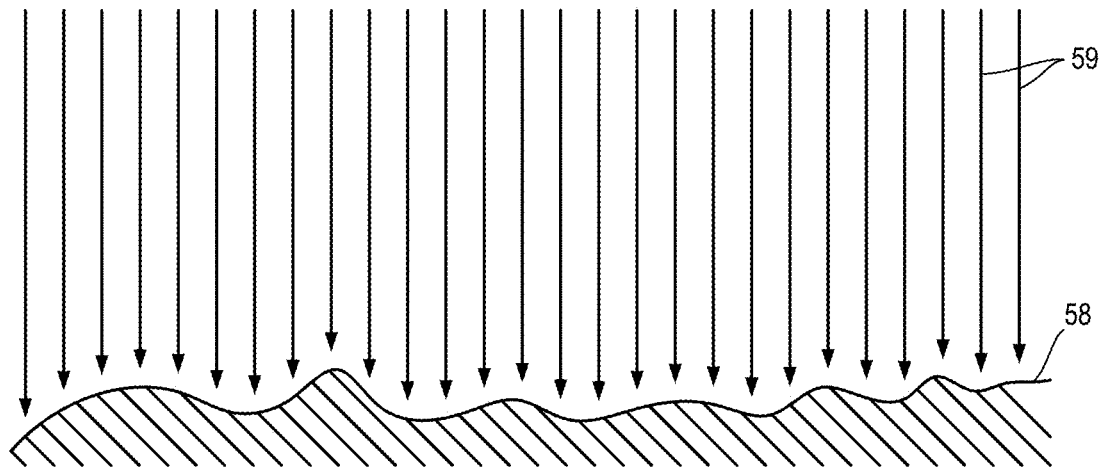
FIGS. 22A and 22B schematically illustrate conditions of locally uniform and diverging illumination respectively.

Referring also to FIG. 22A, illumination of a surface 58 of an object/subject 4 by a colour display 2 or area light source 30 is illustrated.

Viewed from a small area on the surface 58, the colour display 2 or area light source 30 may provide substantially uniform local illumination, i.e. light 59 is not significantly converging or diverging over a small area of the surface 58 of the object/subject 4. This does not affect that the colour display 2 or area light source 30 may be a local or near field light source in relation to the volume 13 and the object/subject 4 overall.

Figure 22B:
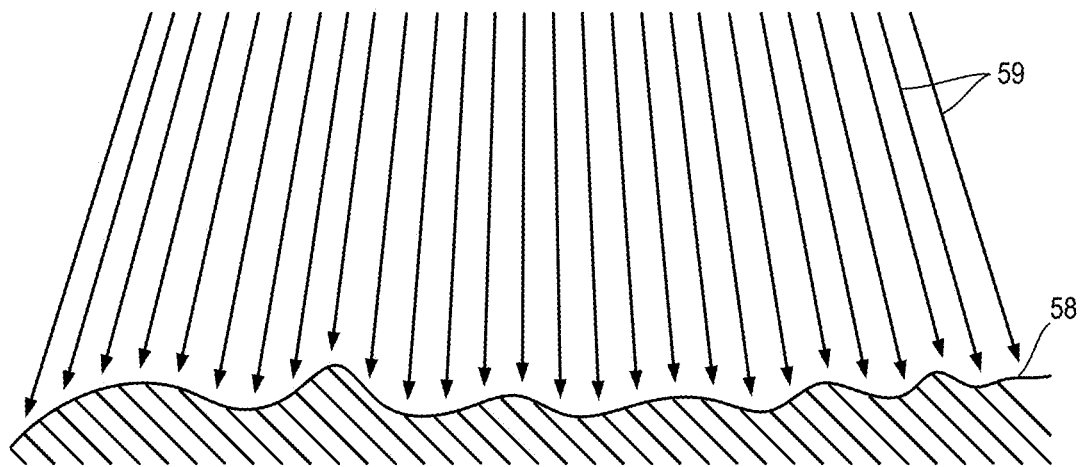

Referring also to FIG. 22B, illumination of a surface 58 of an object/subject 4 by a point light source 29 is illustrated.

In comparison to FIG. 22A, the relatively small solid angle subtended by a point light source 29 leads to illumination with light 59 which, even across a small region of the surface 58, is diverging. This does not affect whether the point light source 29 presents as a nearfield or farfield source in relation to the volume 13 and the object/subject 4 overall.

By obtaining a set of images $SET_{ns}(IL_n)$ under a first illumination condition $IL_n$ corresponding to illumination by one or more colour displays 2 and/or area light sources 30, and comparing against a second set of images $SET_{ks \neq ns}(IL_{k \neq n})$ under another illumination condition $IL_{k \neq n}$ corresponding to illumination by one or more point light sources 29, the specular roughness of the surface 58 of an object/subject 4 may be estimated. This can be done through comparing the two responses (or their ratio) against values in a pre-computed lookup table (LUT). A suitable lookup table (LUT) may be determined using computer simulations. For example, computer simulations using area 2, 30 or point 29 light sources applied to surfaces with different levels of surface roughness.

Form-Factor Corrections

In a conventional light stage, light sources are carefully placed to correspond to positions covering a substantial fraction of a spherical surface, so as to approximate uniform, spherical illumination from distant, directional or farfield light sources.

Whilst this is not possible using the apparatus 12 or first augmented apparatus 28, illumination conditions $IL_n$ corresponding to partial spherical illumination conditions (truncated by the edges of the zone 18) may be reproduced by adjusting the intensity of each pixel of a colour display 2 providing illumination based on the geometry of the apparatus 12 or first augmented apparatus 28. The geometry may be defined in advance using fixed, pre-installed and calibrated systems. Alternatively, as explained hereinbefore the geometry may be calibrated in a number of ways, even for an apparatus 12 or first augmented apparatus 28 that can be portable and quickly assembled disassembled.

Figure 23:
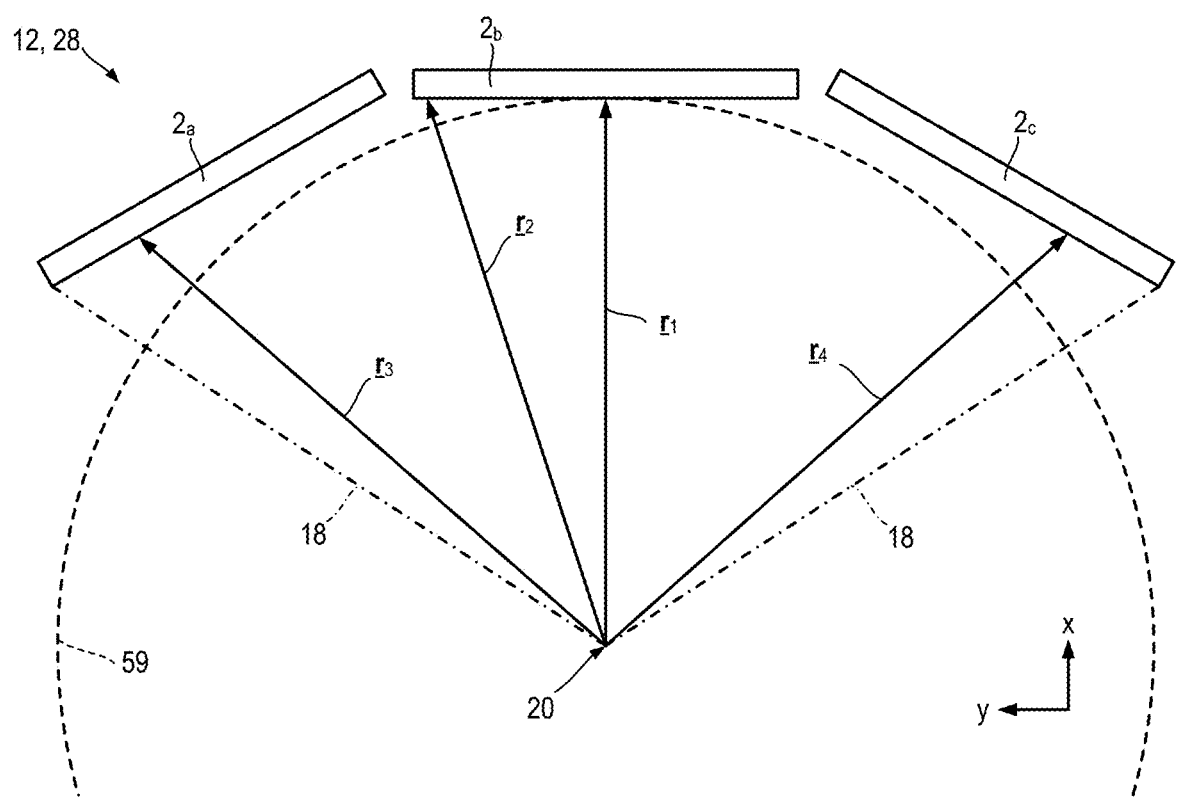
FIG. 23 schematically illustrates modulating intensities of light output by colour displays to approximate a desired angular intensity distribution.

Referring also to FIG. 23, compensation for the apparatus 12, 28 form-factor to approximate a partial spherical illumination condition having an origin 20 within the volume 13 is illustrated.

A partial spherical illumination condition is an illumination condition $IL_n$ in which pixel intensities of the colour displays 2 providing said illumination condition $IL_n$ are controlled so as to simulate emission from the surface 59 of a reference sphere. The intensities of one or more additional light sources 29, 30 may be similarly controlled, but this is not explicitly described as it is analogous to controlling the colour displays 2.

The example shown in FIG. 23 includes first $2_a$, second $2_b$ and third $2_c$ colour displays 2. Other components of the apparatus 12, 28 are not shown for clarity of illustration. The radius of the reference sphere 59 is not important, and so for illustrative purposes in FIG. 23 has been shown as corresponding to a sphere 59 just touching the second colour display 2b along the midline 8. This is represented by a first position vector $r_1$, having a reference radius $r_0$.

A partial spherical illumination condition $IL_n$ defined in latitude-longitude spherical parameterisation $(\alpha, \beta)$ may correspond to an angular intensity distribution $S(\alpha, \beta)$, about the origin 20 within the volume 13 (where $\alpha, \beta$ are limited to within the zone 18 as explained hereinbefore). In some examples the angular intensity distribution $S(\alpha, \beta)$ so may be constant, i.e. a uniform illumination condition. In other examples, the angular intensity distribution may vary with angle, for example to provide an illumination condition $IL_n$ approximating a spherical gradient across the zone 18.

A spherical angular intensity distribution $S(\alpha, \beta)$ may be simulated (or "approximated") using two or more colour displays 2 by adjusting the pixel intensity values to reference values $S_0(\alpha, \beta)$ corresponding to a reference radius $r_0$. For a pixel at coordinate $(r_p, \alpha_p, \beta_p)$ (in which $r_p$ is the distance of the pixel from the origin 20), the intensity may be adjusted by a factor $(r_p)^2/(r_0)^2$. For example, the illumination intensity function for the pixel at coordinate $(r_p, \alpha_p, \beta_p)$ may be expressed as:

$$S(r_p, \alpha_p, \beta_p) = \frac{r_p^2}{r_0^2} S_0(\alpha_p, \beta_p) \qquad (15)$$

Where the form of the relationship is derived from the inverse square law.

Since the reference radius $r_0$ is only needed to normalise relative intensities across the two or more colour displays 2, the reference radius $r_0$ need not correspond to a physical coordinate $(r_p, \alpha_p, \beta_p)$ of any pixel of the colour displays 2. However, for simplicity the reference radius $r_0$ may be taken as corresponding to the coordinate $(r_p, \alpha_p, \beta_p)$ of a reference pixel of one of colour displays 2. For example, the pixel corresponding to the first position vector $r_1$ may be taken as a reference point. The intensity of a pixel elsewhere on the second colour display 2b having the position vector $r_2$ may be set relative to the reference pixel based on the squared ratio of their radial coordinates from the origin 20. A pixel of the first colour display 2a having position vector $r_3$, and/or a pixel of the third colour display 2c having position vector $r_4$.

In practice, with the relative positions and orientations of the colour displays 2 pre-calibrated as described herein, and the dimensions of each being a known, fixed parameter, a normalisation comes down to the apparatus 12, 28 generating a specific image for each colour display 2, and then outputting it. This may permit more flexibility and accuracy in lighting reproduction than would be possible by simply driving each colour display uniformly. This may allow the apparatus 12, 28, which may be portable and easy to assemble/disassemble, to reproduce lighting conditions which previously would require a large and expensive lightstage. Because of their size and complexity, typically objects/subjects 4 need to be brought to the lightstage. By contrast, the apparatus 12, 28 may be brought to a location, then quickly for use.

The apparatus 12, 28 may calculate output images relative to a pre-calibrated origin point. However, should the apparatus 12, 28 determine from a first set of measurements that an object/subject 4 is off-centre from a default origin 20, then the apparatus 12, 28 may calculate a new origin, and generated new output images to repeat the measurements and refine calculated reflectance and photometric normal maps, and so forth. For example, the apparatus 12, 28 may calculate or estimate a geometric centroid of the object/subject 4 (or at least the portion thereof within the volume 13) based on the 3D geometry calculated for the object/subject 4 (or obtained using one or more depth sensors 38). The apparatus 12, 28 may then adjust the origin of the spherical illumination condition used to calculated output images to coincide with the geometric centroid of the object/subject 4.

Similarly, if the angular intensity distribution $S(\alpha, \beta)$ is non-uniform and the apparatus 12, 28 is configured to enable calculating a 3D geometry of the object or subject 4, the apparatus 12, 28 may be configured to calculate and apply corrections to a spherical illumination condition $IL_n$ to account for an actual position and/or orientation of the object or subject 4. For example, the apparatus 12, 28 may calculate or estimate an orientation of the object/subject 4 based on the 3D geometry of the object/subject 4 (whether obtained by stereoscopic calculations or from depth sensors 38). The apparatus 12, 28 may then rotate the angular coordinate system $(\alpha, \beta)$ used to calculate spectral intensity distribution $S(\alpha, \beta)$ of an illumination condition $IL_n$ to a rotated coordinate system $(\alpha', \beta')$ in which the "front" reference direction $\alpha'=0$, $\beta'=0$ coincides with the actual front orientation of the object or subject 4. This may allow immediate repetition of measurements in order to refine calculated reflectance and photometric normal maps, and so forth.

Although described in relation to mapping a geometry of an apparatus 12, 28 to a reference sphere 59, the same method may be simply extending to any desired reference surface such as, for example, a parabolic surface, an ellipsoidal surface, or even an arbitrarily defined surface. All that this required is make the reference radius a function of angle as $r_0(\alpha, \beta)$.

In this way, any and/or all of the illumination conditions $IL_1, \ldots, IL_{NIL}$ employed may be modulated not only by basis functions (as described herein), but may also be intensity modulated across the area of each colour display 2 to account for any particular form factor of the colour displays 2.

Mapping Basis Functions to Illumination Conditions

As described herein, the two or more illumination conditions $IL_1, \ldots, IL_{NIL}$ may include a basis illumination conditions and/or their respective complements, selected from the group consisting of uniform illumination, horizontally and vertically aligned binary patterns, 2D Haar wavelet patterns, phase shifted sinusoidal patterns, hemispherical harmonics, zonal basis functions, steerable radial basis functions, 2D Gaussians, Spherical Gaussians, localised piecewise constant bases, and so forth.

The illumination conditions $IL_1, \ldots, IL_{NIL}$ may belong to a single type of basis illumination condition, or may include a mixture of two or more types of basis illumination condition. Basis functions in the abstract mathematical sense may span negative to positive numbers, however, utilisation of such basis functions to provide basis illumination conditions $IL_1, \ldots, IL_{NIL}$ requires mapping the range $[-1, 1]$ to a range $[0, 1]$ which is suitable to output using illumination intensity. In some examples, intensity values of an illumination condition $IL_n$ may be additionally modulated by pixel coordinates as described hereinbefore, in addition to a basis function. Combinations of two or more basis functions may be spectrally multiplexed for concurrent illumination.

Basis functions in the form of binary patterns may include:

$$B_1 = \begin{cases} 1 & \text{if } \alpha > 0 \\ 0 & \text{otherwise} \end{cases} \qquad (16)$$

$$B_2 = \begin{cases} 1 & \text{if } \beta > 0 \\ 0 & \text{otherwise} \end{cases}$$

$$B_3 = \begin{cases} 1 & \text{if } \alpha > 0 \text{ AND } \beta > 0 \\ 1 & \text{if } \alpha < 0 \text{ AND } \beta < 0 \\ 0 & \text{otherwise} \end{cases}$$

and may also include the respective complements $B_1^*$, $B_2^*$ and $B_3^*$. A value of 1 may correspond to full intensity. Binary patterns may be rotated about the direction $\alpha=\beta=0$.

It may help to understand the apparatus 12, 28 to provide an example of how basis functions may be converted into images for output using the colour displays 2 of an apparatus 12, 28.

Figure 24A:
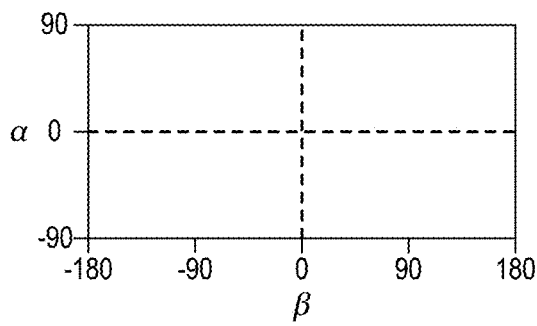
FIGS. 24A to 27B illustrates the first four 2D Haar basis functions and the complements thereof, with reference to a latitude-longitude spherical parameterisation.
Figure 24B:
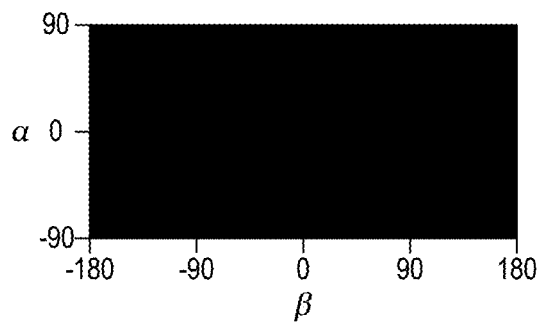

Referring also to FIG. 24A, an angular intensity distribution $S(\alpha, \beta)$ is shown for uniform illumination (corresponding to the Haar wavelet pattern $\emptyset^0$). This has a complement shown in FIG. 24B, however the complement of uniform illumination is darkness and is not particularly useful.

Figure 25A:
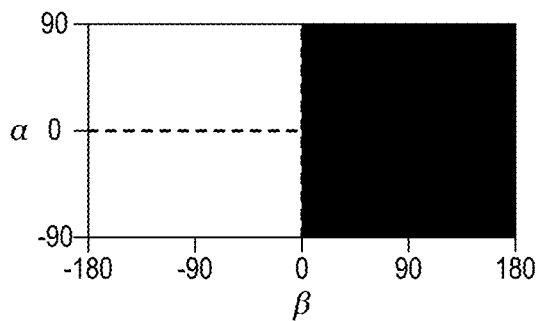
Figure 25B:
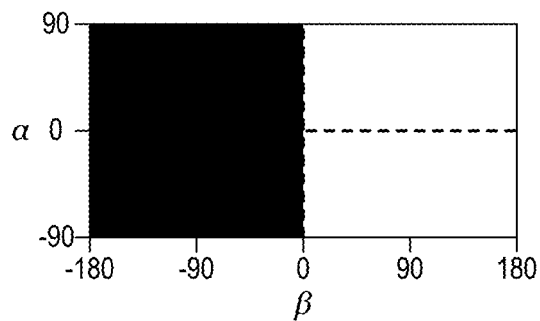

Referring also to FIG. 25A, an angular intensity distribution $S(\alpha, \beta)$ is shown for binary X, or $B_1$, illumination (corresponding to the Haar wavelet pattern $\Psi_1^0$). This has a complement shown in FIG. 25B. White indicates a value of one (unity) and black indicates a value of zero.

Figure 26A:
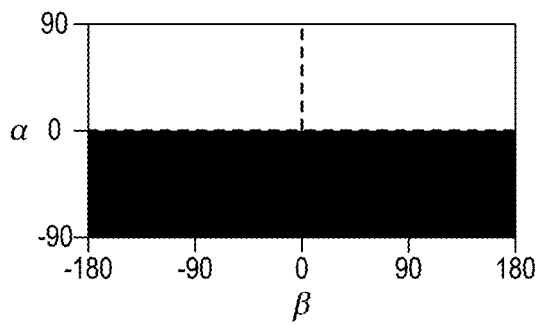
Figure 26B:
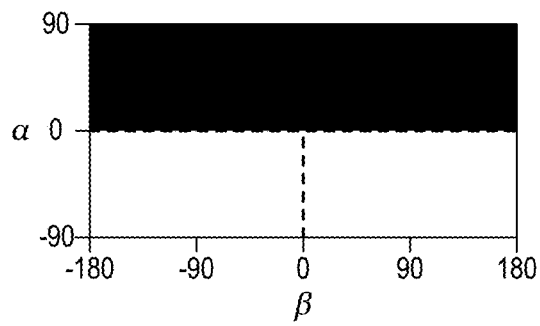

Referring also to FIG. 26A, an angular intensity distribution $S(\alpha, \beta)$ is shown for binary Y, or $B_2$, illumination (corresponding to the Haar wavelet pattern $\Psi_2^0$). This has a complement shown in FIG. 26B. White indicates a value of one (unity) and black indicates a value of zero.

Figure 27A:
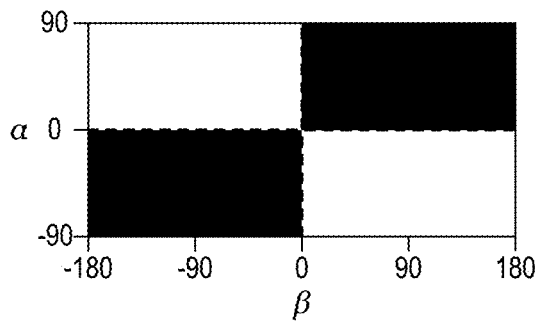
Figure 27B:
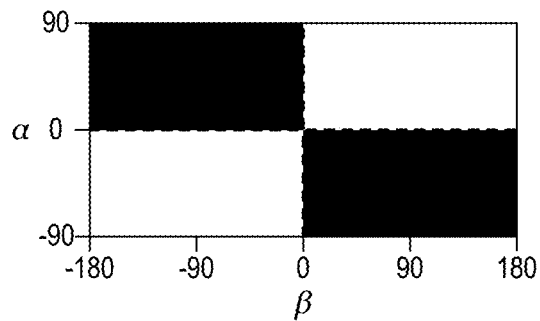

Referring also to FIG. 27A, an angular intensity distribution $S(\alpha, \beta)$ is shown corresponding to the Haar wavelet pattern $\Psi_3^0$. This has a complement shown in FIG. 27B. White indicates a value of one (unity) and black indicates a value of zero.

Figure 28A:
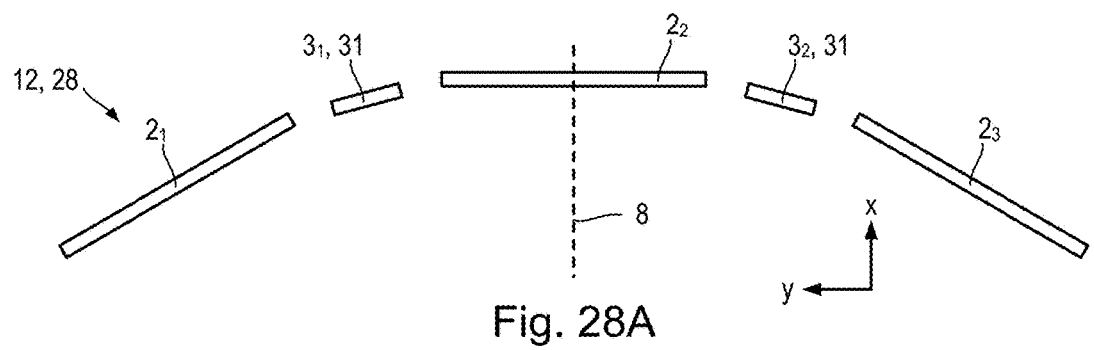
FIGS. 28A and 28B schematically illustrate converting the basis pattern shown in FIG. 27A for output from an arrangement of three colour displays.
Figure 28B:
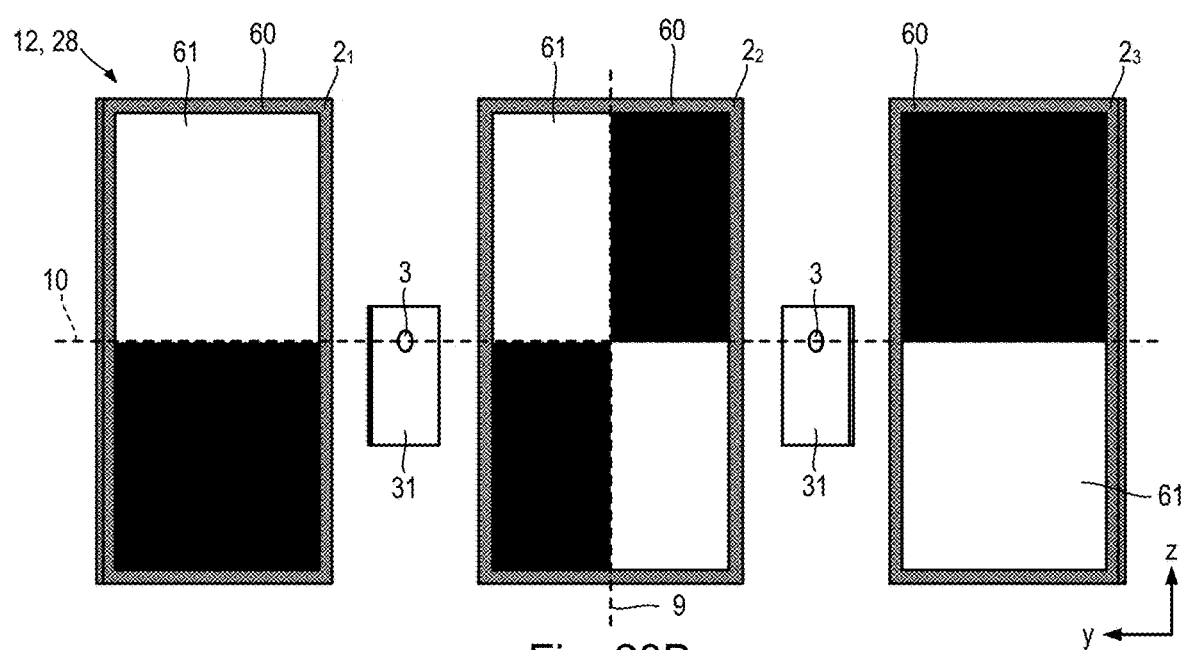

Referring also to FIGS. 28A and 28B, conversion of the Haar wavelet pattern $\Psi_3^0$ for output using colour displays 2 of an apparatus 12, 28 is illustrated.

FIG. 28A is a plan view of an apparatus 12, 28 including first, second and third colour displays $2_1$, $2_2$, $2_3$ and first and second cameras $3_1$, $3_2$. FIG. 28B is a side view along the mid-line 8 (parallel to the x-axis as illustrated)

Each camera $3_1$, $3_2$ is provided by the rear camera $3_b$ of a smartphone 31, and the cameras $3_1$, $3_2$ are arranged on the equatorial plane 10. Each display $2_1$, $2_2$, $2_3$ is provided by a standard desktop display/TV, and is arranged in a portrait orientation and centred on the equatorial plane 10. Each display $2_1$, $2_2$, $2_3$ has a frame 60 and an active area 61 corresponding to the pixels.

In order to output the Haar wavelet pattern $\Psi_3^0$, the coordinates of the pixels $(r_p, \alpha_p, P_p)$ need to be mapped to the angular intensity distribution $S(\alpha, \beta)$. Preferably, though not essentially, the radial coordinate $r_p$ may also be used for intensity modulation as described hereinbefore. The apparatus 12, 28 (for example the controller 14 or a portable computing device 15) either generates or retrieves, then outputs, an output image specific to each colour display 2. In the example illustrated in FIG. 28B, an upper half of the first colour display $2_1$ is lit whilst the lower half is dark, and the third colour display $2_3$ outputs a mirror image about the equatorial plane 10. The upper-left and lower-right quadrants of the second colour display 22 are illuminated, whilst the upper-right and lower-left quadrants are left dark (uni-lluminated).

As described hereinbefore, the orientation of an angular intensity distribution $S(\alpha, \beta)$ of an illumination condition $IL_n$ may be shifted away from a mid-line 8 of the system, which requires generating modified output images for the colour displays 2.

Figure 29:
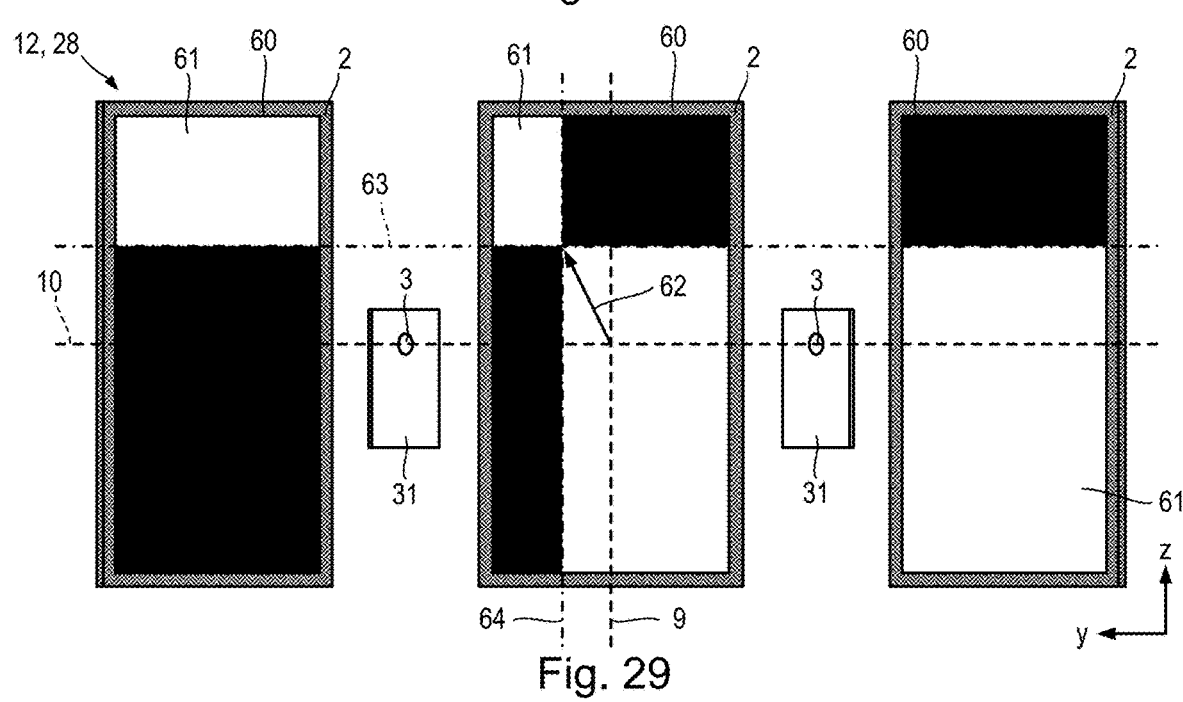
FIG. 29 schematically illustrates rotating the basis pattern output shown in FIG. 28B to a new angle.

Referring also to FIG. 29, the same apparatus 12, 28 is shown for output of the same Haar wavelet pattern $\Psi_3^0$ as in FIG. 28B. However, the centre of the Haar wavelet pattern $\Psi_3^0$ is offset by an offset 62 from the centre of the second colour display 2, away from the mid-line 8. In effect, the angular intensity distribution $S(\alpha, \beta)$ is shifted from a latitude-longitude parameterisation $(\alpha, \beta)$ defined relative to the apparatus 12, 28, to a rotated coordinate system $(\alpha', \beta')$. The output image for each colour display $2_1$, $2_2$, $2_3$ is generated by projecting the rotated angular intensity distribution $S(\alpha', \beta')$ onto the active area 61 of that colour display $2_1$, $2_2$, $2_3$. The output images may also be modulated by the relative position and/or form-factor of the corresponding display 21, 22, 23 as described hereinbefore. Although illustrated as straight lines for simplicity of illustration, the curves 63, 64 corresponding respectively to planes having $\alpha'=0$ and $\beta'=0$ may in practice be curved when projected onto the display areas 61 or the colour displays $2_1$, $2_2$, $2_3$.

Method of Displaying Results

Figure 30:
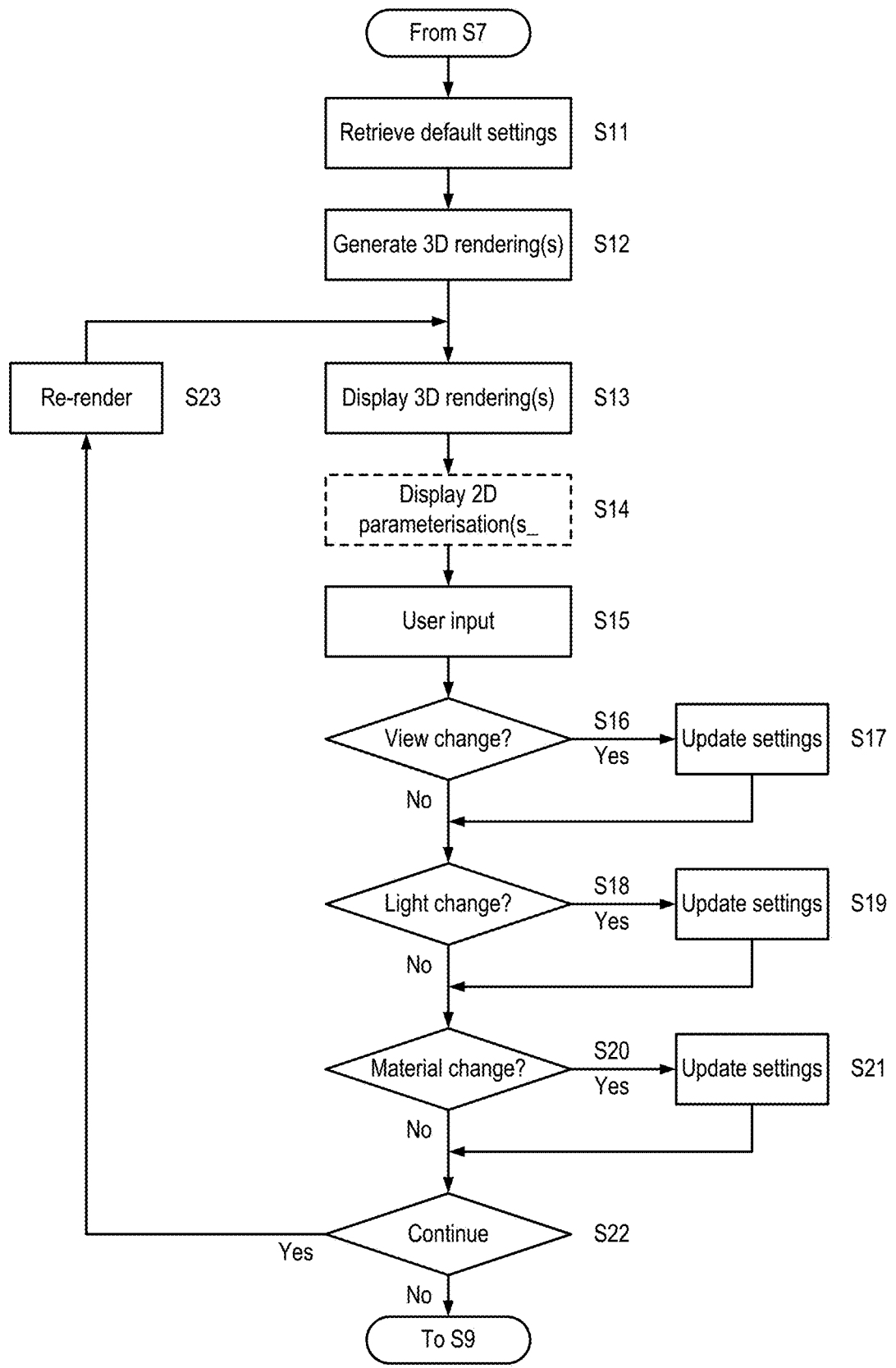
FIG. 30 is a process-flow diagram of a method of presenting a 3D rendering to a user using an apparatus as shown in FIG. 13 and/or FIG. 18.

Referring also to FIG. 30, an exemplary method of using the apparatus 12, 28 to present outputs to a user is shown.

The method of FIG. 30 represents one option for implementation the display of outputs (step S8) shown in FIG. 16 and described hereinbefore. The particular method of FIG. 30 is applicable to an implementation of the apparatus 12, 28 and the method of FIG. 16 in an example in which the 3D geometry of the object/subject is calculated.

Following calculations (whether internal, local and/or remote) to obtained the outputs in the form of at least a reflectance map, a photometric normal map and a 3D geometry (step S7), a set of initial or default settings for a rendering are retrieved (step S11). The default settings may include an initial viewpoint vector, initial lighting conditions and so forth. The default setting may be stored by the apparatus 12, 28, for example in the controller 14, in a connected data processing device (not shown) and/or in one or more portable computing devices 15 used to provide colour displays 2, cameras 3 and so forth.

A 3D rendering of the object/subject 4 is generated, using the calculated reflectance map(s), photometric-normal map(s), the 3D geometry and the retrieved initial (or default) settings (step S12). The generation of the 3D rendering may be conducted internally, for example using the controller 14, or using one or more portable computing devices 15 used to provide colour displays 2, cameras 3 and so forth. Alternatively, the 3D rendering may be generated using an external (local or remote) data processing device (not shown), and sent to the apparatus 12, 28 for display. In some examples, multiple 3D renderings may be generated instead of just one, for example from different viewpoints.

The apparatus 12, 28 controls one or more colour displays 2 to display the 3D rendering(s) (step S13). For example, each of two or more colour displays 2 may show a 3D rendering generated from a different viewpoint. Optionally, one or more of the colour displays 2 may be used to display a 2D parameterisation of the calculated reflectance map(s) and/or photometric normal map(s) corresponding to the (or each) 3D rendering (step S14).

The apparatus 12, 28 may also be configured to receive user inputs (step S15). For example, when the apparatus is implemented using portable computing devices 15, the colour displays 2 of such devices are typically touch-screen panels, and hence may be used to receive user input. Depending on the user inputs received, the apparatus 12, 28 may re-generate, or cause to be re-generated by a connected data processing device (not shown), the 3D rendering(s).

For example, if the user input (step S15) includes a command to rotate, translate, zoom etc. the viewpoint displayed on one or more of the colour displays 2, (step S16|Yes) then the rendering settings are updated based on the user's inputs (step S17).

Additionally or alternatively, if the user input (step S15) includes a command to change the lighting used for the rendering (step S18|Yes), for example to change a type (uniform/above/below etc.), colour, location and so forth of rendering light sources, then the rendering settings are updated based on the user's inputs (step S19).

Additionally or alternatively, if the user input (step S15) includes a command to change the material of the rendering (step S20|Yes), then the rendering settings are updated based on the user's inputs (step S21). The 3D renderings will be generated initially using the reflectance map(s) and photometric-normal map(s) calculated for the object/subject 4. However, the user may wish to preview how the object/subject would appear if it was to be modified. For example, a user may apply different reflectance map(s) and/or photometric-normal map(s) to all or parts of the 3D rendering(s), for example, in product development a prototype having the correct shape may be produced and measured, and the user may then apply textures based on imported and/or previously measured materials to visualise how a finished product will look using a variety of different materials and/or surface treatments.

However, the calculated reflectance map(s) and photometric-normal map(s) need not be replaced, and may instead be modified. For example, a rendering model may be pre-calibrated based on the effects of applying a make-up product, suncream etc. to a user's skin. The model may include reflections from the layer of make-up as well as reflections from the user's underlying skin. In this way, a user may be scanned/measured using the apparatus 12, 28, then presented with a 3D rendering of their face, which they may re-render to visualise a difference in appearance which may result from application or one or more make-up products. The reflectance map(s) and photometric-normal map(s) calculated for a user's skin may be matched against a database to identify one or more products which may be compatible with and/or complement their skin tone. Separation of calculated reflectance map(s) and photometric-normal map(s) into diffuse and specular components, for example using polarisers 17 as described hereinbefore, may also be useful in identifying the natural level of "shininess" exhibited by a subjects 4 skin. Modifications in the rendering may so also include simulating biophysical changes in skin colour texture and mesostructure (high-frequency of surface normals) after applying a skin application for a period of time. For example, modifications in the rendering may include visualisation of simulated de-aging of skin, removal of skin blemishes, tanning after usage of a skin product, and so forth.

Whilst the user viewing and feedback process continues (step S22|Yes), the 3D rendering(s) are re-generated (step S23) and the process of display and user input is repeated (steps S13 through S21).

Alternatively, the user input (step S15) may include a user command to start again by re-capturing (step S9) the sets of images $SET_{ns}$ and re-calculating the reflectance map(s), photometric-normal map(s), 3D geometry, and any other outputs which are being calculated for a particular implementation.

Synchronisation of Image Capturing and Illumination Conditions

The apparatus 12, 28 coordinates output of illumination conditions $IL_n$ and capture of sets of images $SET_{ns}$ by ensuring that the one of more illumination conditions $IL_n$ corresponding to a particular set of images $SET_{ns}$ are applied whilst the images $IM_m$ making of the set $SET_{ns}$ are obtained.

The apparatus 12, 28 may also be used to apply the two or more illumination conditions $IL_n$ in a quick burst or repeating sequence, and to synchronise image $IM_m$ capture of the corresponds sets of images $SET_{ns}$. This may be useful particularly for human or animal subject 4, as an amount of movement of the subject 4 between sets of images $SET_{ns}$ may be minimised. Additionally, such synchronisation many be used for obtaining video data, which may permit capturing reflectance maps and photometric-normal maps, and optionally 3D geometry and forth for a moving and/or changing object/subject 4.

Figure 31A:
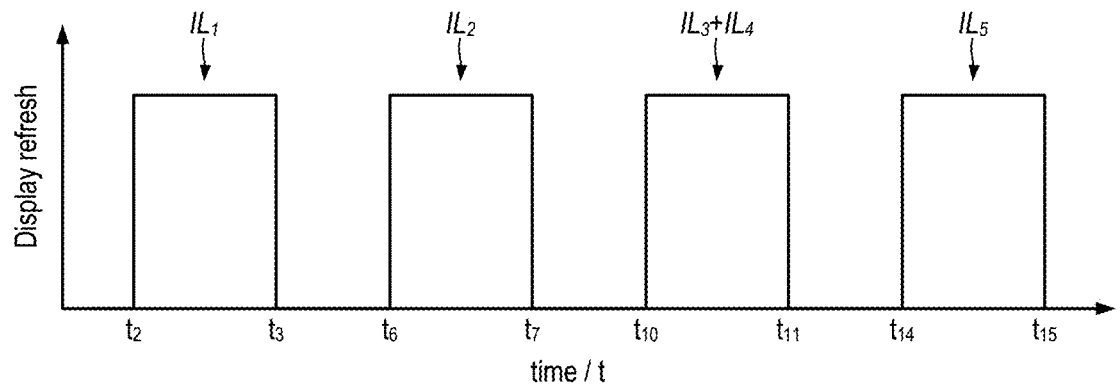
FIGS. 31A, 31B and 32 schematically illustrate timings for synchronising colour displays and cameras to obtain rapid bursts of images and/or video data.

Referring also to FIG. 31A, the apparatus may apply the two or more illumination conditions $IL_n$ in a repeating sequence.

The refresh periods of each of the two or more colour displays 2 should be synchronised to one another. The refresh periods of a pair (or group) of colour displays 2 may be regarded as synchronised if they are refreshing at the same rate, and if each starts and ends refreshing at substantially the same times. In this way, the illumination conditions $IL_n$ may be interleaved/repeated at the refresh rate of the colour displays 2.

For example, during a first refresh period $[t_2, t_3]$ the colour displays 2 may output a first illumination condition $IL_1$. During a second refresh period $[t_6, t_7]$, the colour displays 2 may output a second illumination condition $IL_2$. During a third refresh period $[t_{10}, t_{11}]$ the colour displays 2 may output a spectral multiplexing of third $IL_3$ and fourth $IL_4$ illumination conditions. During a fourth refresh period $[t_{14}, t_{15}]$ the colour displays 2 may output a fifth illumination condition $IL_5$. The sequence of illumination conditions $IL_1, \ldots, IL_5$ may then be repeated any number of times.

Figure 31B:
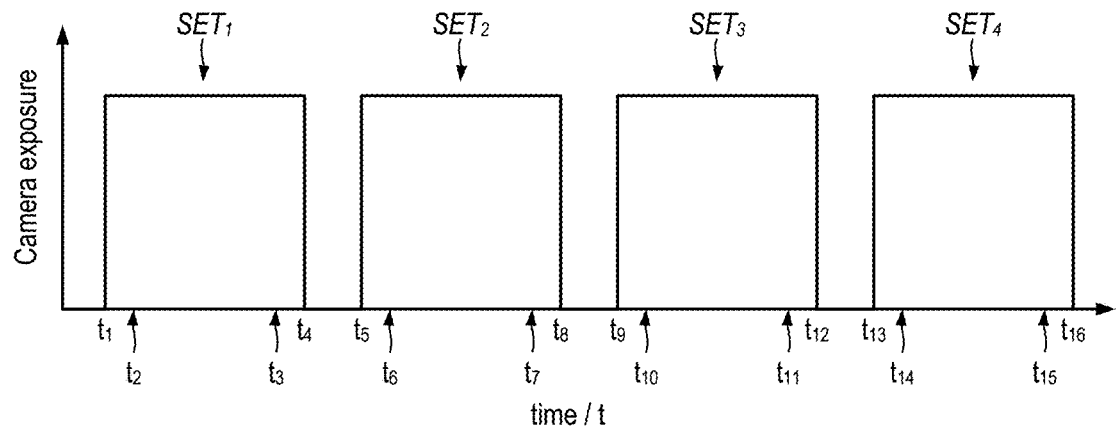

Referring also to FIG. 31B, the apparatus 12, 28 may synchronise cameras 3 in order to obtain the sets of images $SET_{ns}$ in the form of a burst of images or as video data. The exposure periods of a pair (or group) of cameras 3 may be regarded as synchronised if they start and end an exposure (for a CCD camera) or scan (for a CMOS camera) at the substantially the same time.

The exposure periods of the one or more cameras 3 need to be synchronised with one another and with the refresh periods of the two or more colour displays 2. For example, a first set of images $SET_1(IL_1)$ may be obtained during a first exposure period $[t_1, t_4]$ which encompasses the first refresh period $[t_2, t_3]$ and does not overlap with any other refresh periods. A second set of images $SET_2(IL_2)$ is obtained during a second exposure period $[t_5, t_8]$ which encompasses the second refresh period $[t_6, t_7]$ and does not overlap with any other refresh periods. A third set of images $SET_3(IL_3, IL_4)$ is obtained during a third exposure period $[t_9, t_{12}]$ which encompasses the third refresh period $[t_{10}, t_{11}]$ and does not overlap with any other refresh periods. A fourth set of images $SET_4(IL_5)$ is obtained during a fourth exposure period $[t_{13}, t_{16}]$ which encompasses the fourth refresh period $[t_{14}, t_{15}]$ and does not overlap with any other refresh periods.

In this way, by extracting the interleaved and repeating sets of images $SET_1, \ldots, SET_5$, repeated measurements may be obtained. In addition to reducing movement of an object/subject between sets of images $SET_1, \ldots, SET_5$, this high speed capture process may be used to refine calculated measurements by averaging over a number of measurements, or even to acquire reflectance maps, photometric-normal maps, 3D geometry and so forth for a dynamic subject 4. For example, an actor delivering dialogue. Calculation of outputs for video data may be done off-line at a later time, or may be conducted online during ongoing video capture, depending on the computational resources available within/connected to the apparatus 12, 28

Figure 32:
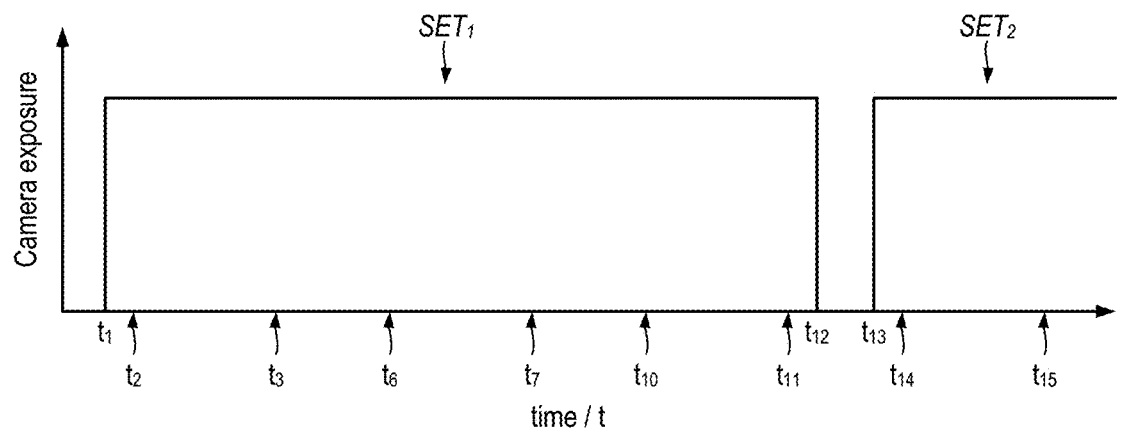

Referring also to FIG. 32, the illumination conditions $IL_n$ do not need to be cycled at the rate of one per display refresh period.

Instead, each group of one or more illumination conditions $IL_n$ may persist across several refresh periods to allow for a longer exposure period for images $IM_m$ of the corresponding set of images $SET_{ns}(IL_n)$. For example, a first illumination condition $IL_1$ may be sustained across the first three refresh periods $[t_2, t_3]$, $[t_6, t_7]$ and $[t_{10}, t_{11}]$, whilst the images $IM_m$ for a first set of images $SET_1(IL_1)$ are exposed for a first exposure period [$t_1$, $t_{12}$] spanning all three. The apparatus 12, 28 may then switch to the second illumination condition $IL_2$ for the next three refresh periods starting with the fourth [$t_{14}$, $t_{15}$], and so forth.

The exposure period of a camera 3 obtaining a frame of video data may be regarded as synchronised with the refresh period of a colour display 2 if the exposure period is an integer multiple (one or more) of the refresh period, and if the exposure period starts at substantially the same time as a refresh period. Substantially the same time may mean within a period corresponding to the frame rate of the video data, for example, within 4 ms.

Any additional light sources 29, 30 used in providing the illumination conditions, whether area light sources 30 or point light sources 29, may be synchronised with the cameras 3 in the same way as the colour displays 2. Any sets of IR emitters 40 may be synchronised with the cameras 3, 39 in the same way as the colour displays 2.

Telepresence System

Figure 33:
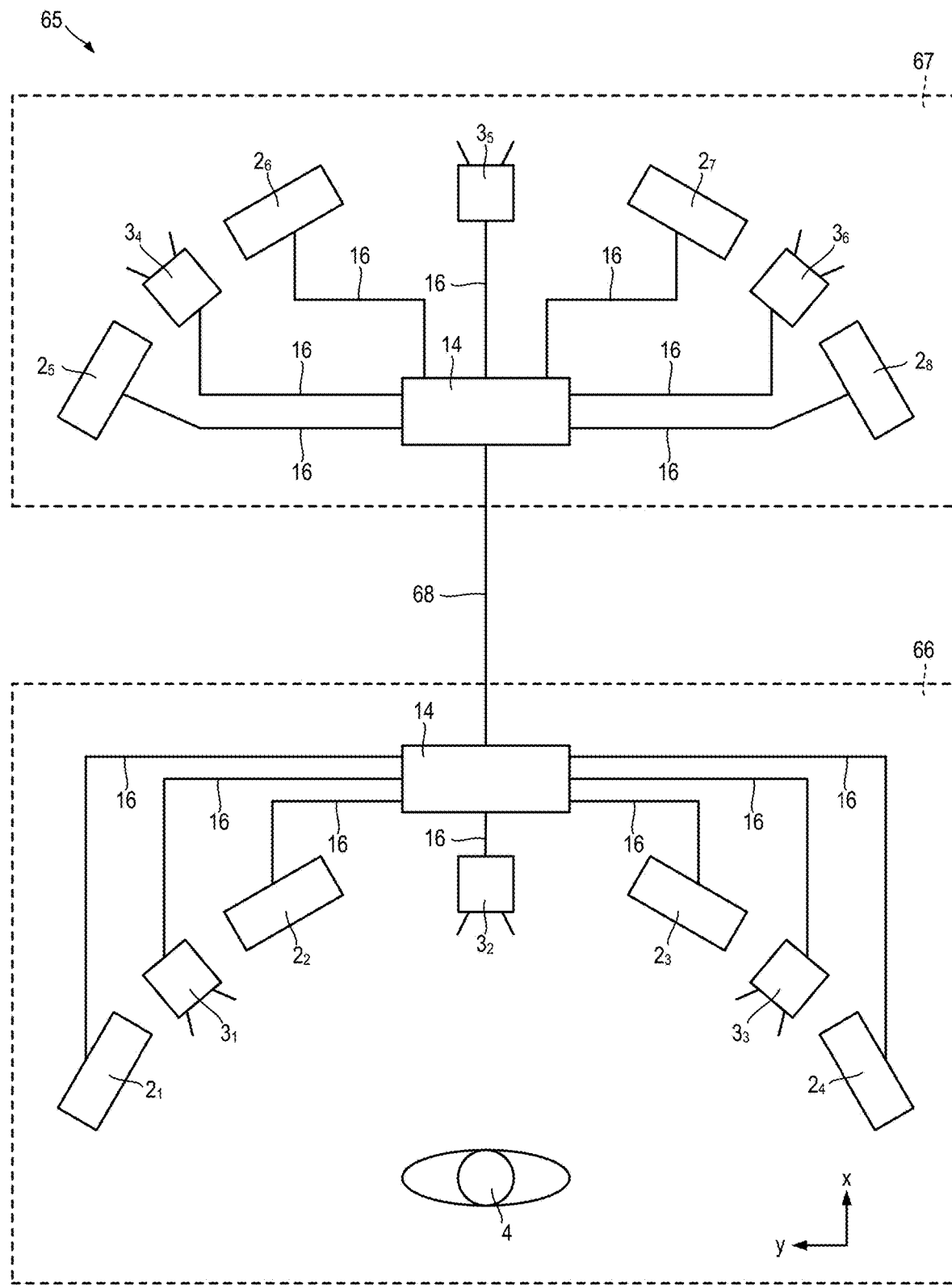
FIG. 33 schematically illustrates a telepresence system.

Referring also to FIG. 33, a telepresence system 65 is shown.

The telepresence system 65 includes a first arrangement 66 which is an apparatus 12, 28 as described hereinbefore, or a system incorporating said apparatus 12, 28 and other components such as an external data processing device (not shown). The first arrangement 66 shown in FIG. 33 includes first to fourth $2_1$, ..., $2_4$ colour displays 2 and first to third $3_1$, ..., $3_3$ cameras 3. Other implementations of the first arrangement 66 may include any features and/or perform any functions described in relation to the apparatus 12 or first augmented apparatus 28.

The telepresence system 65 also includes a second arrangement 67 communicatively coupled to the first arrangement 66 by a link 68, and including one or more colour displays 2 and one or more cameras 3. In the example shown in FIG. 33, the second arrangement 67 includes fifth to eighth $2_5$, ..., $2_8$ colour displays 2 and fourth to sixth $3_4$, ..., $3_6$ cameras 3. The link 68 may be a wires or wireless link, or may be a combination of wired and wireless connections spanning one or more networks (including the internet). The second arrangement 67 will typically be located remotely form the first arrangement 66.

The second arrangement 67 may take the form of an apparatus 12 or first augmented apparatus 28, configured to be substantially the same as the apparatus 12, 28, except that the two or more colour displays 2 and the one or more cameras 3 may be reversed to point away from a volume. Such a "reversed" apparatus may include features and/or functions corresponding to any features/functions of the apparatus 12 or first augmented apparatus 28. The example of the second arrangement 67 shown in The colour displays $2_5$, ..., $2_8$ of the second arrangement 67 may be configured to display an object or subject 4 imaged using the first arrangement 66. Additionally or alternatively, the colour displays $2_1$, ..., $2_4$ of the first arrangement 66 may also display an object or subject 4 imaged using the second arrangement 67, or an environment/setting imaged by the second arrangement 67.

In some examples the telepresence system 65 may be configured such that at least one display $2_5$, ..., $2_8$ of the second arrangement 67 displays video data obtained using a corresponding camera $3_1$, ..., $3_3$ of the first arrangement, and vice-versa. This configuration may be optimised when the physical positions and orientations of cameras 3 and colour displays 2 correspond. For example, the telepresence system 65 in FIG. 33 has a second arrangement 67 which is identical to the first arrangement 66 except that the colour displays $2_5$, ..., $2_8$ and cameras $3_1$, ..., $3_3$ face outwards instead of inwards. This arrangement makes mapping a colour display $2_5$, ..., $2_8$ of the second arrangement 67 to a camera $3_1$, ..., $3_3$ of the first arrangement 66 difficult. In an alternative telepresence system 65, the fifth to eighth colour displays $2_5$, ..., $2_8$ may be replaced with cameras 3 centred at the same locations and having the same orientations, whilst the fourth to sixth cameras $3_1$, ..., $3_3$ are replaced with colour displays 2 centred at the same locations and having the same orientations. The alternative telepresence system 65 has a second arrangement 67 including outward facing colour displays 2, each of which corresponds to an inward facing camera $3_1$, ..., $3_3$ of the first arrangement 66. Similarly, each inward facing colour display $2_1$, ..., $2_4$ of the first arrangement 66 will correspond to an outward facing camera 3 of the second arrangement 67.

Alternatively, the second arrangement 67 may display, using at least one colour display 2, a 3D rendering based on a calculated reflectance map and a photometric normal map determined based on two or more sets of images $SET_{ns}$ obtained using the first arrangement 66. When the second arrangement 67 includes two or more colour displays 2, for example the fifth to eighth colour displays $2_5$, ..., $2_8$ shown in FIG. 33, each colour display $2_5$, ..., $2_8$ may be used to present the 3D rendering from a different viewpoint angle. For example, each of the fifth to eighth colour displays $2_5$, ..., $2_8$ may display the 3D rendering of the object/subject 4 from a different viewpoint, so as to give the appearance that each colour display $2_5$, ..., $2_8$ is a "window" into the same volume which contains the object/subject 4. In other words, the fifth to eighth colour displays $2_5$, ..., $2_8$ may display the 3D rendering of the object/subject 4 from different viewpoints relative to a virtual location of object subject located just behind the colour displays $2_5$, ..., $2_8$ of the second arrangement 67. The first arrangement 66 may be configured to display a 3D rendering obtained from the second arrangement 67 in an analogous way.

The first arrangement 66 may include one or more depth sensors 38, and the first and/or second arrangement 66, 67 may be configured to rotate a 3D rendering and/or apply perspective shift effects to frames of video data, prior to output by one or more colour displays $2_5$, ..., $2_8$ of the second arrangement 67. Additionally or alternatively, the second arrangement 67 may include one or more depth sensors 38, and the first and/or second arrangement 66, 67 may be configured to rotate a 3D rendering and/or apply perspective shift effects to frames of video data, prior to output by one or more colour displays $2_1$, ..., $2_4$ of the first arrangement 66.

The second arrangement 67 may be configured to use the one or more cameras 34, 36 and/or one or more light sensors (not shown) included in the second arrangement to obtain a sampling of environment illumination conditions at the location of the second arrangement 67. The second arrangement 67 use the sampling of environment so illumination conditions to re-light the object or subject 4 imaged using the first arrangement 66 to make the object/subject appear to be lit with the same illumination present at the location of the second arrangement 67. For example, based on reflectance map(s) and photometric-normal map(s) (and optionally a 3D geometry) of the object/subject 4. Environment illumination conditions may be directionally varying and/or time varying. Re-lighting the object or subject 4 may include processing frames of video data obtained from the first arrangement 66 and/or changing light conditions applied to a 3D rendering obtained from the first arrangement 67. The first and second arrangements 66, 67 may additionally or alternatively be configured such that the first arrangement 66 may be used to re-light an object or subject imaged using the second arrangement 67 in the same way described hereinbefore.

Another option for lighting, which may be less computationally intensive, is to use the first arrangement 66 to approximate illumination conditions measured at the second arrangement 67. As already described, the second arrangement 67 may use the one or more cameras 3 and/or one or more light sensors (not shown) included in in the second arrangement 67 to obtain a sampling of environment illumination conditions at a location of the second arrangement 67. The first arrangement 66 may then use its respective two or more colour displays 2 (and any additional light sources 29, 30) to illuminate an object or subject 4 being imaged using an illumination condition $IL_n$ derived based on the sampling of environment illumination conditions at the location of the second arrangement 67. In other words, an illumination condition $IL_n$ may be output which approximates the sampling of environment illumination conditions, such that an object or subject 4 imaged using the first arrangement 66 is illuminated as though it/they were at the location of the second arrangement 67. In this way, computational re-lighting of the outputs at the second arrangement 67 may be avoided, which may reduce processing requirements for the telepresence system 65.

Additionally or alternatively, the second arrangement 67 may use the same approach to illuminate an object or subject based on a sampling of environment illumination conditions at the location of the first arrangement 66.

Modifications

It will be appreciated that various modifications may be made to the embodiments hereinbefore described. Such modifications may involve equivalent and other features and/or methods which are already known in the design, manufacture and use of lighting, image/video processing techniques and/or apparatuses for lighting and/or executing image/video processing techniques, and/or component parts thereof, and which may be used instead of or in addition to features already described herein. Features of one embodiment may be replaced or supplemented by features of another embodiment.

Diffuse-Specular Separation Using Linear System

A method for diffuse-specular separation based on chromaticity-luminance decomposition and measurements with binary patterns has been described (see FIG. 11A). This approach may be useful because it is does not require images acquired using polarisers (although it may also be used with images obtained using polarisers).

Another approach to diffuse-specular separation which does not require comparison of polarised and unpolarised images uses a linear system solution. The responses (sets of images $SET_{ns}$) to X and Y aligned binary patterns and their complements acquired using the apparatus 12, 28 can also be employed for diffuse-specular separation of the reflectance (albedo). The linear system solution employed differs from that of Kampouris2018 because the canonical coordinate system is rotated as follows. For the Y aligned binary pattern and its complement Y', assuming the Y is the brighter measurement and Y' is the darker measurement (for a given pixel), those patterns should be rotated about the x axis because Y and Y' are rotated from the canonical ±Y axis due to truncation of the zone of the hemisphere near the poles. For example, if the Y aligned binary pattern extends across a first range of angles from $\alpha=0$ to $\alpha=\alpha_{max}$, then a centroid of the Y aligned binary pattern will lie at a first angle of $\alpha_1=\alpha_{max}/2$. A rotated Y binary pattern Yr aligned with the canonical +y axis may be obtained as the result of a rotation by an angle $(\pi/2-\alpha_1)°$ rotation using Y and Y'. Similarly, if the complement pattern Y' extends across a second range of angles from $\alpha=\alpha_{min}$ to $\alpha=0$, then a centroid of the complement pattern Y' will lie at a second angle of $\alpha_2=\alpha_{min}/2$. A rotated Y' complement pattern Yr' aligned with the canonical −y axis may be obtained as the result of a rotation by an angle $-(\pi/2-\alpha_2)°$ rotation using Y and Y'. After this rotation, the linear system solution can be employed as:

$$\begin{pmatrix} Yr \\ Yr' \end{pmatrix} = \begin{pmatrix} 1 & Nd(y) \\ 0 & 1-Nd(y) \end{pmatrix} \begin{pmatrix} S \\ D \end{pmatrix} \quad (17)$$

In which S is the unknown specular component and D is the unknown diffuse component, Nd is the diffuse normal and Nd(y) returns the y components of the diffuse normal that is shifted to [0, 1]. In other words, Nd(y) returns the direction cosine corresponding to the component of the photometric normal parallel to the y axis, shifted from the range [−1, 1] to the range [0, 1]. Equation (17) is solved for each pixel of images $IM_m$ corresponding to the same camera 3 and sets of images $SET_{ns}$ corresponding to the Y pattern and its complement Y' respectively.

Similarly, before the above linear system can be employed for the X binary pattern and its complement X' acquired (i.e. as sets of images $SET_{ns}$) using the apparatus 12, 28. Those patterns X, X' should be rotated about the y axis since X and X' are orthogonal patterns that are rotated from the canonical x-z axes of the coordinate system. For example, if the X aligned binary pattern extends across a third range of angles from $\beta=0$ to $\beta=\beta_{max}$, then a centroid of the X aligned binary pattern will lie at a third angle of $\beta_3=\beta_{max}/2$. A rotated X binary pattern Xr aligned with the canonical +x axis may be obtained as the result of a rotation by an angle $(\pi/2-\beta_3)°$ rotation using X and X'. Similarly, if the complement pattern X' extends across a fourth range of angles from $\beta=\beta_{min}$ to $\beta=0$, then a centroid of the complement pattern X' will lie at a fourth angle of $\beta_4=\beta_{min}/2$. A rotated X' complement pattern Xr' aligned with the canonical −x axis may be obtained as the result of a rotation by an angle $-(\pi/2-\beta_4)°$ rotation using X and X'. Then, the linear system solution can be employed as:

$$\begin{pmatrix} Xr \\ Xr' \end{pmatrix} = \begin{pmatrix} 1 & Nd(x) \\ 0 & 1-Nd(x) \end{pmatrix} \begin{pmatrix} S \\ D \end{pmatrix} \quad (18)$$

In which Nd(x) returns the x components of the diffuse normal that is shifted to [0, 1].

In other words, Nd(x) returns the direction cosine corresponding to the component of the photometric normal parallel to the x axis, shifted from the range [−1, 1] to the range [0, 1]. Equation (18) is solved for each pixel of images $IM_m$ corresponding to the same camera 3 and sets of images $SET_{ns}$ corresponding to the X pattern and its complement X' respectively.

The two linear system of Equations (17) and (18) can be solved separately, or together as a larger overdetermined system (e.g. up to 4 equations and 2 unknown) for regularization. The linear system (Equations (17) and/or (18)) operates pixelwise on a single channel of data, for example a single colour channel. The linear system (Equations (17) and/or (18)) can be employed for diffuse-specular separation under spectrally multiplexed binary patterns as well as under binary patterns using white so illumination. For the latter case, the linear system can be separately solved for each colour channel of an RGB camera. The individual estimates of specular component S obtained from each colour channel solution can be averaged to obtain a more robust estimate of S (and hence indirectly also diffuse component D). The linear system can also be used to solve for S and D by combining X and Y measurements as, for example:

$$\begin{pmatrix} Xr \\ Yr' \end{pmatrix} = \begin{pmatrix} 1 & Nd(x) \\ 0 & 1 - Nd(y) \end{pmatrix} \begin{pmatrix} S \\ D \end{pmatrix} \quad (19)$$

In which it is assumed that Xr is the brighter of the X and X' measurements (for a given pixel) while Yr' is the darker of the Y and Y' measurements (post rotations, for a given pixel). Equation (19) is solved for each pixel of images $IM_m$ corresponding to the same camera 3 and sets of images $SET_{ns}$ corresponding to the X pattern and the Y complement Y' respectively.

In general, for a given pixel, a linear system similar to Equations (17) to (19) may be formulated and solved for any pairing of light (i.e. direct illuminated) and dark (i.e. only indirect lighting) measurements may be used, including Xr and Xr', Yr and Y, Xr and Yr', X and Y, Y and Xr', and so forth. Additionally or alternatively, a further relit image Zr may be calculated corresponding to a rotation of the binary pattern X and its complement X' to align with the +z axis. The linear system may be formulated and solved using the relit image Zr as one of the measurements (equations) for a pairing of light and dark measurements.

The combination of one or more distinct pairings of X, X', Y, Y' and Z measurements into one linear system may make sense for some camera 3 viewpoints towards the zone 18 edges where only one of the illumination conditions $IL_n$ providing X and X', for example X, is bright enough to provide a good quality measurement, whilst the complement measurement X' is too dark and hence noisy. In this example, it might be considered to use the darker measurement from among Y and Y' in the linear system as in Equation (19) to try and obtain a higher quality estimate of S and D for such a camera 3 viewpoint.

Although a number of specific basis functions have been described for use in generating and outputting illumination conditions $IL_n$, any suitable basis functions may be used. Basis functions may take the form of continuous or stepped mathematically functions, but equally a localised piece-wise constant basis may be used, for example lines or bands aligned with latitude and/or longitude.

Localised Piece-Wise Constant Basis

A localised piece-wise constant basis corresponds to an illumination condition $IL_n$ in which only a small section of a colour display 2 of the two or more colour displays 2 is switched-on at a time. For example, a checkerboard pattern in which each square region is illuminated one at a time (or several at a time using spectral multiplexing).

A simple example of a localised piece-wise constant basis is a small polygonal (e.g., triangular, square, rectangular, hexagonal) patch on the colour display(s) 2 being switched on at a time. Sets of images $SET_{ns}$ obtained using such an illumination condition $IL_n$ may approximate a response of the object/subject 4 to localised point-source illumination. This approach has a drawback because the amount of illumination provided by the colour displays 2 from a small polygonal patch is limited, and corresponding images $IM_m$ may require relative longer exposure times. This may reduce signal-to-noise ratio, and for a living subject 4 the likelihood and amount of movement will be increased, leading to blurred images $IM_m$.

A preferred localised piece-wise constant basis takes the form of individual horizontal and vertical lines or bands of illumination. The lines or bands of illumination may include a first set of lines or bands corresponding to planes of latitude α and a second set of lines or bands aligned with planes of longitude β can be employed. When projected onto two or more colour displays 2 which are flat and not necessarily concentric with the volume 13, the lines or bands may appears curved. Alternatively, the lines or bands of illumination used as a basis may be aligned to local Cartesian coordinates (e.g. x-y planes and x-z planes). Regardless of the planes used, coordination and calibration across the two or more colour displays 2 is necessary to ensure that a line or band is continuous across all of the colour displays 2 which it intersects.

Using a line or band provides a larger amount of output light, which permits improved signal-to-noise, shorter exposure times and a reduced number of measurements when compared to a localised piece-wise constant basis in the form of a small polygon (e.g. a chessboard square). Horizontal and vertical binary patterns may be reconstructed in post-processing by summing images $IM_m$ across sets of images $SET_{ns}$ for illumination so conditions $IL_n$ corresponding to adjacent lines or bands (having the same orientation).

The localised piece-wise constant basis in the form of sets of lines or bands may also be employed to approximate the response of the object/subject 4 to individual localised point-sources at specific latitude-longitude coordinates. This may be done using an outer product of the responses to the line or band of latitude and the line or band of longitude with an intersection corresponding to the intended coordinate. This point-source approximation using an outer product of a pair lines or bands lines may have better signal to noise ratio when compared to direct measurements under localised point light sources approximated using the displays 2 (because of the increased illumination). The outer product approach also requires reduced measurements. For example, four horizontal lines or bands of latitudes and four vertical lines of longitudes will require 4+4=8 measurements (i.e. sets of images $SET_{ns}$). However, their outer product (computed with software post-processing) will generate 4×4=16 approximate localised point-source responses while requiring only 8 measurements. In the general case, the number of measurements for a localised piece-wise constant basis in the form of sets of lines or bands scales linearly with the number of lines or bands used, whereas the number of measurements scales with the square.

In this way, a localised piece-wise constant basis in the form of sets of lines or bands may be indirectly employed to record a reflectance field of an object/subject 4 (also referred to as an OLAT or "one light at a time dataset" dataset) for various applications such as image based relighting or reflectance and photometric normal estimation for model based rendering.

Colour displays 2 have been described, and these are not limited to conventional displays which emit essentially 2D light. For example, at least one of the two or more displays 2 may take the form of a light-field (holographic) display (not shown). Additionally or alternatively, at least one of the one or more cameras 3 may take the form of a light-field camera. In some examples, all of the colour displays 2 may take the form of light-field displays.

Backlighting for Silhouettes/Masking

A backlit system not shown may include the apparatus 12, 28 and a backlighting arrangement (not shown) configured to continuously illuminate the volume 13 from a direction substantially opposite to the zone 18. The backlighting arrangement (not shown) is not a part of the apparatus 12, 28, and direct illumination from the apparatus 12, 28 remains restricted to the zone 18. The backlit system (not shown) controls the backlighting arrangement (not shown) to illuminate the volume 13 whilst the apparatus 12, 18 provides no illumination, and to obtain a reference image corresponding to each camera 3 of the apparatus 12, 28. The reference images may be used to calculate one or more of silhouettes (also referred to as a "matte maps") and/or translucency maps of an object or subject 4 positioned in the volume 4. This information can be used to assist is segmenting the sets of images $SET_{ns}$ which are subsequently obtained into pixels corresponding to the object/subject 4 (dark in the reference images) and pixels corresponding to background (bright in the reference images.)

It should be noted that the backlighting arrangement (not shown) cannot simply approximate continuous illumination. For example, a typical light-stage arrangement with closely spaced lights such as LED's is not suitable for backlighting. Examples of a backlighting arrangement include a diffusively reflective screen illuminated by a light source, a display large enough to extend beyond the volume 13 from the perspective of at least one (and preferably all) camera(s) of the apparatus 12, 28, or a large area OLED. In other words, if the backlighting arrangement is provided by more than two light sources, then these should be so closely spaced as to be irresolvable by any of the cameras 3 of the apparatus.

Albedo Measurements

The apparatus 12, 28 has been described as applying a minimum of two illumination conditions, to obtain a minimum of two sets of images SET1, SET2, in order to permit calculation of reflectance map(s) and photometric-normal map(s). However, the apparatus 12, 28 may be used in an alternative, albedo measurement mode.

The apparatus 12, 28 for albedo measurement is the same, only the method differs. The apparatus 12, 28 (e.g. the controller 14 or a portable computing device 15 providing one or more displays 2 and/or cameras 3) is configured to control the two or more colour displays 2 and the one or more cameras 3 to illuminate the volume 13 using a first illumination condition $IL_1$. In the first illumination condition $IL_1$, pixel intensities of each the two or more colour displays 2 are controlled to approximate a uniform spherical illumination from the angles (zone 18) covered by the two or more colour displays 2. The modulation of pixel intensities to accomplish this has been described hereinbefore. Whilst the first illumination condition $IL_1$ is applied, the apparatus 12, 28 uses the cameras 3 to obtain a first set of images $SET_1(IL_1)$. The first set of images $SET_1(IL_1)$ includes sufficient information for calculation of an albedo map of an object or subject 4 positioned within the volume 13.

An apparatus 12, 28 used for albedo measurement may also include any features and/or functions described hereinbefore. For example, the same apparatus 12, 28 may be used for any combination of one of more of albedo measurements, measurements or reflectance map(s) and photometric-normal map(s), measurements of 3D geometry, separation of other parameters in diffuse and specular components, measurements of specular roughness, and any other measurements described herein. For example, after using the first illumination condition $IL_1$ to obtain a first set of images $SET_1$ for calculating an albedo map, the apparatus 12, 28 may then apply any number of further illumination conditions $IL_2, \ldots, IL_{NIL}$ to obtain the sets of images $SET_2, \ldots, SET_{NS}$ needed for calculating other outputs.

Apparatus for Specular Roughness Mapping

Figure 34:
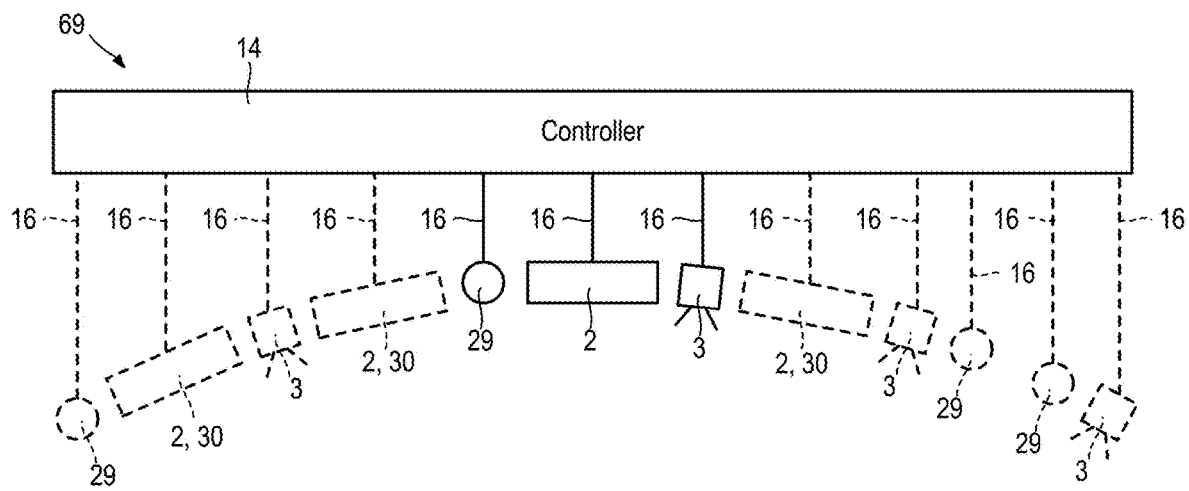
FIG. 34 schematically illustrates an apparatus for measuring specular roughness.

Referring also to FIG. 34, an apparatus 69 for measuring specular roughness is shown.

The apparatus 69 for measuring specular roughness is the same as the apparatus 12 or first augmented apparatus 28, except that instead of including a two or more colour displays 2, the apparatus 69 for measuring specular roughness includes one or more colour displays 2 and one or more point light sources 29. In other words, the minimum elements of the apparatus 69 for measuring specular roughness are a colour display 2, a point light source 29 and a camera 3. Of course, the apparatus 69 for measuring specular roughness may also include any number of additional colour displays 2, additional light sources 29, 30, cameras 3, and so forth, as described hereinbefore for the apparatus 12 and first augmented apparatus 28.

The apparatus 69 for measuring specular roughness is configured (e.g. the controller 14 or one or more portable computing devices 15 providing one or more of the colour displays 2, cameras 3 and so forth) to control the one or more colour displays 2, the one or more point light sources 29, and the one or more cameras 3 to illuminate the volume 13 with a first illumination condition $IL_1$ in which none of the one or more point light sources 29 are illuminated, and to obtain a first set of one or more images $SET_1(IL_1)$. The apparatus 69 for measuring specular roughness is also configured to control the one or more colour displays 2, the one or more point light sources 29, and the one or more cameras 3 to illuminate the volume 13 with a second illumination condition $IL_2$ in which only the point light source(s) 29 are illuminated, and to obtain a second set of one or more images $SET_2(IL_2)$. The first and second sets of images $SET_1(IL_1)$, $SET_2(IL_2)$ include sufficient information for calculation of a specular roughness map of an object or subject 4 positioned within the volume 13, as described hereinbefore.

An apparatus 69 for measuring specular roughness may also include any features and/or functions described hereinbefore in relation to the apparatus 12 and/or the first augmented apparatus 28. For example, the apparatus 69 for measuring specular roughness may be used for any combination of one of more of measurements of specular roughness, albedo measurements, measurements or reflectance map(s) and photometric-normal map(s), measurements of 3D geometry, separation of other parameters in diffuse and specular components, and any other measurements described herein. For example, after using the first and second illumination conditions $IL_1$ $IL_2$ to obtain the sets of images $SET_1$, $SET_2$ for calculating a specular roughness map, the apparatus 69 for measuring specular roughness may then apply any number of further illumination conditions $IL_3, \ldots, IL_{NIL}$ to obtain the sets of images $SET_3, \ldots, SET_{NS}$ needed for calculating other outputs.

A telepresence system 65 may include the apparatus 69 for measuring specular roughness in an analogous way to the telepresence system 65 including the apparatus 12 and/or the first augmented apparatus 28.

Mixed Visible and IR Measurements

Figure 35:
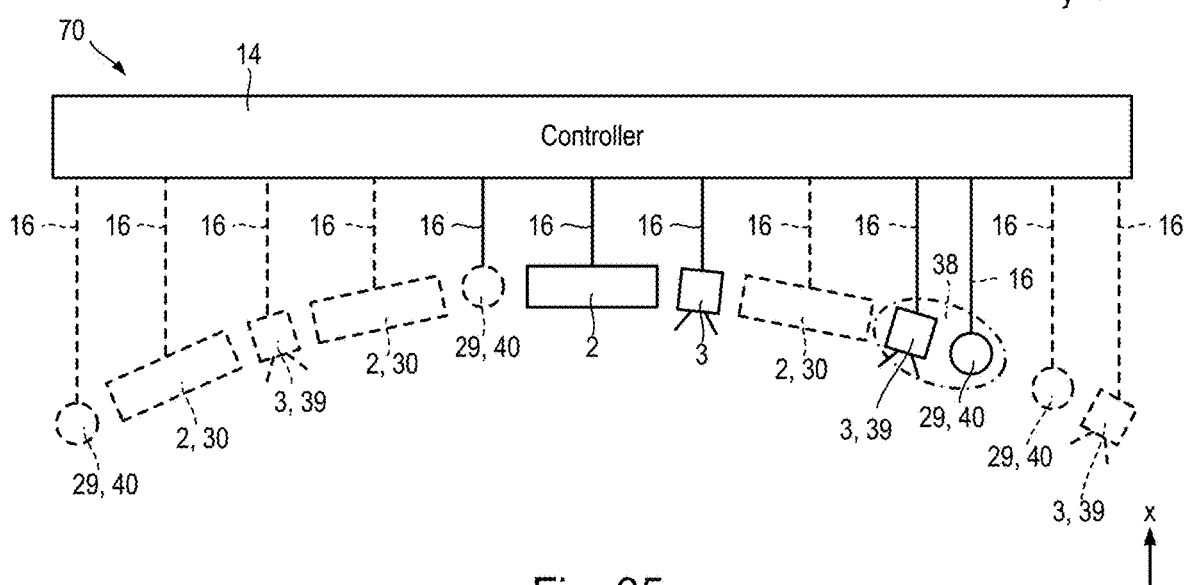
FIG. 35 schematically illustrates apparatus for mixed visible/IR measurements.

Referring also to FIG. 35, an apparatus 70 for mixed visible/IR measurements is shown.

The apparatus 70 for mixed visible/IR measurements is the same as the apparatus 12 and/or the first augmented apparatus 28, except that instead of including two or more colour displays 2 and one or more cameras 3, the apparatus 70 for mixed visible/IR measurements includes, one or more colour displays 2, one or more visible light (e.g. RGB) cameras 3 and one or more depth sensors 38. Each depth sensor 38 includes at least one point light source 29 in the form of IR sources 40, and at least one IR camera 3, 39. Of course, the apparatus 69 for measuring specular roughness may also include any number of additional colour displays 2, additional light sources 29, 30 for visible or non-visible light, cameras 3 (IR or otherwise), depth sensors 38, and so forth, as described hereinbefore for the apparatus 12 and first augmented apparatus 28. Preferably, the IR source 40, the IR camera 39 may be provided by an integrated depth sensor 38.

The apparatus 70 for mixed visible/IR measurements is configured to control the one or more colour displays 2, the one or more cameras 3 and the one or more depth sensors 38 to illuminate the volume 13 using a first illumination condition $IL_1$ provided by the one or more colour displays 2 (and optionally additional light sources 29, 30 emitting visible light), and to obtain a first set of one or more images $SET_1(IL_1)$ using the one or more visible light cameras 3. For example, coordination may be provided by the controller 14 if present, or by one or more portable computing devices 15 providing one or more of the display(s) 2, camera(s) 3 and so forth.

The apparatus 70 for mixed visible/IR measurements then applies a second illumination condition $IL_2$ corresponding to flood illumination by IR source(s) 40 of the one or more depth sensors 38, and to obtain a second set of one or more images $SET_2(IL_2)$ using the IR camera(s) 39 of the one or more depth sensors 38. The apparatus 70 for mixed visible/IR measurements is further configured to calculate a mapping between the first set of images $SET_1(IL_1)$ and the second set of images $SET_2(IL_2)$. The mapping is needed to relate the different viewpoints of the camera(s) 3 used for the first set of images $SET_1(IL_1)$ and the IR camera(s) 3, 39 used for the second set of images $SET_2(IL_2)$.

An apparatus 70 for mixed visible/IR measurements may also include any features and/or functions described hereinbefore in relation to the apparatus 12 and/or the first augmented apparatus 28. For example, the apparatus 70 for mixed visible/IR measurements may be used for any combination of one of more of measurements or reflectance map(s) and photometric-normal map(s), measurements of specular roughness, albedo measurements, measurements of 3D geometry, separation of other parameters in diffuse and specular components, and any other measurements described herein. For example, after using the first and second illumination conditions $IL_1$ $IL_2$ to obtain the sets of images $SET_1$, $SET_2$ using visible and IR illumination so conditions $IL_1$, $IL_2$, the apparatus 70 for mixed visible/IR measurements may then apply any number of further illumination conditions $IL_3$, ..., $IL_{NIL}$ to obtain the sets of images $SET_3$, ..., $SET_{NS}$ needed for calculating other outputs.

A telepresence system 65 may include the apparatus 70 for mixed visible/IR measurements in an analogous way to the telepresence system 65 including the apparatus 12 and/or the first augmented apparatus 28.

Figure 36:
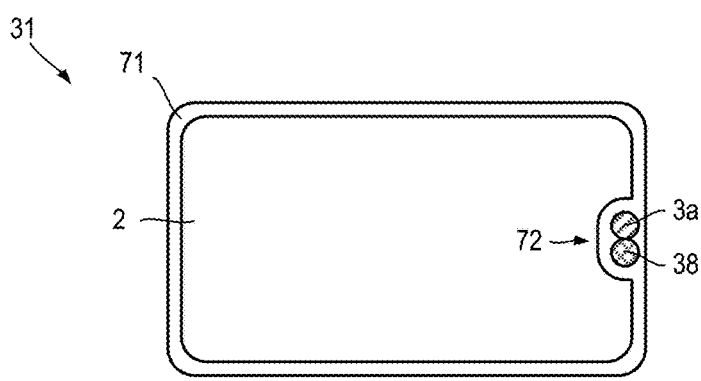
FIG. 36 illustrates providing the apparatus for mixed visible/IR measurements shown in FIG. 35 using a portable computing device.

Referring also to FIG. 36, in one example the apparatus 70 for mixed visible/IR measurements may be provided by a smartphone 31 which includes a forward facing depth sensor 38.

The front face of the smartphone 31 includes the colour display 2, surrounded often (but not always) by a border or bezel 71. At a position around the periphery, a bulge 72 in the bezel 71 provides space for a front facing camera 3a and a depth sensor 38 which includes an IR camera 39 and one or more IR sources 40.

The apparatus 70 for mixed visible/IR measurements may equally be implemented using any other type of portable computing device 15 which includes a colour display 2, a front camera 3a, and a depth sensor 38, for example, a tablet computer.

Although claims have been formulated in this application to particular combinations of features, it should be understood that the scope of the disclosure of the present invention also includes any novel features or any novel combination of features disclosed herein either explicitly or implicitly or any generalization thereof, whether or not it relates to the same invention as presently claimed in any claim and whether or not it mitigates any or all of the same technical problems as does the present invention.

The applicants hereby give notice that new claims may be formulated to such features and/or combinations of such features during the prosecution of the present application or of any further application derived therefrom.

The invention claimed is:

1. Apparatus comprising:
   two or more colour displays arranged to provide piecewise continuous illumination of a volume;
   one or more cameras, each camera arranged to image the volume;
   wherein the apparatus is configured to control the two or more colour displays and the one or more cameras:
      to illuminate the volume with each of two or more illumination conditions, wherein each illumination condition is intensity modulated across the area of the two or more colour displays so as to simulate emission from an area of a spherical surface, a parabolic surface, or an ellipsoidal surface;
      to obtain two or more sets of images, each set of images being obtained during illumination of the volume with one or more corresponding illumination conditions;
   wherein the two or more sets of images comprise sufficient information for direct calculation of a specular reflectance map, a diffuse reflectance map, and a photometric normal map of an object or subject positioned within the volume;
   wherein viewed from the volume, the apparatus only provides direct illumination of the volume from angles within a zone of a hemisphere, the zone being less than a hemisphere and corresponding to a first range of latitudinal angles and a second range of longitudinal angles, wherein each of the first and second ranges is no more than $17\pi/18$;
   further comprising one or more additional light sources arranged to provide illumination of the volume, each additional light source configured to provide direct illumination of the volume only from angles within the zone;
   wherein the apparatus is configured to control the two or more colour displays and the one or more additional light sources, and wherein at least one of the illumination conditions comprises or consists of light emitted by an additional light source;
   wherein the additional light sources comprise one or more area light sources and/or one or more point light sources;

wherein the two or more illumination conditions comprise three or more illumination conditions including at least first and second spectrally resolvable illumination conditions;

wherein the first spectrally resolvable illumination condition consists of light provided by the two or more colour displays;

wherein the second spectrally resolvable illumination condition consists of light provided by all of the one or more additional light sources or a subset of the one or more additional light sources;

wherein the apparatus is configured to illuminate the volume with the first and second spectrally resolvable illumination conditions concurrently;

wherein one set of images of the two or more sets of images takes the form of a first set of spectrally multiplexed images corresponding to a superposition of the first and second spectrally resolvable illumination conditions.

2. The apparatus according to claim 1, wherein the one or more cameras comprise two or more cameras;
wherein the two or more cameras are spaced apart to image the volume from different angles, such that the two or more sets of images obtained corresponding to the illumination conditions comprise sufficient information for calculation of dense correspondence between the viewpoints of the two or more cameras.

3. The apparatus according to claim 1, wherein the one or more cameras comprise two or more cameras, and the apparatus further comprises a polariser applied to at least one of the two or more cameras;
wherein the polariser has a known relationship with respect to the illumination emitted by the two or more colour displays, such that the two or more sets of images comprise sufficient information to enable separation of the reflectance map and/or the photometric normal map into diffuse and specular components.

4. The apparatus according to claim 1, wherein the two or more colour displays comprise at least first and second colour displays, and the one or more cameras comprise at least a first camera;
wherein the first and second colour displays are arranged substantially symmetrically about a plane comprising an optical axis of the first camera.

5. The apparatus according to claim 1, wherein the two or more colour displays are configured to output first, second and third colour channels which are spectrally resolvable by the one or more cameras;
wherein the two or more illumination conditions include:
a third spectrally resolvable illumination condition corresponding to a first binary pattern along a first direction, emitted using only the first colour channel;
a fourth spectrally resolvable illumination condition corresponding to a complement of the first binary pattern, emitted using only the first colour channel;
a fifth spectrally resolvable illumination condition corresponding to the first binary pattern, emitted using only the second colour channel;
a sixth spectrally resolvable illumination condition corresponding to the complement of the first binary pattern, emitted using only the second colour channel;
a seventh spectrally resolvable illumination condition corresponding to a second binary pattern along a second direction which is different to the first direction, emitted using only the third colour channel;
an eighth spectrally resolvable illumination condition corresponding to a complement of the second binary pattern, emitted using only the third colour channel;
wherein the apparatus is configured:
to illuminate the volume with the third, sixth and seventh spectrally resolvable illumination conditions concurrently, and to obtain a corresponding second set of spectrally multiplexed images;
to illuminate the volume with the fourth, fifth and eighth spectrally resolvable illumination conditions concurrently, and to obtain a corresponding third set of spectrally multiplexed images.

6. The apparatus according to claim 1, wherein the apparatus comprises one or more portable computing devices, each portable computing device comprising:
one or more digital electronic processors;
memory;
a colour display;
a front camera oriented in a same direction as the colour display and/or a rear camera oriented in an opposite direction to the colour display;
wherein each device provides a colour display of the two or more colour displays and/or a camera of the one or more cameras.

7. The apparatus according to claim 1, further comprising one or more depth sensors directed at the volume, wherein the apparatus is configured to control the one or more depth sensors to measure a 3D geometry of an object or subject positioned within the volume.

8. The apparatus according to claim 7, wherein each depth sensor comprises:
one or more sets of infra-red, IR, emitters; and
one or more IR cameras;
wherein the apparatus is further configured to control the one or more sets of IR emitters and the one or more IR cameras directly and independently.

9. The apparatus according to claim 8, wherein the two or more illumination conditions include at least a visible illumination condition and an IR illumination condition;
wherein the visible illumination condition is provided by at least one of the two or more colour displays and/or one or more additional light sources;
wherein the IR illumination condition is provided by sets of IR emitters of at least one of the one or more depth sensors;
wherein the two or more sets of images comprise a set of one or more visible images corresponding to the visible illumination condition using the one or more cameras and;
wherein the apparatus is further configured to obtain, using the one or more IR cameras, a set of one or more IR images corresponding to the IR illumination condition.

10. The apparatus according to claim 1, wherein the two or more illumination conditions comprise at least one partial spherical illumination condition having an origin within the volume, wherein a partial spherical illumination condition is an illumination condition in which pixel intensities of the colour displays providing said illumination condition are controlled so as to simulate emission from the surface of a sphere.

11. The apparatus according to claim 1, wherein the two or more illumination conditions are basis illumination conditions and/or their respective complements, selected from the group consisting of uniform illumination, horizontally and vertically aligned binary patterns, 2D Haar wavelet patterns, phase shifted sinusoidal patterns, hemispherical harmonics, zonal basis functions, steerable radial basis functions, 2D Gaussians, Spherical Gaussians and localised piece-wise constant bases, including sets of lines or bands oriented along a pair of directions.

12. The apparatus according to claim 1, wherein the apparatus is configured to use at least one of the two or more displays to display a 3D rendering based on a calculated reflectance map and a photometric normal map determined based on the two or more sets of images.

13. The apparatus according to claim 1, wherein the apparatus is configured:
   to apply the two or more illumination conditions in a repeating sequence, wherein the refresh periods of each of the two or more colour displays are synchronised; and
   to obtain the two or more sets of images in the form of video data, wherein the exposure periods of the one or more cameras are synchronised with one another and with the refresh periods of the two or more colour displays.

14. The apparatus according to claim 1, wherein:
   at least one of the two or more displays takes the form of a light-field display; and/or
   at least one of the one or more cameras takes the form of a light-field camera.

15. The apparatus according to claim 1, wherein each colour display is configured as a nearfield light source for illumination of the volume.

16. The apparatus according to claim 1, wherein the apparatus is configured to directly calculate, from the two or more sets of images, the specular reflectance map, the diffuse reflectance map, and the photometric normal map of the object or subject.

17. A system comprising:
   the apparatus according to claim 1; and
   a data processing device communicatively coupled to the apparatus;
   wherein the apparatus is configured to transmit the two or more sets of images to the data processing device;
   wherein the data processing device is configured to directly calculate, from the two or more sets of images, the specular reflectance map, the diffuse reflectance map, and the photometric normal map.

18. A method of obtaining a specular reflectance map, a diffuse reflectance map, and a photometric normal map of an object, comprising:
   receiving two or more images of the object, each image obtained from the same viewpoint, wherein the images show the object illuminated using between three and five illumination conditions, the illumination conditions comprising:
   a first illumination condition in the form of a binary pattern along a first direction;
   a second illumination condition in the form of binary pattern along a second direction which is different to the first direction and wherein each of the first and second directions is substantially orthogonal to a reference line extending from the object along a third direction at an angle within the zone; and
   one or more selected from:
      a third illumination condition which is a complement of the first illumination condition;
      a fourth illumination condition which is a complement of the second illumination condition; and
      a fifth illumination condition which is a uniform illumination condition;
   calculating the photometric normal map, comprising directly calculating photometric normals from the two or more images of the object, followed by rotating the directly calculated photometric normals to align with an orthogonal coordinate system relative to the object;
   directly calculating the specular reflectance map and the diffuse reflectance map of the object based on the two or more images;
   wherein all of the illumination conditions are applied to the object from a hemisphere or from a zone which is less than a hemisphere.

19. The method according to claim 18, wherein calculating the photometric normal map further comprises:
   calculating second photometric normals using singular value decomposition applied to the two or more images of the object;
   rotating the second photometric normals based on the directly calculated and rotated photometric normal;
   wherein the photometric normal map comprises the second photometric normals.

20. The method according to claim 18, further comprising separating the photometric normal map into diffuse and specular components.

21. A method of imaging an object for obtaining a specular reflectance map, a diffuse reflectance map and a photometric normal map of that object, comprising:
   obtaining at least two images of the object from the same viewpoint, wherein the images correspond to the object illuminated using between three and five illumination conditions, the illumination conditions comprising:
   a first illumination condition in the form of a binary pattern along a first direction;
   a second illumination condition in the form of binary pattern along a second direction which is perpendicular to the first direction and wherein each of the first and second directions is substantially orthogonal to a reference line extending from the object along a third direction at an angle within the zone; and
   one or more selected from:
      a third illumination condition which is a complement of the first illumination condition;
      a fourth illumination condition which is a complement of the second illumination condition; and
      a fifth illumination condition which is a uniform illumination condition;
   wherein all of the illumination conditions are applied to the object from a hemisphere or from a zone which is less than a hemisphere.

* * * * *